(12) United States Patent
Kobayashi et al.

(10) Patent No.: US 7,263,428 B2
(45) Date of Patent: Aug. 28, 2007

(54) CYLINDER INFLOW EXHAUST GAS AMOUNT CALCULATION SYSTEM OF INTERNAL COMBUSTION ENGINE AND INTAKE PASSAGE INFLOW EXHAUST GAS AMOUNT CALCULATION SYSTEM OF INTERNAL COMBUSTION ENGINE

(75) Inventors: Daisuke Kobayashi, Toyota (JP); Harufumi Muto, Aichi (JP); Masato Ehara, Susono (JP); Jyunichi Kako, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 10/538,796

(22) PCT Filed: Dec. 11, 2003

(86) PCT No.: PCT/JP03/15901

§ 371 (c)(1),
(2), (4) Date: Jan. 12, 2006

(87) PCT Pub. No.: WO2004/055344

PCT Pub. Date: Jul. 1, 2004

(65) Prior Publication Data

US 2006/0235603 A1 Oct. 19, 2006

(30) Foreign Application Priority Data

Dec. 17, 2002 (JP) .............................. 2002-365669

(51) Int. Cl.
*F02M 25/07* (2006.01)
*F02B 47/08* (2006.01)
*G06F 17/00* (2006.01)

(52) U.S. Cl. .................................. 701/108; 123/568.21

(58) Field of Classification Search ........... 123/568.11, 123/568.13, 568.14, 568.16, 568.21; 73/117.3, 73/118.1; 700/29; 702/45; 701/103, 108, 701/114, 115
See application file for complete search history.

(56) References Cited

U.S. PATENT DOCUMENTS 3,953,969 A * 5/1976 Mori et al. .................. 123/316

(Continued)

FOREIGN PATENT DOCUMENTS

DE 198 50 127 A1 5/1999

(Continued)

*Primary Examiner*—Willis R. Wolfe, Jr.
(74) *Attorney, Agent, or Firm*—Oliff & Berridge PLC

(57) ABSTRACT

A cylinder inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, and the system calculating an amount of cylinder inflow exhaust gas defined as an amount of exhaust gas flowing into a cylinder, utilizing an amount of passage exhaust gas defined as an amount of exhaust gas passing through the exhaust gas flow rate control valve, wherein an amount of cylinder inflow exhaust gas is calculated considering the dead time corresponding to the time taken until the exhaust gas passing through the exhaust gas flow rate control valve reaches the cylinder and a tracking lag of a change in the amount of cylinder inflow exhaust gas with respect to a change in the amount of passage exhaust gas.

26 Claims, 42 Drawing Sheets

U.S. PATENT DOCUMENTS

| | | | |
|---|---|---|---|
| 5,483,938 A * | 1/1996 | Oshima et al. | 123/478 |
| 5,505,174 A | 4/1996 | Komoriya et al. | |
| 5,653,212 A * | 8/1997 | Hotta et al. | 123/568.16 |
| 5,934,249 A | 8/1999 | Nanba et al. | |
| 6,247,457 B1 | 6/2001 | Mallebrein | |
| 6,253,750 B1 | 7/2001 | Duty et al. | |
| 6,374,813 B1 * | 4/2002 | Iida et al. | 123/568.14 |
| 6,497,214 B2 | 12/2002 | Yagi et al. | |
| 6,502,563 B2 * | 1/2003 | Itoyama | 123/568.21 |
| 6,571,767 B2 | 6/2003 | Kobayashi et al. | |
| 6,697,729 B2 * | 2/2004 | Wright | 701/108 |
| 6,711,490 B2 | 3/2004 | Kobayashi et al. | |
| 6,729,303 B2 * | 5/2004 | Itoyama et al. | 701/108 |

FOREIGN PATENT DOCUMENTS

| | | |
|---|---|---|
| EP | 0 646 709 A2 | 4/1995 |
| JP | A 05-118239 | 5/1993 |
| JP | A 07-097942 | 4/1995 |
| JP | A 08-128359 | 5/1996 |
| JP | A 10-103116 | 4/1998 |
| JP | A 11-082100 | 3/1999 |
| JP | A 11-159404 | 6/1999 |
| JP | A 11-200954 | 7/1999 |
| JP | A 2000-038960 | 2/2000 |
| JP | A-2001-041095 | 2/2001 |
| JP | A-2002-130039 | 5/2002 |
| JP | A-2002-147279 | 5/2002 |
| JP | A-2002-180877 | 6/2002 |
| JP | A-2002-201998 | 7/2002 |
| JP | A 2002-332884 | 11/2002 |

* cited by examiner $P_m$ : INTAKE PIPE PRESSURE (kPa)
$P_a$ : ATMOSPHERIC PRESSURE (kPa)
$T_a$ : ATMOSPHERIC TEMPERATURE (K)
$A_t$ : CROSS SECTIONAL AREA OF OPENING OF THROTTLE VALVE ($m^2$)
$m_t$ : FLOW RATE OF AIR PASSING THROUGH THROTTLE VALVE (g/sec)
$\mu$ : FLOW RATE COEFFICIENT

Fig.7

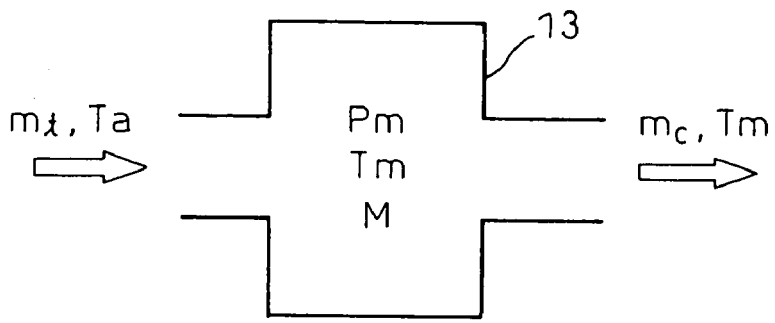

$m_t$ : FLOW RATE OF GAS FLOWING INTO INTAKE PIPE (g/sec)
$m_c$ : FLOW RATE OF GAS FLOWING OUT FROM INTAKE PIPE (g/sec)
$P_m$ : INTAKE PIPE PRESSURE (kPa)
$T_a$ : TEMPERATURE OF GAS FLOWING INTO INTAKE PIPE (K)
$T_m$ : TEMPERATURE IN INTAKE PIPE (K)
$M$ : TOTAL AMOUNT OF GAS IN INTAKE PIPE
$R$ : GAS CONSTANT
$V_m$ : VOLUME OF INTAKE PIPE (m$^3$)
$C_p$ : SPECIFIC HEAT AT CONSTANT PRESSURE
$C_v$ : SPECIFIC HEAT AT CONSTANT VOLUME
$K$ : SPECIFIC HEAT RATIO

- $P_m$ : PRESSURE UPSTREAM OF INTAKE VALVE (kPa)
- $T_m$ : TEMPERATURE UPSTREAM OF INTAKE VALVE (K)
- $T_a$ : ATMOSPHERIC TEMPERATURE (K)
- $m_c$ : FLOW RATE OF GAS SUCKED INTO CYLINDER (g/sec)
- a, b : ADAPTATION PARAMETERS $P_e$ : EXHAUST GAS PRESSURE (kPa)
$T_e$ : EXHAUST GAS TEMPERATURE (K)
$P_m$ : PRESSURE IN INTAKE PIPE (kPa)
$m_{egr}$ : FLOW RATE OF GAS PASSING THROUGH EGR CONTROL VALVE (g/sec)
$A_e$ : CROSS SECTIONAL AREA OF OPENING OF EGR CONTROL VALVE (m²)

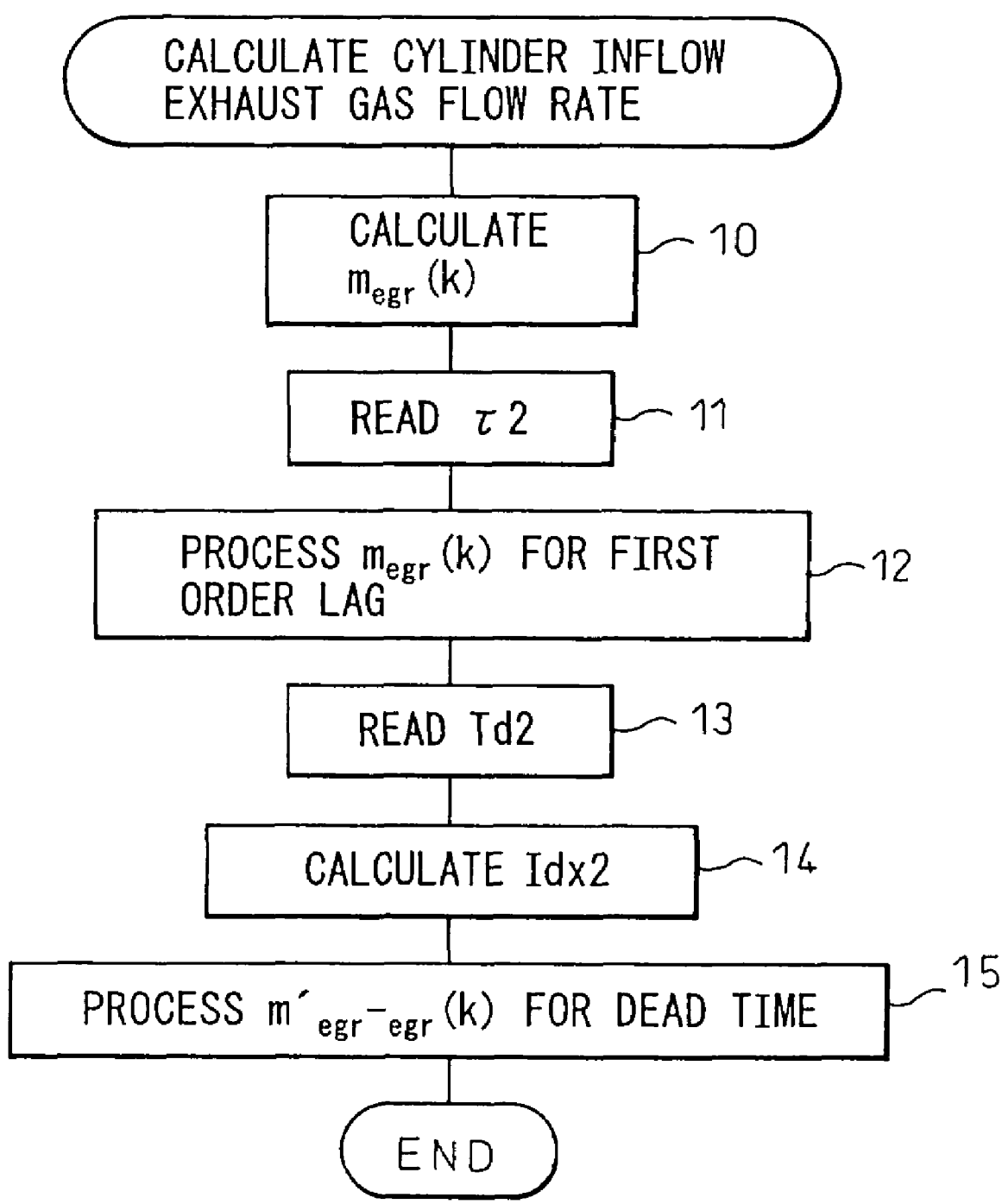

Fig.35A
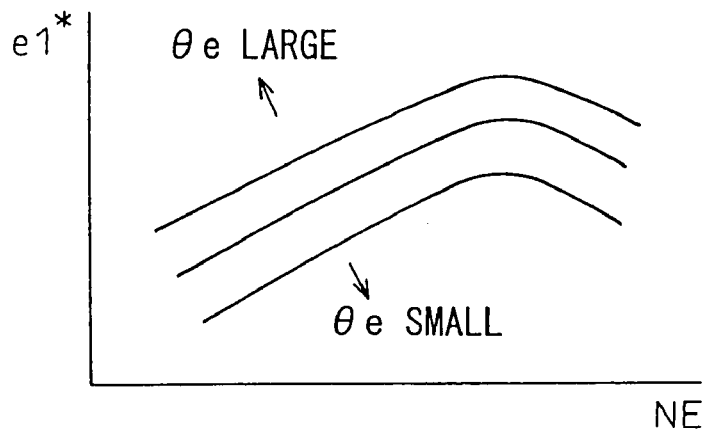
Fig.35B
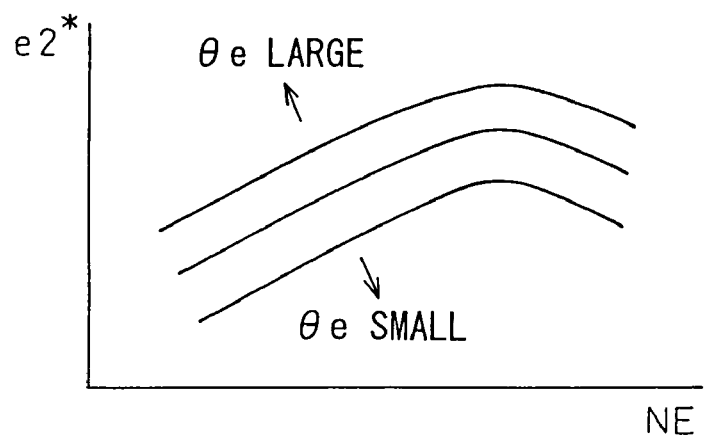
Fig.35C
$$\theta e \begin{array}{cccc} e1^*_{11} & e1^*_{12} & \cdots & e1^*_{1n} \\ e1^*_{21} & & & \vdots \\ \vdots & & & \\ e1^*_{m1} & \cdots & \cdots & e1^*_{mn} \end{array}$$
NE
Fig.35D
$$\theta e \begin{array}{cccc} e2^*_{11} & e2^*_{12} & \cdots & e2^*_{1n} \\ e2^*_{21} & & & \vdots \\ \vdots & & & \\ e2^*_{m1} & \cdots & \cdots & e2^*_{mn} \end{array}$$
NE

Fig.45A $$\theta e \begin{array}{|cccc} h1^*_{11} & h1^*_{12} & \cdots & h1^*_{1n} \\ h1^*_{21} & & & \vdots \\ \vdots & & & \\ h1^*_{m1} & \cdots & \cdots & h1^*_{mn} \end{array}$$
$$\text{NE}$$

Fig.45B $$\theta e \begin{array}{|cccc} h2^*_{11} & h2^*_{12} & \cdots & h2^*_{1n} \\ h2^*_{21} & & & \vdots \\ \vdots & & & \\ h2^*_{m1} & \cdots & \cdots & h2^*_{mn} \end{array}$$
$$\text{NE}$$

Fig.45C $$\theta e \begin{array}{|cccc} i^*_{11} & i^*_{12} & \cdots & i^*_{1n} \\ i^*_{21} & & & \vdots \\ \vdots & & & \\ i^*_{m1} & \cdots & \cdots & i^*_{mn} \end{array}$$
$$\text{NE}$$

CYLINDER INFLOW EXHAUST GAS AMOUNT CALCULATION SYSTEM OF INTERNAL COMBUSTION ENGINE AND INTAKE PASSAGE INFLOW EXHAUST GAS AMOUNT CALCULATION SYSTEM OF INTERNAL COMBUSTION ENGINE

BACKGROUND OF THE INVENTION

1. Field of the Invention

The present invention relates to a cylinder inflow exhaust gas calculation system of an internal combustion engine amount and an intake passage inflow exhaust gas amount calculation system of an internal combustion engine.

2. Description of the Related Art

An internal combustion engine wherein an exhaust passage and intake passage of the internal combustion engine are connected through an exhaust gas recirculation passage and an exhaust gas flow rate control valve for controlling the flow rate of the exhaust gas flowing through the exhaust gas recirculation passage is arranged in the exhaust gas recirculation passage is disclosed in Japanese Unexamined Patent Publication (Kokai) No. 8-128359. In this internal combustion engine, it is possible to introduce exhaust gas exhausted from a cylinder into the exhaust passage through this exhaust gas recirculation passage into the intake passage and thereby cause the exhaust gas to be recirculated into the cylinder. In an internal combustion recirculating the exhaust gas into a cylinder in this way, to determine the amount of fuel injection so that the air-fuel ratio becomes the target air-fuel ratio, the ratio of the exhaust gas in the amount of gas charged in the cylinder (that is, the EGR rate) is calculated.

In Japanese Unexamined Patent Publication (Kokai) No. 8-128359, the EGR rate at the time of steady state operation is found in advance in the form of a map and the EGR rate is found from this map at the time of steady state operation. Further, in Japanese Unexamined Patent Publication (Kokai) No. 8-128359, the EGR rate found from a map of the EGR rate at the time of steady state operation is utilized to estimate the EGR rate at the time of transient operation. Specifically, if the amount of exhaust gas passing through the exhaust gas flow rate control valve is called the "amount of passage gas", the ratio of the amount of passage gas found relating to the actual opening degree of the exhaust gas flow rate control valve with respect to the amount of passage gas found relating to the target opening degree of the exhaust gas flow rate control valve is multiplied with the EGR rate at the time of steady state operation to find the EGR rate at the time of transient operation.

That is, if the amount of passage gas found relating to the target opening degree of the exhaust gas flow rate control valve is represented by Qt, the amount of passage gas found relating to the actual opening degree of the exhaust gas flow rate control valve is represented by Qa, and the EGR rate at the time of steady state operation is represented by Rc, in Japanese Unexamined Patent Publication (Kokai) No. 8-128359, the EGR rate at the time of transient operation is found from R=Rc·Qa/Qt. Further, in Japanese Unexamined Patent Publication (Kokai) No. 8-128359, note is taken of the fact that there is several minutes lag from when an instruction for changing the opening degree of the exhaust gas flow rate control valve is issued to when the opening degree of the exhaust gas flow rate control valve becomes the target opening degree and the EGR rate at the time of transient operation calculated exactly that amount of lag before is utilized as the EGR rate at the time of transient operation.

Summarizing the problems to be solved by the invention, in Japanese Unexamined Patent Publication (Kokai) No. 8-128359, the amount of the exhaust gas passing through the exhaust gas flow rate control valve is utilized to estimate the EGR rate at the time of transient operation based on the EGR rate at the time of steady state operation. The amount of exhaust gas charged in the cylinder itself is not directly found. Therefore, when estimating the amount of exhaust gas charged in the cylinder from the EGR rate at the time of transient operation, it can be said that the precision of the estimated value is not that high. Further, sometimes there is variation in the response of the exhaust gas flow rate control valve. In this case, the precision of calculation of the amount of gas itself passing through the exhaust gas flow rate control valve ends up becoming low.

SUMMARY OF THE INVENTION

An object of the present invention is to accurately calculate the amount of exhaust gas flowing into the cylinder of an internal combustion engine.

To attain the above object, according to a first aspect of the invention, there is provided a cylinder inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, and the system calculating an amount of cylinder inflow exhaust gas defined as an amount of exhaust gas flowing into a cylinder, utilizing an amount of passage exhaust gas defined as an amount of exhaust gas passing through the exhaust gas flow rate control valve, wherein an amount of cylinder inflow exhaust gas is calculated considering a dead time corresponding to the time taken until the exhaust gas passing through the exhaust gas flow rate control valve reaches the cylinder and a tracking lag of a change in the amount of cylinder inflow exhaust gas with respect to a change in the amount of passage exhaust gas.

Preferably, the tracking lag is a first-order lag, and a time constant of the first-order lag and the dead time are changed in accordance with an engine speed.

Alternatively, preferably the internal combustion engine is provided with a plurality of cylinders, a ratio of an actual amount of cylinder inflow exhaust gas in each cylinder with respect to the calculated amount of cylinder inflow exhaust gas is found in advance as a distribution constant, and the distribution constant is multiplied with the calculated amount of cylinder inflow exhaust gas to calculate the amount of cylinder inflow exhaust gas in each cylinder.

Alternatively, preferably the internal combustion engine is provided with a plurality of cylinders, and the tracking lag and dead time are set for each cylinder.

Alternatively, preferably the internal engine is provide with an intake valve with a variable closing timing, and the setting of said tracking lag and the setting of said dead time are changed in accordance with a closing time of the intake valve.

Alternatively, preferably the flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

Alternatively, preferably a flow rate of gas near an opening of an exhaust gas recirculation passage opening to the intake passage can be changed by one of a change of passage volume from said exhaust gas flow rate control valve to said intake valve in accordance with an engine operating state and a change of a channel sectional area of said intake passage in accordance with the engine operating state, a function equation expressing the amount of passage exhaust gas by a function of the pressure in the intake passage, and a parameter other than the pressure in said intake passage is found and stored in advance, an amount of passage exhaust gas is calculated from the pressure in the intake passage utilizing the function equation, and the parameter other than the pressure in the intake passage is changed in accordance with one of said passage volume and said flow rate of gas.

According to a second aspect of the invention, there is provided a cylinder inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of passage exhaust gas defined as an amount of exhaust gas passing through an exhaust gas flow rate control valve, utilizing a parameter changing said amount of passage exhaust gas and the system calculating an amount of cylinder inflow exhaust gas defined as an amount of exhaust gas flowing into a cylinder, utilizing said calculated amount of passage exhaust gas, wherein a value of the parameter is read in, a dead time corresponding to the time taken until the exhaust gas passing through the exhaust gas flow rate control valve reaches the cylinder and a tracking lag of a change in the amount of cylinder inflow exhaust gas with respect to a change in the amount of passage exhaust gas are reflected in the read value, and the amount of passage exhaust gas is calculated utilizing the read value in which the dead time and tracking lag are reflected.

Preferably the tracking lag is a first-order lag, and a time constant of the first-order lag and the dead time are changed in accordance with an engine speed.

Alternatively, preferably the internal combustion engine is provided with a plurality of cylinders, a ratio of an actual amount of cylinder inflow exhaust gas in each cylinder with respect to the calculated amount of cylinder inflow exhaust gas is found in advance as a distribution constant, and the distribution constant is multiplied with the calculated amount of cylinder inflow exhaust gas to calculate the amount of cylinder inflow exhaust gas in each cylinder.

Alternatively, preferably the internal combustion engine is provided with a plurality of cylinders, and the tracking lag and dead time are set for each cylinder.

Alternatively, preferably the internal engine is provided with an intake valve with a variable closing timing, and the setting of said tracking lag and the setting of said dead time are changed in accordance with a closing time of the intake valve.

Alternatively, preferably a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

According to a third aspect of the invention, there is provided an intake passage inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of an intake passage inflow exhaust gas defined as an amount of exhaust gas flowing into the intake passage, utilizing an amount of passage exhaust gas defined as an amount of exhaust gas passing through said exhaust gas flow rate control valve, wherein an intake passage inflow exhaust gas is calculated considering the dead time corresponding to the time taken until the exhaust gas passing through the exhaust gas flow rate control valve reaches the intake passage and a tracking lag of a change in the intake passage inflow exhaust gas with respect to a change in the amount of passage exhaust gas.

Preferably the tracking lag is a first-order lag, and a time constant of the first-order lag and the dead time are changed in accordance with an engine speed.

Alternatively, preferably the internal combustion engine is provided with a plurality of cylinders, the exhaust gas recirculation passage is connected to an intake passage connected to each cylinder, a ratio of an actual amount of intake passage inflow exhaust gas to the intake passage cylinder connected to each cylinder with respect to the calculated amount of cylinder inflow exhaust gas is found in advance as a distribution constant, and the distribution constant is multiplied with the calculated amount of intake passage inflow exhaust gas to calculate the amount of intake passage inflow exhaust gas in the intake passage connected to each cylinder.

Alternatively, preferably the internal combustion engine is provided with a plurality of cylinders, and the tracking lag and dead time are set for each cylinder.

Alternatively, preferably the internal engine is provided with an intake valve with a variable closing timing, and the setting of said tracking lag and the setting of said dead time are changed in accordance with a closing time of the intake valve.

Alternatively, preferably a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

Alternatively, preferably a flow rate of gas near an opening of an exhaust gas recirculation passage opening to the intake passage can be changed by one of a change of passage volume from said exhaust gas flow rate control valve to said intake valve in accordance with an engine operating state and a change of a channel sectional area of said intake passage in accordance with the engine operating state, a function equation expressing the amount of passage exhaust gas by a function of the pressure in the intake passage, and a parameter other than the pressure in said intake passage is found and stored in advance, an amount of passage exhaust gas is calculated from the pressure in the intake passage utilizing the function equation, and the parameter other than the pressure in the intake passage is changed in accordance with one of said passage volume and said flow rate of gas.

According to a fourth aspect of the invention, there is provided an intake passage inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of passage exhaust gas defined as an amount of exhaust gas passing through an exhaust gas flow rate control valve, utilizing a parameter changing said amount of passage exhaust gas and the system calculating an amount of intake exhaust gas defined as an amount of exhaust gas flowing into the intake passage, utilizing said calculated amount of passage exhaust gas, wherein a value of the parameter is read in, a dead time corresponding to the time taken until the exhaust gas passing through the exhaust gas flow rate control valve reaches the cylinder and a tracking lag of a change in the amount of cylinder inflow exhaust gas with respect to a change in the amount of passage exhaust gas are reflected in the read value, and the amount of passage exhaust gas is calculated utilizing the read value in which the dead time and tracking lag are reflected.

Preferably the tracking lag is a first-order lag, and a time constant of the first-order lag and the dead time are changed in accordance with an engine speed.

Alternatively, preferably the internal combustion engine is provided with a plurality of cylinders, the exhaust gas recirculation passage is connected to an intake passage connected to each cylinder, a ratio of an actual amount of intake passage inflow exhaust gas to the intake passage connected to each cylinder with respect to the calculated amount of cylinder inflow exhaust gas is found in advance as a distribution constant, and the distribution constant is multiplied with the calculated amount of intake passage inflow exhaust gas to calculate the amount of intake passage inflow exhaust gas in the intake passage connected to each cylinder.

Alternatively, preferably the internal combustion engine is provided with a plurality of cylinders, and the tracking lag and dead time are set for each cylinder.

Alternatively, preferably the internal engine is provided with an intake valve with a variable closing timing, and the setting of said tracking lag and the setting of said dead time are changed in accordance with a closing time of the intake valve.

Alternatively, preferably a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

BRIEF DESCRIPTION OF THE DRAWINGS

These and other objects and features of the present invention will become clearer from the following description of the preferred embodiments given with reference to the attached drawings, wherein:

FIG. 7 is a view of the basic concept of an intake pipe model able to be applied to an internal combustion engine not provided with an EGR system;

FIG. 18 is a flow chart of a routine for calculating a cylinder inflow exhaust gas flow rate $m_{egr-egr}$;

FIG. 35A is a graph of a relationship between an engine speed NE, an EGR opening degree $θ_e$, and gradient e1*;

FIG. 35B is a graph of a relationship between an engine speed NE, an EGR opening degree $θ_e$, and gradient e2*;

FIG. 35C is a view of a map of the gradient e1* of a function of an engine speed NE and an EGR opening degree $θ_e$;

FIG. 35D is a graph of a map of the gradient e2* of a function of an engine speed NE and an EGR opening degree $θ_e$;

FIG. 45A is a view of a map of a gradient h1* of a function of an engine speed NE and EGR opening degree $θ_e$;

FIG. 45B is a view of a map of a gradient h2* of a function of an engine speed NE and EGR opening degree $θ_e$;

FIG. 45C is a view of a map of a difference i* at a connection point of a function of an engine speed NE and EGR opening degree $θ_e$;

DESCRIPTION OF THE PREFERRED EMBODIMENTS

Preferred embodiments of the present invention will be described in detail below while referring to the attached figures.

Figure 1:
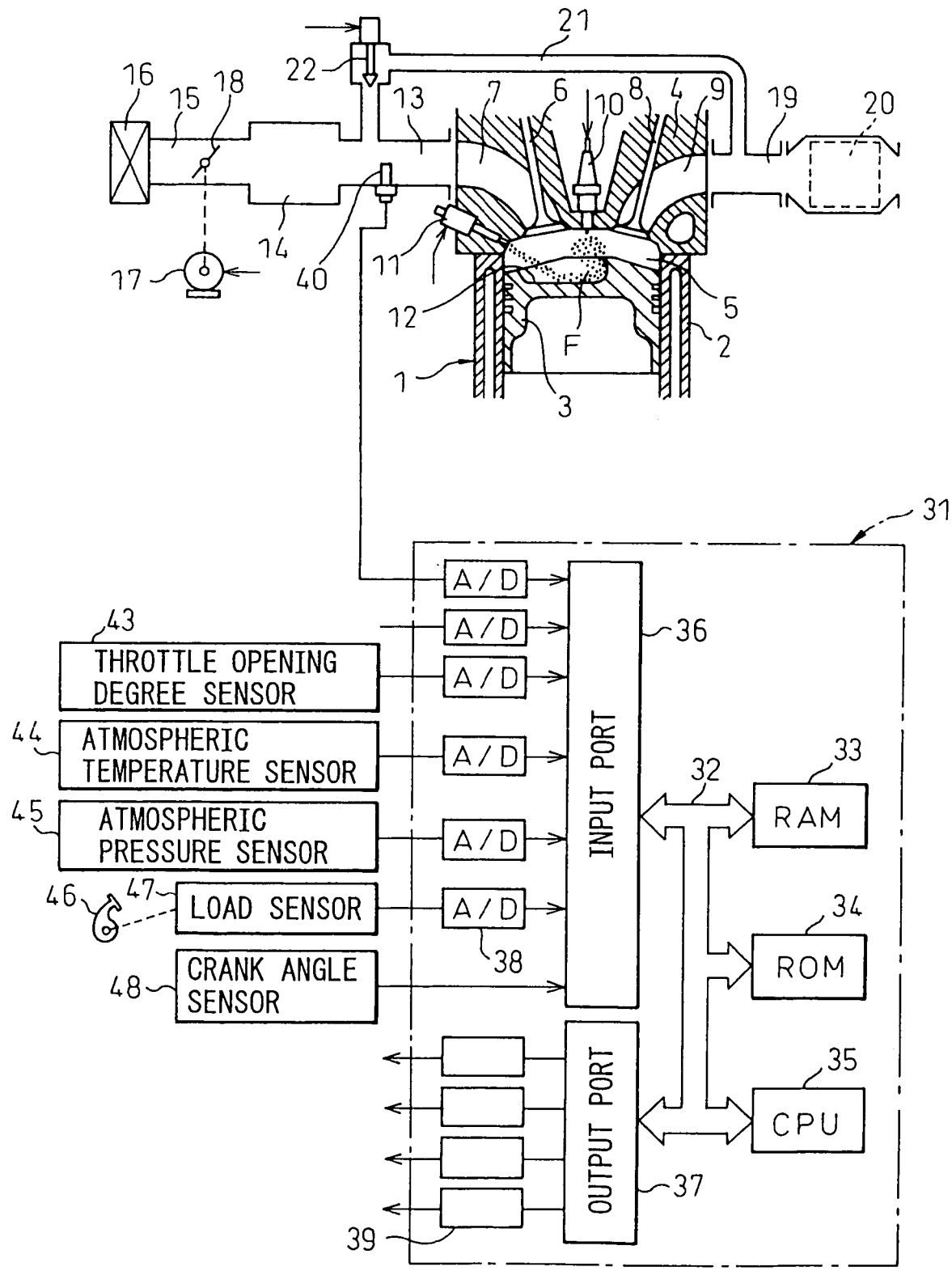
FIG. 1 is an overall view of an internal combustion engine provided with a control system of the present invention.

FIG. 1 is an overall view of an internal combustion engine to which the present invention is applied. In the following explanation, the explanation will be made of the example of an in-cylinder injection (or direct-injection) type spark ignition internal combustion engine, but the present invention may also be applied to another spark ignition internal combustion engine. In FIG. 1, 1 is an engine body, 2 a cylinder block, 3 a piston, 4 a cylinder head, 5 a cylinder (combustion chamber), 6 an intake valve, 7 an intake port, 8 an exhaust valve, 9 an exhaust port, 10 a spark plug, 11 a fuel injector, and 12 a cavity.

The intake port 7 is connected to a surge tank 14 through an intake tube 13 for every cylinder 5. The surge tank 14 is connected to an air cleaner 16 through an upstream intake pipe 15. The upstream intake pipe 15 has a throttle valve 18 driven by a step motor 17 arranged inside it. On the other hand, the intake port 9 is connected to an exhaust pipe 19. The exhaust pipe 19 is connected to an exhaust gas purification device 20.

The exhaust pipe 19 is connected to the intake tube 13 through an exhaust gas recirculation passage (hereinafter referred to as the "EGR passage"). The EGR passage 21 has an EGR control valve 22 for controlling the flow rate of the exhaust gas flowing through the inside of the EGR passage 21 arranged inside it. The exhaust gas exhausted from a cylinder 5 of the internal combustion engine is introduced inside the cylinder again through this EGR passage 21. In this specification, the exhaust gas recirculated inside the cylinder through this EGR passage 21 is also called "EGR gas".

An electronic control unit (ECU) 31 is comprised of a digital computer provided with a random access memory (RAM) 33, a read only memory (ROM) 34, a microprocessor (CPU) 35, an input port 36, and an output port 37 connected to each other through a bidirectional bus 32. The intake tube 13 has attached to it an intake pipe pressure sensor 40 for detecting the pressure inside the intake tube 13 (hereinafter also called the "intake pipe pressure"). The intake pipe pressure sensor 40 generates an output voltage proportional to the intake pipe pressure. Its output voltage is input to the input port 36 through a corresponding AD converter 38.

Further, the internal combustion engine is provided with a throttle opening degree sensor 43 for detecting an opening degree of the throttle valve 18, an atmospheric pressure sensor 44 for detecting the pressure of atmosphere around the internal combustion engine or the pressure of the air (intake pressure) taken into the upstream intake pipe 15, and an atmospheric temperature sensor 45 for detecting the temperature of the air (intake temperature) taken into the upstream intake pipe 15. These sensors 44 and 45 generate output voltages proportional to the atmospheric pressure and atmospheric temperature. These output voltages are input to the input port 36 through the corresponding AD converters 38.

Further, an accelerator pedal 46 has connected to it a load sensor 47 for generating an output voltage proportional to the amount of depression of the acceleration pedal 46. The output voltage of the load sensor 47 is input to the input port 36 through the corresponding AD converter 38. Further, the internal combustion engine is provided with a crank angle sensor 48. The crank angle sensor 48 for example generates an output pulse every time the crankshaft turns 30 degrees. This output pulse is input to the input port 36. The CPU 35 calculates the engine speed from the output pulses of the crank angle sensor 45.

On the other hand, the output port 37 is connected through a corresponding drive circuit 39 to the spark plug 10, fuel injector 11, step motor 17, and EGR control valve 22. Note that the opening degree of the EGR control valve 22 is calculated in the ECU 31 based on a step signal sent from the output port 37 to the EGR control valve 22.

Note that the amount of the fuel to be injected from the fuel injector 10 to the inside of a cylinder 5 (hereinafter simply called the "fuel injection amount") is determined based on the amount of air charged in the cylinder 5 so that the air-fuel ratio of the air-fuel mixture in the cylinder 5 accurately becomes the target air-fuel ratio. Therefore, to make the air-fuel ratio of the air-fuel mixture in the cylinder 5 accurately the target air-fuel ratio, it is necessary to obtain an accurate grasp of the amount of air charged in the cylinder 5 (hereinafter called the "amount of cylinder charging air").

Here, as a method for estimating the amount of cylinder charging air, there is the method of attaching an air-flow meter for detecting the mass flow rate of the air passing through the throttle valve 18 or another sensor to the internal combustion engine, preparing in advance a map for calculating the amount of cylinder charging air using the output value of these sensors as a variable, and estimating the amount of cylinder charging air from the output value of the sensor and the map.

When using a map for estimating the amount of cylinder charging air, however, to accurately estimate the amount of cylinder charging air, it is necessary to increase the number of maps and the arguments. If increasing the number of maps, however, it is necessary to enlarge the storage capacity of the ROM 34 storing these maps and the cost of the internal combustion engine ends up becoming higher. Further, when estimating the amount of cylinder charging air utilizing the maps, it is necessary to prepare maps for each type of internal combustion engine or for each individual internal combustion engine even if the same type of internal combustion engine, so the labor involved in preparing the maps becomes greater. On the other hand, if trying to more accurately estimate the amount of cylinder charging air by increasing the arguments of the maps, the labor in preparing the maps ends up becoming much larger.

Therefore, instead of the maps, the method of calculating the amount of cylinder charging air by numerical calculation utilizing an equation derived from the model is being studied. This method has already been applied for by the present assignee (Japanese Patent Application No. 2001-316350). The method already filed for by the present assignee is a method to be applied to an internal combustion engine in which the exhaust gas is not recirculated to a cylinder, so cannot be applied as it is to an internal combustion engine with an EGR device of the present embodiment, but probably would be of reference in understanding the later mentioned method able to be applied to the present embodiment, so first the method already applied for by the present assignee will be explained.

Figure 2:
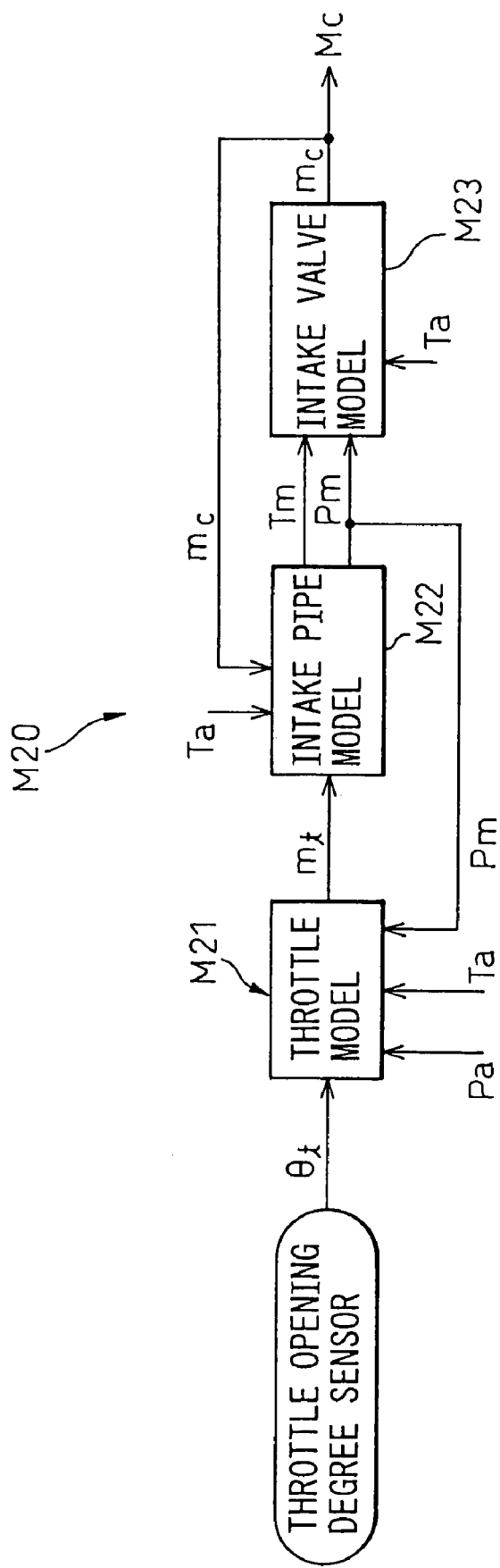
FIG. 2 is a view of a cylinder inflow gas model able to be applied to an internal combustion engine not provided with an EGR system.

The method already applied for by the present assignee is derived from the model shown in FIG. 2 (hereinafter called the "cylinder inflow gas model"). The cylinder inflow gas model M20 shown in FIG. 2 is comprised of a throttle model M21, an intake pipe model M22, and an intake valve model M23.

The throttle model M21 receives as input the opening degree $\theta_t$ of the throttle valve 18 detected by a throttle opening degree sensor 43 (throttle opening degree), the atmospheric pressure $P_a$ detected by an atmospheric pressure sensor 45, an atmospheric temperature $T_a$ detected by an atmospheric temperature sensor 44, and a pressure $P_m$ inside the intake tube 13 calculated in the intake pipe model M22 (hereinafter referred to as the "intake pipe pressure"). In the model M21, the flow rate $m_t$ of air passing through the throttle valve 18 per unit time (hereinafter called the "throttle valve passage air flow rate") is calculated from these input parameters.

Further, the intake pipe model M22 receives as input the throttle valve passage air flow rate $m_t$ calculated at the above-mentioned throttle model M21, a flow rate $m_c$ of gas flowing into the cylinder 5 per unit time calculated at the intake valve model M23 (hereinafter referred to as the "cylinder inflow gas flow rate"), and the atmospheric temperature $T_a$. In the model M22, the intake pipe pressure $P_m$ and the temperature $T_m$ of the gas inside the intake tube 13 (hereinafter called the "intake pipe temperature") are calculated from these input parameters.

Further, the intake valve model M23 receives as input the intake pipe pressure $P_m$ calculated at the above-mentioned intake pipe model M22, the intake pipe temperature $T_m$, and the atmospheric temperature $T_a$. In this model M23, the cylinder inflow gas flow rate $m_c$ is calculated from these input parameters. Further, by this method, as explained later, the cylinder inflow gas flow rate $m_c$ is utilized to calculate the amount $M_c$ of gas flowing into the cylinder 5 (hereinafter called the "amount of cylinder charging gas").

As will be understood from FIG. 2, in the cylinder inflow gas model M20, since parameter values calculated at different models are utilized as parameter values input to a separate model, the only parameter values actually input to the cylinder inflow gas model M20 are the throttle opening degree $θ_t$, the atmospheric pressure $P_a$, and the atmospheric temperature $T_a$. That is, according to this method, it can be said that the amount of cylinder charging gas $M_c$ is calculated from three parameters.

Next, the models M21 to M23 will be explained in detail. In the throttle model M21, the atmospheric pressure $P_a$, the atmospheric temperature $T_a$, the intake pipe pressure $P_m$, and the throttle opening degree $θ_t$ are input to the following equation (1) and the equation is solved so as to calculate the throttle valve passage air flow rate $m_t$.

$$m_t = \mu_t(\theta_t) \cdot A_t(\theta_t) \cdot \frac{P_a}{\sqrt{R \cdot T_a}} \cdot \Phi\left(\frac{P_m}{P_a}\right) \quad (1)$$

Figure 3:
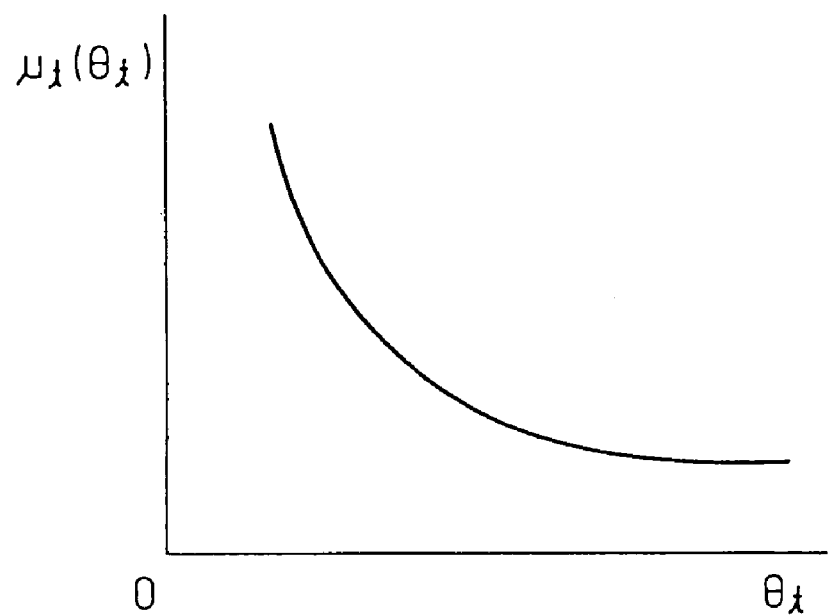
FIG. 3 is a view of a relationship between a throttle opening degree and flow rate coefficient.
Figure 4:
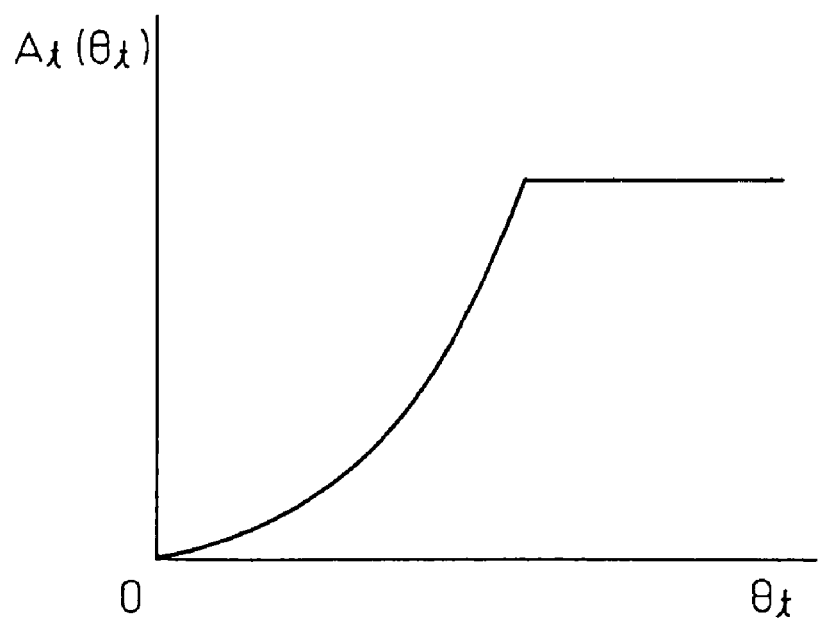
FIG. 4 is a view of a relationship between a throttle opening degree and opening sectional area.

In equation (1), $μ_t$ is a flow rate coefficient in the throttle valve and a function of the throttle opening degree $θ_t$ and is determined from the map shown in FIG. 3. Further, $A_t$ is the opening sectional area of the throttle valve and a function of the throttle opening degree $θ_t$ and is determined from the map shown in FIG. 4. Note that it is also possible to find $μ_t \cdot A_t$ combining the flow rate coefficient $μ_t$ and the opening sectional area $A_t$ as a function of the throttle opening degree $θ_t$ from a single map. Further, R is a constant relating to the gas constant and is a value obtained by dividing the so-called gas constant $R^*$ by the mass $M_a$ of the air per mole ($R=R^*/M_a$).

Further, $\Phi(P_m/P_a)$ is a function having $P_m/P_a$ as a variable as shown in the following equation (2):

$$\Phi\left(\frac{P_m}{P_a}\right) = \begin{cases} \sqrt{\frac{\kappa}{2(\kappa+1)}} & \dots \frac{P_m}{P_a} \le \frac{1}{\kappa+1} \\ \sqrt{\left[\left(\frac{\kappa-1}{2\kappa}\right) \cdot \left(1 - \frac{P_m}{P_a}\right) + \frac{P_m}{P_a}\right] \cdot \left(1 - \frac{P_m}{P_a}\right)} & \dots \frac{P_m}{P_a} > \frac{1}{\kappa+1} \end{cases} \quad (2)$$

In equation (2), κ is the specific heat ratio. In this method, it is a constant value.

Figure 5:
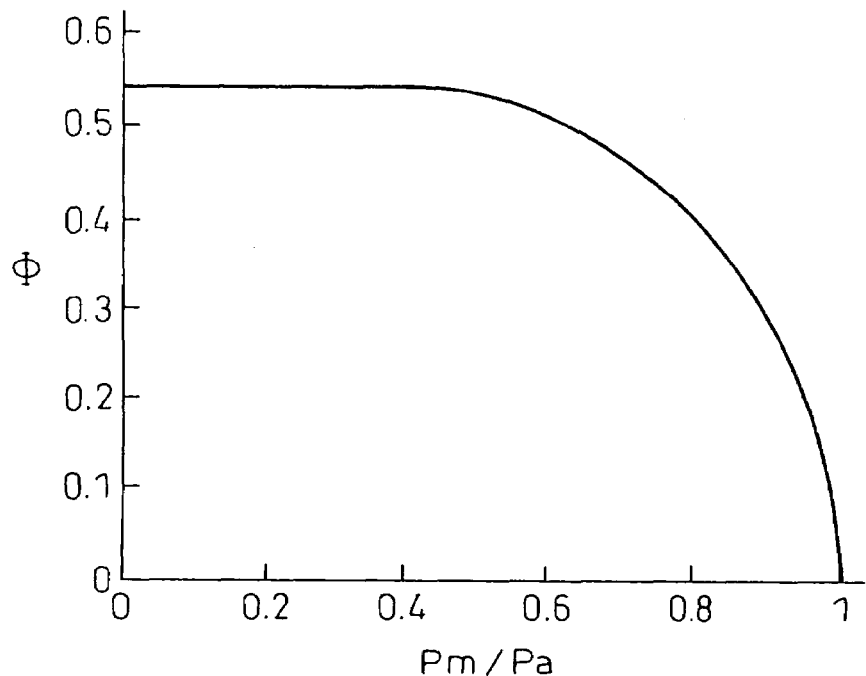
FIG. 5 is a view of a function $\Phi(P_m/P_a)$.

Note that there is the relation shown in FIG. 5 between the function $\Phi(P_m/P_a)$ and $P_m/P_a$. Therefore, instead of equation (2), it is also possible to store a map for calculation of the function $\Phi(P_m/P_a)$ having $P_m/P_a$ as a variable in advance in the ROM 34 and to calculate the value of the function $\Phi(P_m/P_a)$ from $P_m/P_a$ and this map.

Figure 6:
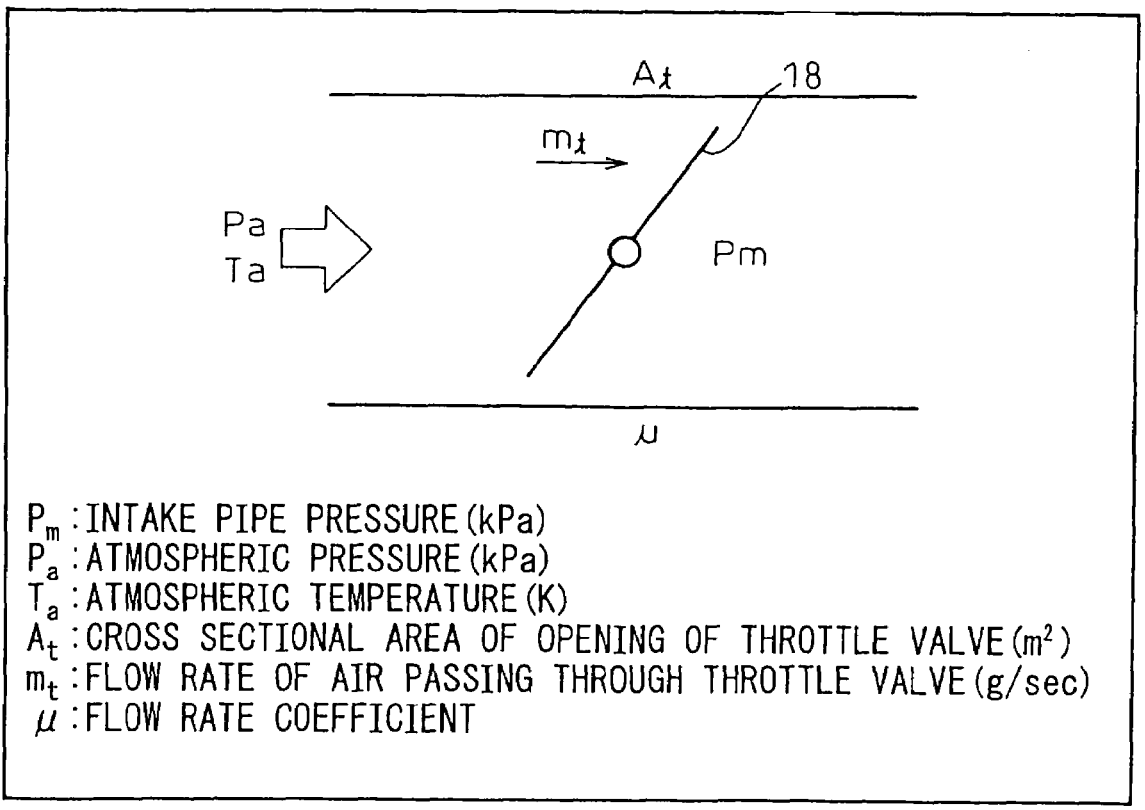
FIG. 6 is a view of the basic concept of a throttle model.

Note that equations (1) and (2) use the pressure of the air upstream of the throttle valve 18 as the atmospheric pressure $P_a$, use the temperature of the air upstream of the throttle valve 18 as the atmospheric temperature $T_a$, and use the pressure of the air passing through the throttle valve 18 as the intake pipe pressure $P_m$ and are derived utilizing the relation standing between the air upstream of the throttle valve 18 and the air passing through the throttle valve 18 under the law of conservation of mass, law of conservation of energy, and law of conservation of momentum based on a model such as shown in FIG. 6 for the throttle valve 18, the equation of state of gas, the definition of the specific heat ratio (κ=Cp/Cv), and Meyer's Relation (Cp=Cv+R*). Here, Cp is a constant pressure specific heat, Cv is a constant volume specific heat, and R* is a so-called gas constant.

Next, the intake pipe model M22 will be explained. In the intake pipe model M22, the throttle valve passage air flow rate $m_t$, the cylinder inflow gas flow rate $m_c$, and the atmospheric temperature $T_a$ are input to the following equations (3) and (4) and these equations are solved to calculate the intake pipe pressure $P_m$ and the intake pipe temperature $T_m$:

$$\frac{d}{dt}\left(\frac{P_m}{T_m}\right) = \frac{R}{V} \cdot (m_t - m_c) \quad (3)$$

$$\frac{dP_m}{dt} = \kappa \cdot \frac{R}{V} \cdot (m_t \cdot T_a - m_c \cdot T_m) \quad (4)$$

In equations (3) and (4), V is the total volume of the intake pipe 15 from the throttle valve 18 to the intake valve 6, the surge tank 14, the intake tube 13, and the intake port 7 (hereinafter referred to together as the "intake pipe portion") and is usually a constant value.

Note that these equations (3) and (4) are derived from the relation standing between the air flowing into the intake pipe portion and the air flowing out from the intake pipe portion and flowing into the cylinder under the law of conservation of mass and the law of conservation of energy based on the model shown in FIG. 7 relating to the intake pipe portion.

Specifically, if the total amount of air in the intake pipe portion is M, the change over time of the total amount of air M is equal to the difference between the flow rate $m_t$ of the air flowing into the intake pipe portion (that is, the throttle valve passage air flow rate) and the flow rate $m_c$ of the air flowing out of from the intake pipe portion and flowing into the cylinder (that is, the amount of cylinder inflow gas), so the following equation (5) stands under the law of the conservation of mass:

$$\frac{dM}{dt} = m_t - m_c \quad (5)$$

Further, the above equation (3) is derived from equation (5) and the equation of state of the gas ($P_m \cdot V = M \cdot R^* \cdot T_m$).

Further, the amount of change over time of the amount of energy $M \cdot Cv \cdot T_m$ of the air in the intake pipe portion is equal to the difference between the amount of energy of the air flowing into the intake pipe portion and the amount of energy of the air flowing out from the intake pipe portion and flowing into the cylinder, so if making the temperature of the air flowing into the intake pipe portion the atmospheric temperature $T_a$ and making the temperature of the air flowing out from the intake pipe portion and flowing into the cylinder the intake pipe temperature $T_m$, the following equation (6) stands under the law of the conservation of energy:

$$\frac{d(M \cdot Cv \cdot T_m)}{dt} = Cp \cdot m_t \cdot T_a - Cp \cdot m_c \cdot T_m \quad (6)$$

Further, the above equation (4) is derived from this equation (6) and the above equation of state of a gas.

Next, the intake valve model M23 will be explained. In the intake valve model M23, the intake pipe pressure $P_m$, the intake pipe temperature $T_m$, and the atmospheric temperature $T_a$ are input to the following equation (7) and this equation is solved to calculate the cylinder inflow gas flow rate $m_c$:

$$m_c = \frac{T_a}{T_m} \cdot (a \cdot P_m - b) \quad (7)$$

In equation (7), a and b are values found using the engine speed NE as a variable. Further, when at least one of the valve timing corresponding to the opening timing or closing timing of the intake valve 6 and the operating angle corresponding to the opening time can be changed in an internal combustion engine, in equation (7), a and b are values found using the engine speed NE and valve timing or phase angle or both as variables. Using another manner of expression, in equation (7), a is a proportional coefficient and b is a value showing the amount of gas remaining in the cylinder 5 at the time of closing of the exhaust valve 8.

Further, in equation (7), when the engine operating state changes, that is, at the time of transient operation, the intake pipe temperature $T_m$ will sometimes change greatly, so $T_a/T_m$ derived from theory and experience is used as the correction coefficient for compensating for changes in the intake pipe temperature $T_m$.

Figure 8:
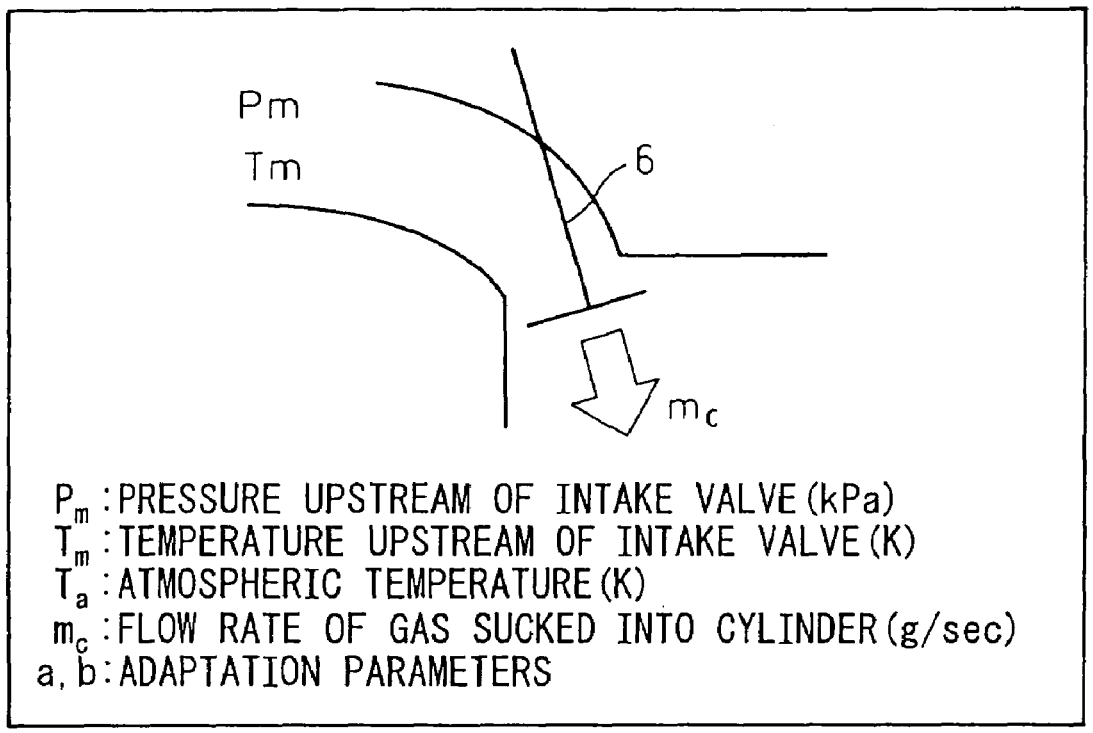
FIG. 8 is a view of the basic concept of an intake valve model.

Note that equation (7) relates to the intake valve 6. It deems that the cylinder inflow gas flow rate $m_c$ is proportional to the intake pipe pressure $P_m$ as explained in detail below based on the model such as shown in FIG. 8 and is derived from theory and experience. That is, the amount of cylinder inflow gas $M_c$ is finally established at the time of closing of the intake valve 6 and is proportional to the pressure inside the cylinder 5 at the time of closing of the intake valve 6. Here, the pressure in the cylinder 5 at the time of closing of the intake valve 6 is deemed to be equal to the pressure $P_m$ of the air upstream of the intake valve 6 (that is, the intake pipe pressure), so it is possible to approximate the amount of cylinder charging gas $M_c$ as being proportional to the intake pipe pressure $P_m$.

On the other hand, the amount of cylinder charging gas $M_c$ is found by integrating over time the flow rate $m_c$ of the air flowing into the cylinder 5 during the opening period of the intake valve 6 (cylinder inflow gas flow rate) over the opening period of the intake valve 6. That is, between the amount of cylinder charging gas $M_c$ and the cylinder inflow gas flow rate $m_c$, there is the relationship that the time integrated value of the cylinder inflow gas flow rate $m_c$ is the amount of cylinder charging gas $M_c$. In this way, since the amount of cylinder charging gas $M_c$ is proportional to the intake pipe pressure $P_m$ and there is the relationship of the time integrated value of the cylinder inflow gas flow rate $m_c$ being the amount of cylinder charging gas $M_c$ between the amount of cylinder charging gas $M_c$ and the cylinder inflow gas flow rate $m_c$, the cylinder inflow gas flow rate $m_c$ can also be deemed proportional to the intake pipe pressure $P_m$.

Therefore, with this method, the cylinder inflow gas flow rate $m_c$ is deemed proportional to the intake pipe pressure $P_m$ and equation (7) is derived from theory and experience. Note that the cylinder inflow gas flow rate $m_c$ calculated by equation (7) is the average value of the flow rate of air flowing out from the intake pipe portion per unit time, so by multiplying the cylinder inflow gas flow rate $m_c$ with the time taken for one cycle of the internal combustion engine divided by the number of cylinders, the amount of cylinder charging gas $M_c$ in each cylinder 5 is derived.

Figure 9:
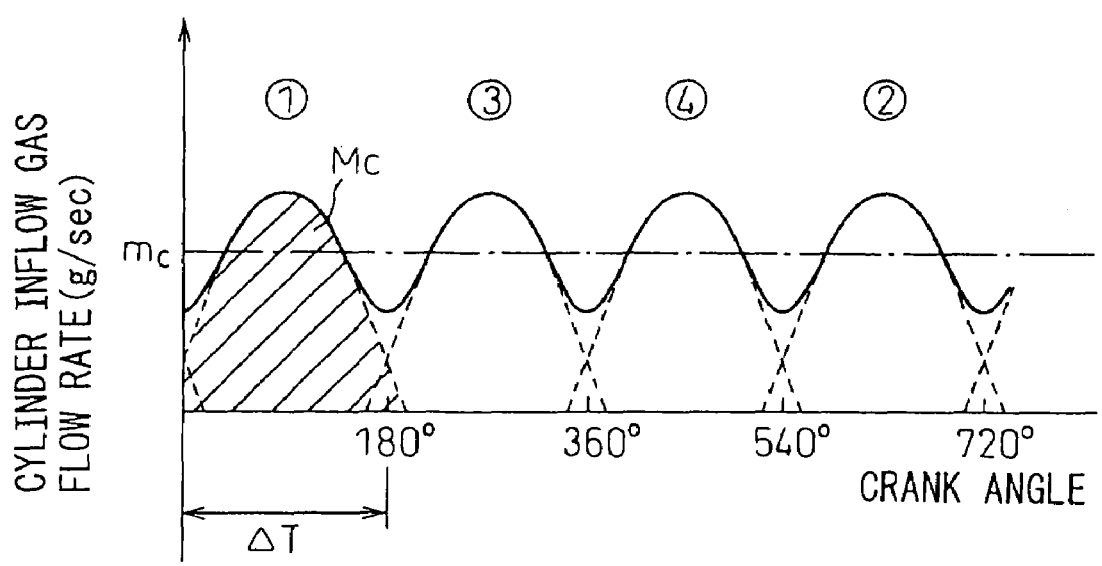
FIG. 9 is a view relating to the definitions of the amount of cylinder charging gas and the cylinder inflow gas flow rate.

Next, this will be explained referring to FIG. 9 taking as an example an internal combustion engine provided with four cylinders. In FIG. 9, the abscissa is the crank angle and the ordinate is the amount of air flowing from the intake pipe portion to the cylinder 5 per unit time. Further, in the example shown in FIG. 9, the intake stroke is performed in the order of the first cylinder #1, the third cylinder #3, the fourth cylinder #4, and the second cylinder #2. If the intake stroke is performed in this way, the flow rate of the air flowing from the intake pipe portion to each cylinder 5 changes as shown by the broken line in FIG. 9. As a result, the flow rate of the air flowing out from the intake pipe portion changes as shown by the solid line in FIG. 9.

Further, the mean value of the flow rate of the air flowing out from the intake pipe portion (solid line in FIG. 9) is the cylinder inflow gas flow rate $m_c$. In FIG. 9, it is shown by the broken line. Therefore, the amount of cylinder charging gas $M_c$ in each cylinder 5 is calculated by multiplying the cylinder inflow gas flow rate $m_c$ (broken line in FIG. 9) with the time required for one cycle of the internal combustion engine (in the example shown in FIG. 9, the time taken for the crankshaft to turn 720°) divided by the number of cylinders (in the example shown in FIG. 9, four), that is, in the example of FIG. 9, the time taken for the crankshaft to rotate 180°. Further, the amount of cylinder charging gas $M_c$ in each cylinder 5 calculated for example matches with the hatching in FIG. 9.

Next, the method of calculation of the amount of cylinder charging gas $M_c$ when applying the above cylinder inflow gas model M20 to an internal combustion engine will be explained. The amount of cylinder charging gas $M_c$ is found from equations (1) to (4) and (7) of the models of the cylinder inflow gas model M20, but these five equations are made discrete so as to enable processing by the ECU 31 when mounted in an internal combustion engine. That is, if making the time t and the calculation interval (calculation period) t, these five equations become discrete as the following equations (8) to (12).

$$m_t(t) = \mu_t(\theta_t(t)) \cdot A_t(\theta_t(t)) \cdot \frac{P_a}{\sqrt{R \cdot T_a}} \cdot \Phi\left(\frac{P_m(t)}{P_a}\right) \quad (8)$$

$$\Phi\left(\frac{P_m(t)}{P_a}\right) = \quad (9)$$

$$\begin{cases} \sqrt{\frac{\kappa}{2(\kappa+1)}} & \ldots \frac{P_m(t)}{P_a} \leq \frac{1}{\kappa+1} \\ \sqrt{\left[\left(\frac{\kappa-1}{2\kappa}\right) \cdot \left(1 - \frac{P_m(t)}{P_a}\right) + \frac{P_m(t)}{P_a}\right] \cdot \left(1 - \frac{P_m(t)}{P_a}\right)} & \ldots \frac{P_m(t)}{P_a} > \frac{1}{\kappa+1} \end{cases}$$

$$\frac{P_m}{T_m}(t + \Delta t) = \frac{P_m}{T_m}(t) + \Delta t \cdot \frac{R}{V} \cdot (m_t(t) - m_c(t)) \quad (10)$$

$$P_m(t + \Delta t) = P_m(t) + \Delta t \cdot \kappa \cdot \frac{R}{V} \cdot (m_t(t) \cdot T_a - m_c(t) \cdot T_m(t)) \quad (11)$$

-continued $$m_c(t) = \frac{T_a}{T_m(t)} \cdot (a \cdot P_m(t) - b) \qquad (12)$$

According to the cylinder inflow gas model M20 thus made discrete and mounted in the internal combustion engine, the throttle valve passage air flow rate $m_t(t)$ at the time t calculated in the throttle model M21, the cylinder inflow gas flow rate $m_c(t)$ at the time t calculated at the intake valve model M23, and the intake pipe temperature $T_m(t)$ at the time t are input to equations (10) and (11) of the intake pipe model M22, and equations (10) and (11) are solved to calculate the intake pipe pressure $P_m(t+\Delta t)$ and the intake pipe temperature $T_m(t+\Delta t)$ at the time $(t+\Delta t)$.

Further, the intake pipe pressure $P_m(t+\Delta t)$ calculated at the intake pipe model M22 and the throttle opening degree $\theta_t(t)$ at the time t are input to equations (8) and (9) of the throttle model M21, and these equations are solved to calculate the throttle valve passage air flow rate $m_t(t+\Delta t)$ at the time $(t+\Delta t)$. Further, the intake pipe pressure $P_m(t+\Delta t)$ and the intake pipe temperature $T_m(t+\Delta t)$ calculated at the intake pipe model M22 are input to equation (12) of the intake valve model M23, and this equation is solved to calculate the cylinder inflow gas flow rate $m_c(t+\Delta t)$ at the time $(t+\Delta t)$.

By repeating this calculation, the cylinder inflow gas flow rate $m_c$ at any time is calculated. Further, by multiplying the cylinder inflow gas flow rate $m_c$ calculated in this way by the time taken for one cycle divided by the number of cylinders as explained above, the amount of cylinder charging gas $M_c$ of each cylinder at any time is calculated.

Note that at the starting time of the internal combustion engine, that is, at the time t=0, the intake pipe pressure $P_m$ is considered to be equal to atmospheric pressure $P_a$ ($P_m(0)=P_a$), the intake pipe temperature $T_m$ is considered equal to the atmospheric temperature $T_a$ ($T_m(0)=T_a$), and the calculations at the models M21 to M23 are started. Further, it is also possible to continuously use the atmospheric pressure and atmospheric temperature at the time when the calculation at the model M20 is started as the atmospheric pressure $P_a$ and the atmospheric temperature $T_a$ used at the above-mentioned cylinder inflow gas model M20 and it is also possible to use the atmospheric pressure $P_a(t)$ and atmospheric temperature $T_a(t)$ at the time t.

Next, a cylinder inflow gas model able to be applied to an internal combustion engine with the EGR device shown in FIG. 1 will be explained. If the flow rate of the air (fresh air) in the gas flowing into the cylinder is called the cylinder inflow fresh air flow rate $m_{c-air}$, the cylinder inflow fresh air flow rate $m_{c-air}$ is found from the following equation (13):

$$m_{c-air} = m_c - m_{c-egr} \qquad (13)$$

In equation (13), $m_c$ is the cylinder inflow gas flow rate defined as the flow rate of the gas flowing into the cylinder, and $m_{c-egr}$ is the cylinder inflow EGR gas flow rate defined as the flow rate of the exhaust gas in the gas flowing into the cylinder.

Here, in the case of steady state operation (for example, in the case where the throttle valve opening degree, EGR opening degree, engine speed, etc. are maintained substantially constant), the flow rate $m_{egr}$ of the exhaust gas passing through the EGR control valve 22 (hereinafter called the "EGR control valve passage gas flow rate") and the cylinder inflow EGR gas flow rate $m_{c-egr}$ are equal ($m_{c-egr} = m_{egr}$).

Therefore, equation (13) can be rewritten to the following equation (14):

$$m_{c-air} = m_c - m_{egr} \qquad (14)$$

Figure 10:
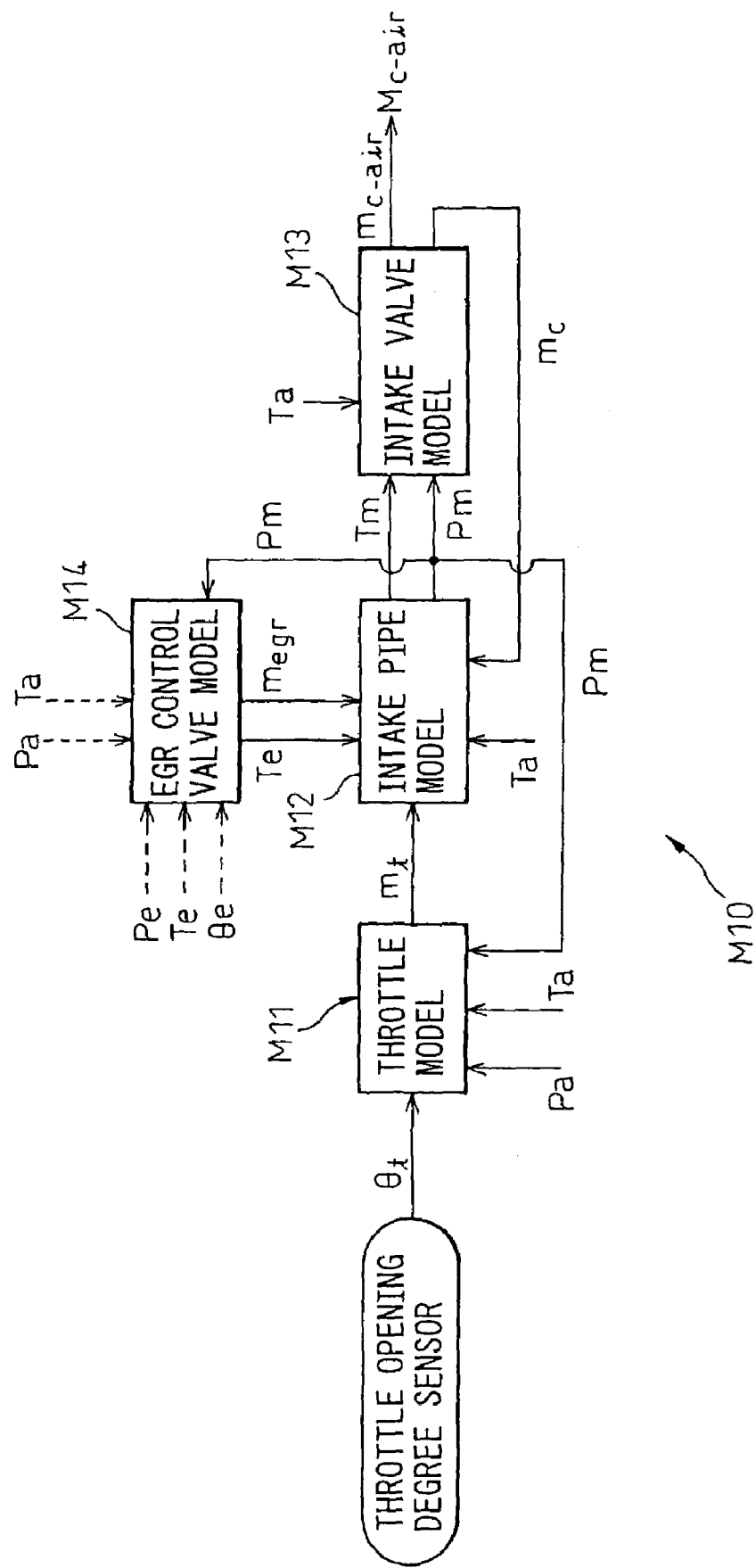
FIG. 10 is a view of a cylinder inflow gas model of the present invention able to be applied to an internal combustion engine provided with an EGR system.

Therefore, if the cylinder inflow gas flow rate $m_c$ and the EGR control valve passage gas flow rate $m_{egr}$ are found, the cylinder inflow fresh air flow rate $m_{c-air}$ is found and therefore the amount of cylinder charging fresh air $M_{c-air}$ defined as the amount of air (fresh air) charged in the cylinder 5 at the time of closing of the intake valve 6 is found. Therefore, in the first embodiment, the model M10 shown in FIG. 10 is used as the cylinder inflow gas model for calculating the cylinder inflow gas flow rate $m_c$. The cylinder inflow gas model M10 shown in FIG. 10 is comprised of the throttle model M11, the intake pipe model M12, the intake valve model M13, and the EGR control valve model M14.

The throttle model M11 is a model the same as the throttle model M21 shown in FIG. 2. The intake valve model M13 is also the same model as the intake valve model M23 shown in FIG. 2. Therefore, a detailed explanation will be omitted. Explained simply, however, in the throttle model M11, the throttle opening degree $\theta_t$, the atmospheric pressure $P_a$, the atmospheric temperature $T_a$, and the intake pipe pressure $P_a$ are input to equation (1), and the equation is solved to calculate the throttle valve passage air flow rate $m_t$, while in the intake valve model M13, the atmospheric temperature $T_a$, the intake pipe pressure $P_a$, and the intake pipe temperature $T_m$ are input to equation (7), and this equation is solved to calculate the cylinder inflow gas flow rate $m_c$.

The intake pipe model M12 is input with the throttle valve passage air flow rate $m_t$ calculated at the throttle model M11, the cylinder inflow gas flow rate $m_c$ calculated at the intake valve model M13, the atmospheric temperature $T_a$, and the flow rate $m_{egr}$ of the exhaust gas passing through the EGR control valve 22 per unit time calculated at the EGR control valve model M14 (hereinafter called the "EGR control valve passage gas flow rate"), and the intake pipe pressure $P_m$ and the intake pipe temperature $T_m$ are calculated from these input parameters.

Further, the EGR control valve model M14 is input with the EGR opening degree $\theta_e$, the atmospheric pressure $P_a$, the atmospheric temperature $T_a$, and the intake pipe pressure $P_m$ and exhaust temperature $T_e$ calculated at the intake pipe model M12. In the model M14, the EGR control valve passage gas flow rate $m_{egr}$ is calculated from these input parameters. As will be understood from FIG. 10, in the cylinder inflow gas model M10, parameter values calculated in the different models are utilized as parameter values input to separate models, so the only parameter values actually input to the cylinder inflow gas model M10 are the four parameters of the throttle opening degree $\theta_t$, the EGR opening degree $\theta_e$, the atmospheric pressure $P_a$, and the atmospheric temperature $T_a$. That is, according to the present embodiment, it can be said that the amount of cylinder charging gas $M_c$ is calculated from these four parameters.

Next, the intake pipe model M12 and the EGR control valve model M14 will be explained in detail. In the intake pipe model M12, the throttle valve passage air flow rate $m_t$, the cylinder inflow gas flow rate $m_c$, the atmospheric temperature $T_a$, the EGR control valve passage gas flow rate $m_{egr}$, and the exhaust temperature $T_e$ are input to the following equations (15) and (16), and these equations are solved to calculate the intake pipe pressure $P_m$ and the intake pipe temperature $T_m$:

$$\frac{d}{dt}\left(\frac{P_m}{T_m}\right) = \frac{R}{V} \cdot (m_t + m_{egr} - m_c) \qquad (15)$$

$$\frac{dP_m}{dt} = \kappa \cdot \frac{R}{V} \cdot (m_t \cdot T_a + m_{egr} \cdot T_e - m_c \cdot T_m) \qquad (16)$$

In equations (15) and (16) as well, V is the volume of the intake pipe portion from the throttle valve 18 to the intake valve 6 and is usually a constant value.

Figure 11:
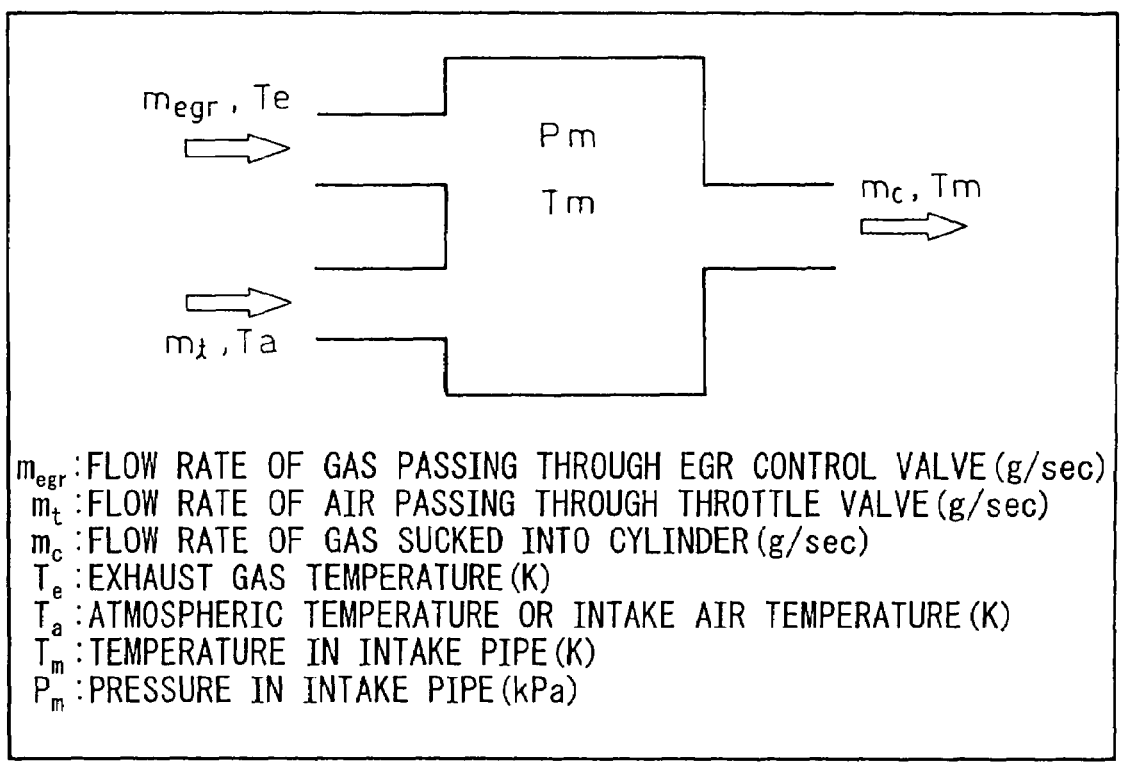
FIG. 11 is a view of the basic concept of an intake pipe model able to be applied to an internal combustion engine provided with an EGR system.

Note that as explained relating to the above intake pipe model M22, these equations (15) and (16) are derived from the relationship standing among the air flowing into the intake pipe portion, the exhaust gas flowing into the intake pipe portion, and the gas flowing out from the intake pipe portion and flowing into the cylinder based on the model such as shown in FIG. 11 relating to the intake pipe portion under the law of conservation of mass and the law of conservation of energy.

Further, in the EGR control valve model M14, by inputting the EGR opening degree $\theta_e$, the intake pipe pressure $P_m$, the exhaust pressure $P_e$, and the exhaust temperature $T_e$ into the following equation (17), the EGR control valve passage gas flow rate $m_{egr}$ is calculated:

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right) \qquad (17)$$

In equation (17), $\mu_e$ is the flow rate coefficient in the EGR control valve 22 and a function of the EGR opening degree $\theta_e$. Further, $A_e$ is the opening sectional area of the EGR control valve 22 and a function of the EGR opening degree $\theta_e$. Further, R is a constant relating to the gas constant and is a value obtained by dividing the so-called gas constant R* by the mass $M_e$ of the exhaust gas per mole ($R_e$=R*/$M_e$).

Further, $P_e$ is the pressure of the exhaust gas upstream of the EGR control valve 22, while $T_e$ is the temperature of the exhaust gas upstream of the EGR control valve 22. Further, $\Phi(P_m/P_e)$ is a function having $P_m/P_e$ as a variable as shown in the following equation (18):

$$\Phi\left(\frac{P_m(t)}{P_e}\right) = \qquad (18)$$

$$\begin{cases} \sqrt{\frac{\kappa}{2(\kappa+1)}} & \cdots \frac{P_m(t)}{P_e} \leq \frac{1}{\kappa+1} \\ \sqrt{\left[\left(\frac{\kappa-1}{2\kappa}\right) \cdot \left(1 - \frac{P_m(t)}{p_e}\right) + \frac{P_m(t)}{P_e}\right] \cdot \left(1 - \frac{P_m(t)}{P_e}\right)} & \cdots \frac{P_m(t)}{P_e} > \frac{1}{\kappa+1} \end{cases}$$

This equation (18) is one in which the variable $P_m/P_a$ of equation (2) is replaced by the variable $P_m/P_e$. Therefore, $\kappa$ is the specific heat ratio and is a constant value in this embodiment.

Further, there is the relationship shown in FIG. 5 between the function $\Phi(P_m/P_e)$ and $P_m/P_e$. Therefore, instead of equation (18), it is also possible to store a map for calculating the function $\Phi(P_m/P_e)$ having $P_m/P_e$ as a variable in the ROM 34 in advance and calculate the value of the function $\Phi(P_m/P_e)$ from this map.

Figure 12:
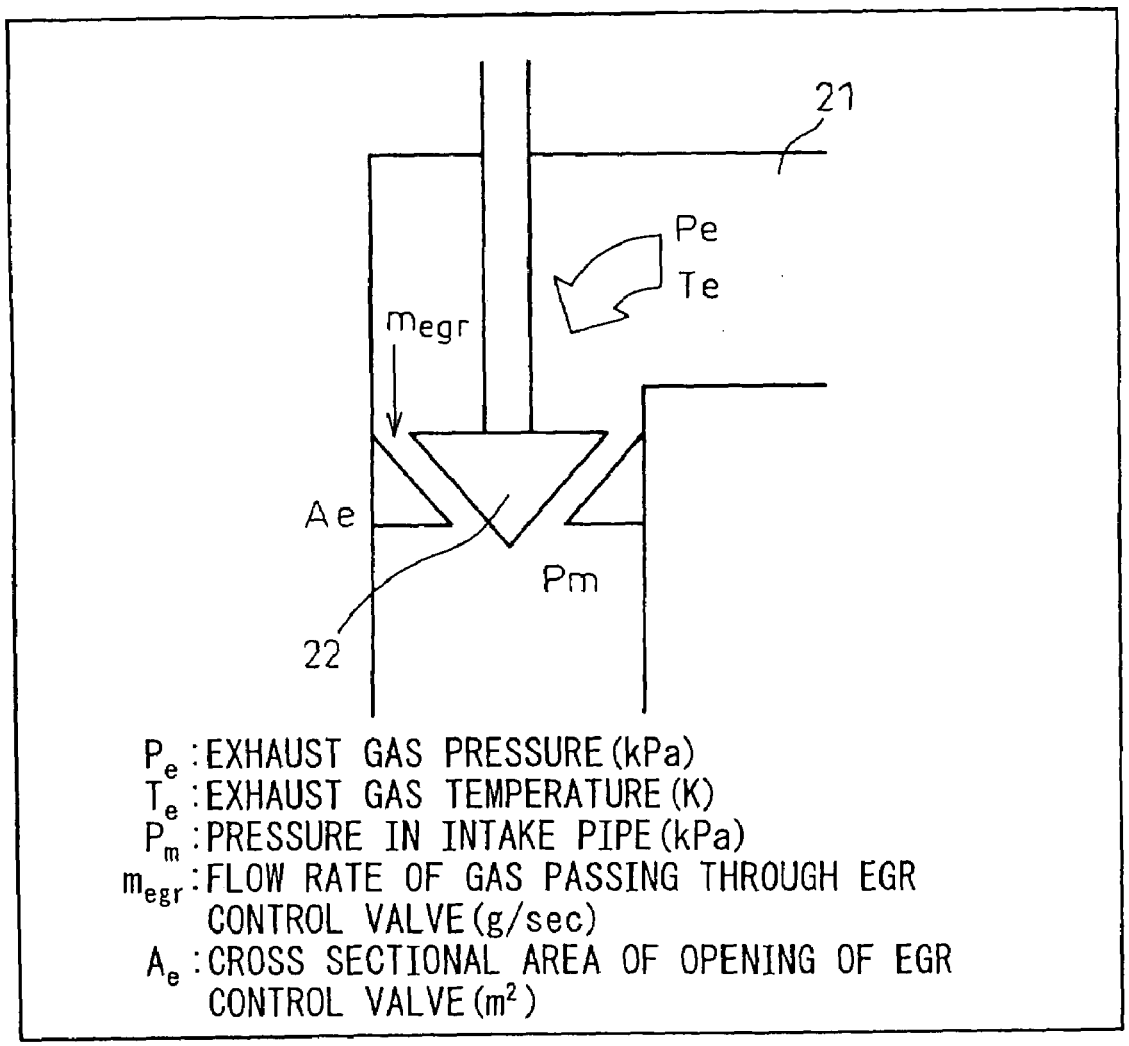
FIG. 12 is a view of the basic concept in the calculation of an EGR control valve passage gas flow rate.

Note that these equations (17) and (18) use the pressure of the exhaust gas upstream of the EGR control valve 22 as the exhaust pressure $P_e$, use the temperature of the exhaust gas upstream of the EGR control valve 22 as the exhaust gas temperature $T_e$, and use the pressure of the exhaust gas passing through the EGR control valve 22 as the intake pipe pressure $P_m$ and are derived utilizing the relation standing between the exhaust gas upstream of the EGR control valve 22 and the exhaust gas passing through the EGR control valve 22 under the law of conservation of mass, law of conservation of energy, and law of conservation of momentum based on a model such as shown in FIG. 12 for the EGR control valve 22, the equation of state of a gas, the definition of the specific heat ratio, and Meyer's Relation. That is, the basic thinking in deriving equations (17) and (18) is similar to the thinking in deriving equations (1) and (2) for calculating the throttle valve passage air flow rate.

In this way, according to the present embodiment, the exhaust pressure $P_e$, the exhaust temperature $T_e$, the intake pipe pressure $P_m$, and the EGR opening degree $\theta_e$ are input to the calculation equations and numerical calculations are performed, whereby the EGR control valve passage gas flow rate is calculated. Therefore, the number of maps utilized at this time becomes smaller, so the labor involved in preparing the maps can be greatly reduced.

Next, the method of calculation of the amount of cylinder charging fresh air $M_{c-air}$ when mounting the cylinder inflow gas model M10 in an internal combustion engine will be explained. The amount of cylinder charging fresh air $M_{c-air}$ is found from equations (1), (2), (7), and (15) to (18) of the models of the cylinder inflow gas model M10. When mounted in an internal combustion engine, these seven equations are made discrete so as to be able to be processed by the ECU 31. That is, if the time is t and the calculation interval (calculation period) is $\Delta t$, equations (1) and (7) are made discrete as the above equations (8), (9), and (12). Further, equations (15) to (18) are made discrete as the following equations (19) to (22):

$$\frac{P_m}{T_m}(t + \Delta t) = \frac{P_m}{T_m}(t) + \Delta t \cdot \frac{R}{V} \cdot (m_t(t) + m_{egr}(t) - m_c(t)) \qquad (19)$$

$$P_m(t + \Delta t) = P_m(t) + \Delta t \cdot \kappa \cdot \frac{R}{V}(m_t(t) \cdot T_a + m_{egr}(t) \cdot T_e(t) - m_c(t) \cdot T_m(t)) \qquad (20)$$

$$m_{egr}(t) = \mu_e(\theta_e(t)) \cdot A_e(\theta_e(t)) \cdot \frac{P_e(t)}{\sqrt{R \cdot T_e}} \Phi\left(\frac{P_m(t)}{P_e(t)}\right) \qquad (21)$$

$$\Phi\left(\frac{P_m(t)}{P_e(t)}\right) = \qquad (22)$$

$$\begin{cases} \sqrt{\frac{\kappa}{2(\kappa+1)}} & \cdots \frac{P_m(t)}{P_e(t)} \leq \frac{1}{\kappa+1} \\ \sqrt{\left[\left(\frac{\kappa-1}{2\kappa}\right) \cdot \left(1 - \frac{P_m(t)}{P_e(t)}\right) + \frac{P_m(t)}{P_e(t)}\right] \cdot \left(1 - \frac{P_m(t)}{P_e(t)}\right)} & \cdots \frac{P_m(t)}{P_e(t)} > \frac{1}{\kappa+1} \end{cases}$$

Further, the equations for calculating the exhaust pressure $P_e$ and the exhaust temperature $T_e$ are also made discrete such as in the following equations (23) and (24). Details of these equations will be explained later.

$$P_e(t) = f_1(KL(t), NE(t)) \qquad (23)$$

$$T_e(t) = f_2(m_{egr}(t - \Delta t), NE(t)) \qquad (24)$$

According to the cylinder inflow gas model M10 made discrete and mounted in an internal combustion engine in this way, by inputting the throttle valve passage air flow rate $m_t(t)$ at the time t calculated at the throttle model M11, the amount of EGR control valve passage gas $m_{egr}(t)$ at the time t calculated at the EGR control valve model M14, the cylinder inflow gas flow rate $m_c(t)$ at the time t calculated at the intake valve model M13, and the exhaust gas temperature $T_e(t)$ at the time t into equations (19) and (20) of the intake pipe model M12 and solving these equations, the intake pipe pressure $P_m(t+\Delta t)$ and the intake pipe temperature $T_m(t+\Delta t)$ at the time $(t+\Delta t)$ are calculated.

Further, by inputting the intake pipe pressure $P_m(t+\Delta t)$ at the time $(t+\Delta t)$ calculated at the intake pipe model M12 and the throttle opening degree $\theta_t(t+\Delta t)$ at the same time $(t+\Delta t)$ into equations (8) and (9) of the throttle model M11 and solving these equations, the throttle valve passage air flow rate $m_t(t+\Delta t)$ at the time $(t+\Delta t)$ is calculated. Further, by inputting the intake pipe pressure $P_m(t+\Delta t)$ and the intake pipe temperature $T_m(t+\Delta t)$ at the time $(t+\Delta t)$ calculated at the intake pipe model M12 into equation (12) of the intake valve model M13 and solving this equation, the cylinder inflow gas flow rate $m_c(t+\Delta t)$ at the time $(t+\Delta t)$ is calculated.

Further, by inputting the cylinder inflow gas flow rate $m_c(t+\Delta t)$ at the time $(t+\Delta t)$ calculated at the intake pipe model M12 and the EGR control valve passage gas flow rate $m_{egr}(t)$ at the time t calculated at the EGR control valve model M14 in the previous routine into equation (14) and solving this equation, the cylinder inflow fresh air flow rate $m_{c\text{-}air}(t+\Delta t)$ at the time $(t+\Delta t)$ is calculated.

Further, by inputting the intake pipe pressure $P_m(t+\Delta t)$ at the time $(t+\Delta t)$ calculated at the intake pipe model M12, the exhaust pressure $P_e(t+\Delta t)$ at the same time $(t+\Delta t)$, and the EGR opening degree $\theta_e(t+\theta t)$ at the same time $(t+\theta t)$ into equations (21) and (22) of the EGR control valve model M14 and solving these equations, the EGR control valve passage gas flow rate $m_{egr}(t+\Delta t)$ at the time $(t+\Delta t)$ is calculated. Further, by inputting the engine load factor $KL(t+\Delta t)$ at the time $(t+\Delta t)$ and the engine speed NE at the same time $(t+\Delta t)$ into equation (23) and solving the equation, the exhaust pressure $P_e(t+\Delta t)$ at the time $(t+\Delta t)$ is calculated.

Further, by inputting the EGR control valve passage gas flow rate $m_{egr}(t)$ at the time t and the engine speed $NE(t+\Delta t)$ at the time $(t+\Delta t)$ into equation (24) and solving this equation, the exhaust temperature $T_e(t+\Delta t)$ at the time $(t+\Delta t)$ is calculated. The thus calculated $m_c(t+\Delta t)$, $m_{egr}(t+\Delta t)$, and $m_t(t+\Delta t)$ are again input to equations (19) and (20) of the intake pipe model M12. By repeating such calculations, the cylinder inflow fresh air flow rate $m_{c\text{-}air}$ at any time is calculated. Further, by multiplying the thus calculated cylinder inflow fresh air flow rate $m_{c\text{-}air}$ with the time taken for one cycle divided by the number of cylinders as explained above, the amount of cylinder charging fresh air $M_{c\text{-}air}$ of each cylinder at any time is calculated.

Note that at the time of startup of the internal combustion engine, that is, at the time t=0, the intake pipe pressure $P_m$ is considered equal to the atmospheric pressure $P_a$ ($P_m(0)=P_a$), the intake pipe temperature $T_m$ and exhaust temperature $T_e$ are considered equal to the atmospheric temperature $T_a$ ($T_m(0)=T_a$, $T_e(0)=T_a$), and the calculation at the models M11 to M13 are started. Further, as the atmospheric pressure $P_a$ and the atmospheric temperature $T_a$ used at the abovementioned cylinder inflow gas model M10, the atmospheric pressure and the atmospheric temperature when the calculation at the model M10 is started may also be continuously used. It is also possible to use the atmospheric pressure $P_a(t)$ and the atmospheric temperature $T_e(t)$ at the time t.

Further, in the present embodiment, the EGR control valve passage gas flow rate $m_{egr}$ is calculated from equation (17) utilizing the four parameters of the exhaust pressure $P_e$, the exhaust temperature $T_e$, the intake pipe pressure $P_m$, and the EGR opening degree $\theta_e$, but it is also possible to find the EGR control valve passage gas flow rate $m_{egr}$ from an equation utilizing these four parameters, but differing from equation (17) or to find the EGR control valve passage gas flow rate $m_{egr}$ from a map using these four parameters as arguments.

Further, according to the present embodiment, the EGR control valve passage gas flow rate is precisely calculated, so the amount of cylinder charging fresh air calculated based on the EGR control valve passage gas flow rate is also precisely calculated and therefore the fuel injection amount for making the air-fuel ratio the target air-fuel ratio is precisely calculated. Further, it is also possible to utilize the EGR control valve passage gas flow rate calculated in accordance with the present embodiment for feedback control of the EGR opening degree so that the amount of EGR control valve passage gas becomes the target value.

Next, the method of derivation of equation (23) for calculating the exhaust pressure will be explained. The engine load factor (%) is the ratio of the amount (g) of the air actually charged in the cylinder with respect to the amount (g) of gas occupying the maximum volume of the cylinder in the standard state and is found from the following equation (25):

$$KL(\%) = \frac{M_{c\text{-}air}}{\frac{DSP}{NCYL} \cdot \rho_{astd}} \cdot 100 \quad (25)$$

In equation (25), $M_{c\text{-}air}$ is the amount of cylinder charging fresh air (g) defined as the amount of fresh air being charged into each cylinder when the intake valve is closed, DSP is the displacement of the internal combustion engine (liters), NCYL is the number of cylinders, and $\rho_{astd}$ is the density of the air at the standard state (1 atmosphere, 25° C.) (about 1.2 g/liter).

Figure 13:
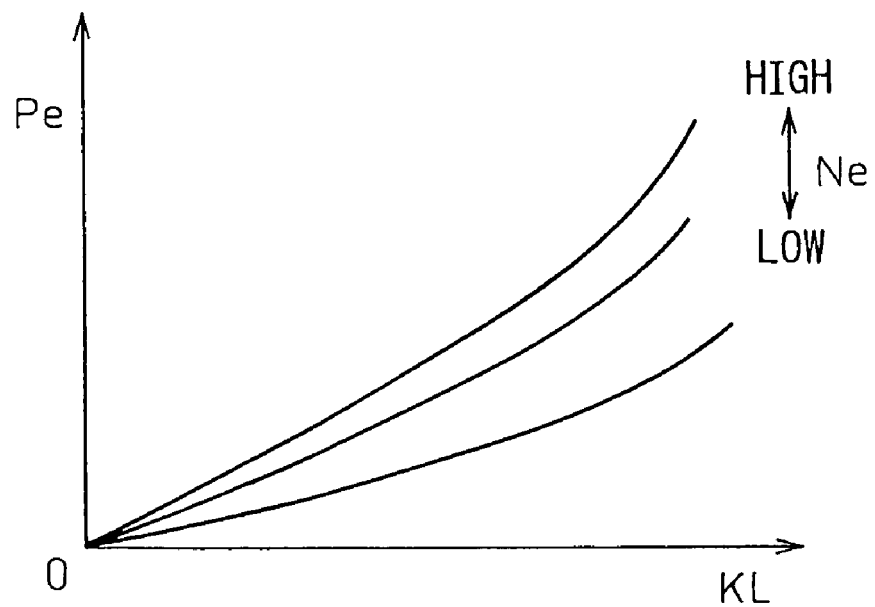
FIG. 13 is a view of a relationship of an engine load factor and an exhaust pressure.

Referring to FIG. 13 showing the relationship among the engine load factor KL, the engine speed NE, and the exhaust pressure $P_e$, it is learned that if the engine load factor KL becomes larger, the exhaust pressure $P_e$ becomes higher and that if the engine speed NE becomes higher, the exhaust pressure $P_e$ becomes higher. Further, the exhaust pressure $P_e$ is mainly largely dependent on the engine load factor KL and the engine speed NE, so the precision of the exhaust pressure found from the engine load factor KL and the engine speed NE is relatively high.

Therefore, the exhaust pressure $P_e$ can be represented by a function $f_1$ (KL, NE) having the engine load factor KL and the engine speed NE as variables as shown in equation (23). In the first embodiment, this function $f_1$ (KL, NE) is stored in advance in the ROM 34 as a map having the engine load factor KL and the engine speed NE as variables, and the exhaust pressure $P_e$ is calculated from the engine load factor KL, the engine speed NE, and this map. According to this, it is not necessary to provide a sensor for detecting the exhaust pressure in the internal combustion engine, so it is possible to precisely detect the exhaust pressure while keeping down the cost of the internal combustion engine and in turn it is possible to precisely detect the EGR control valve passage gas flow rate $m_{egr}$.

Further, in an internal combustion engine with an EGR device, when detecting the exhaust pressure using a map without using a sensor, it was necessary to use a large number of parameters such as the engine speed, fuel injection amount, fuel ignition timing, and EGR rate (ratio of amount (g) of exhaust gas with respect to the amount of gas (g) charged in the cylinder) as arguments. However, in the present embodiment, by using the engine load factor as a parameter, it is sufficient to use a map using the engine load factor and the engine speed as arguments, so according to the present embodiment, the labor involved in preparing maps can be reduced. Of course, if the increased cost of the internal combustion engine is not problematic, it is also possible to detect the exhaust pressure using a sensor.

Further, in the case of calculating the exhaust pressure from the above function $f_1$, instead of the engine speed NE, it is also possible to use the cylinder charging fresh air flow rate $m_{c-air}$ as a variable.

Figure 14:
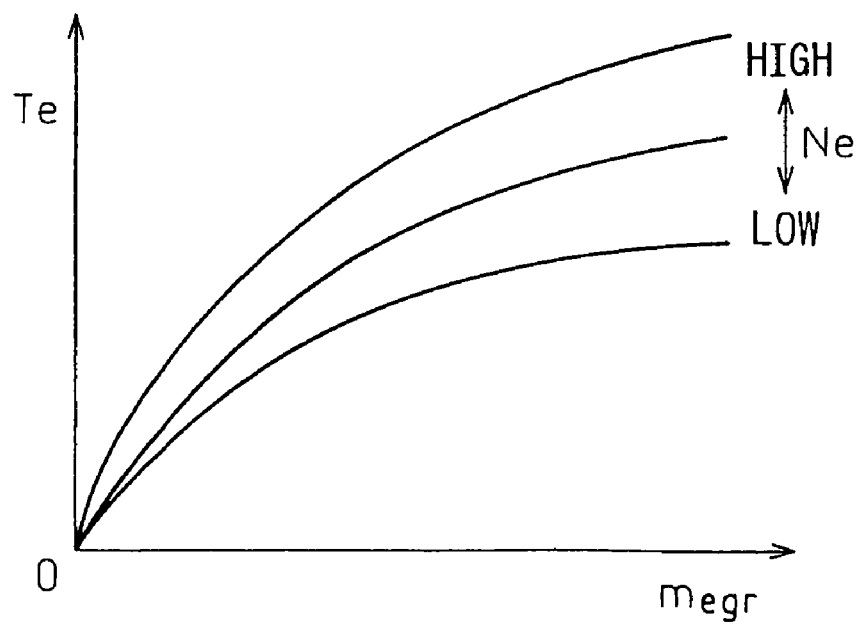
FIG. 14 is a view of a relationship of an EGR control valve passage gas flow rate and exhaust temperature.

Next, the method of derivation of the equation (24) for calculating the exhaust temperature $T_e$ will be explained. If the amount of heat caused by the exhaust gas newly flowing into the EGR passage 21 is called the "input amount of heat" and the amount of heat discharged from the EGR passage 21 into the atmosphere is called the "amount of discharged heat", if the EGR control valve passage gas flow rate $m_{egr}$ becomes larger, that is, if the amount of exhaust gas flowing into the EGR passage 21 becomes greater, the amount of input heat will become greater than the amount of discharged heat. Therefore, if the EGR control valve passage gas flow rate $m_{egr}$ becomes greater, the exhaust temperature will become higher. Further, if the engine speed becomes higher, the temperature itself of the exhaust gas discharged from the cylinder will become higher. That is, the relationship between the EGR control valve passage gas flow rate $m_{egr}$, the engine speed NE, and the exhaust temperature $T_e$ becomes as shown in FIG. 14.

Further, the exhaust temperature $T_e$ is greatly dependent on the EGR control valve passage gas flow rate $m_{egr}$ and engine speed NE, so the precision of the exhaust temperature found from the EGR control valve passage gas flow rate $m_{egr}$ and the engine speed NE is relatively high. Therefore, the exhaust temperature $T_e$ is represented by a function $f_2$ ($m_{egr}$, NE) having the EGR control valve passage gas flow rate $m_{egr}$ and the engine speed NE as variables as shown in equation (24). In the first embodiment, this function $f_2$ ($m_{egr}$, NE) is stored in advance in the ROM 34 in the form of a map using the EGR control valve passage gas flow rate $m_{egr}$ and engine speed NE as variables and the exhaust temperature $T_e$ is calculated from the EGR control valve passage gas flow rate $m_{egr}$, the engine speed NE, and this map.

According to this, it is not necessary to provide a sensor for detecting the exhaust temperature in the internal combustion engine, so it is possible to precisely detect the exhaust temperature while keeping down the cost of the internal combustion engine and in turn it is possible to precisely calculate the EGR control valve passage gas flow rate $m_{egr}$. Of course, if the increased cost of the internal combustion engine is not problematic, it is also possible to detect the exhaust temperature using a sensor.

Further, as explained above, the temperature of the exhaust gas exhausted from the cylinder changes in accordance with the engine speed NE, so it is possible to find the temperature of the exhaust gas from a one-dimensional map using the engine speed NE as an argument. However, when calculating the EGR control valve passage gas flow rate $m_{egr}$ at the EGR control valve model M14, as the exhaust temperature $T_e$, it is possible to calculate the EGR control valve passage gas flow rate $m_{egr}$ more precisely when using the temperature of the exhaust gas upstream of the EGR control valve 22 rather than using the temperature of the exhaust gas exhausted from the cylinder. According to the present embodiment, the temperature of the exhaust gas upstream of the EGR control valve 22 is used as the exhaust temperature $T_e$ used for calculating the EGR control valve passage gas flow rate $m_{egr}$, so it is possible to precisely calculate the EGR control valve passage gas flow rate $m_{egr}$.

Further, when calculating the exhaust temperature from the above-mentioned function $f_2$, as the variable, it is also possible to use the cylinder charging fresh air flow rate $m_{c-air}$ instead of the engine speed.

The above embodiment, however, is predicated on steady state operation. Therefore, it is considered that the flow rate of the exhaust gas flowing into the intake pipe portion (hereinafter called the "intake pipe inflow exhaust gas flow rate") is equal to the EGR control valve passage gas flow rate and the flow rate of the exhaust gas flowing into the cylinder (hereinafter called the "cylinder inflow exhaust gas flow rate") is equal to the EGR control valve passage gas flow rate.

However, at the time of transient operation, if for example the EGR opening degree changes and the EGR control valve passage gas flow rate changes, the intake pipe inflow exhaust gas flow rate and the cylinder inflow exhaust gas flow rate temporarily become unequal to the EGR control valve passage gas flow rate. That is, these intake pipe inflow exhaust gas flow rate and cylinder inflow exhaust gas flow rate change with a lag while tracking changes of the EGR control valve passage gas flow rate. Therefore, at the time of transient operation, to maintain the precision of the parameter values calculated in the above embodiment high, it is necessary to consider that the intake pipe inflow exhaust gas flow rate and cylinder inflow exhaust gas flow rate change with a lag from a change of the EGR control valve passage gas flow rate.

Figure 15:
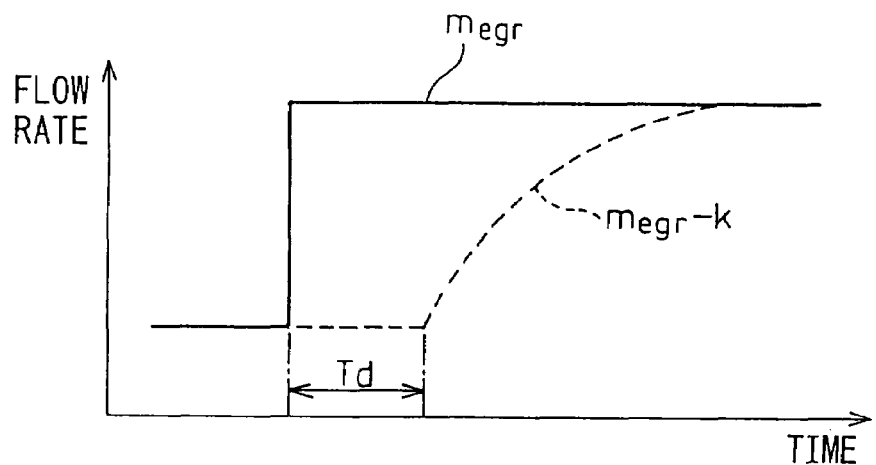
FIG. 15 is a view of a change of an inflow exhaust gas recirculation rate when the EGR control valve passage gas flow rate changes.

If considering the intake pipe inflow exhaust gas flow rate when the EGR control valve passage gas flow rate changes, as shown in FIG. 15, the intake pipe inflow exhaust gas flow rate $m_{egr-k}$ does not change until a certain time Td elapses from when the EGR control valve passage gas flow rate $m_{egr}$ changes. After this certain time Td elapses, it changes toward the EGR control valve passage gas flow rate $m_{egr}$ while being accompanied by a first-order lag.

Here, the certain time Td is the time required until the exhaust gas passing through the EGR control valve 22 reaches the intake pipe portion. The faster the flow rate of the exhaust gas passing through the EGR control valve 22, therefore the lower the intake pipe pressure and therefore the larger the engine speed, the shorter the time Td. That is, the certain time Td (hereinafter called the "dead time") is a function of the engine speed as shown in FIG. 16A.

On the other hand, the time constant $\tau$ of the first-order lag represents the ease of diffusion of the exhaust gas passing through the EGR control valve 22. The faster the flow rate of the exhaust gas passing through the EGR control valve 22, therefore the lower the intake pipe pressure and therefore the larger the engine speed, the smaller the time constant $\tau$. That is, the time constant $\tau$, as shown in FIG. 16B, is a function of the engine speed.

Figure 16A:
FIG. 16A is a view of a relationship of an engine speed NE and a dead time Td1 relating to an inflow exhaust gas recirculation rate.

Therefore, in the present embodiment, the dead time Td1 is stored in advance in the ROM 34 in the form of a map as shown in FIG. 16A. When the EGR control valve passage gas flow rate changes, the dead time Td1 is calculated based on the engine speed NE. It is assumed that the intake pipe inflow exhaust gas flow rate starts changing toward the EGR control valve passage gas flow rate after the elapse of this dead time Td1 so as to calculate the intake pipe inflow exhaust gas flow rate. Further, in the present embodiment, the time constant $\tau 1$ is stored in advance in the ROM 34 in the form of a map as shown in FIG. 16B. The time constant $\tau 1$ is calculated based on the engine speed NE when the EGR control valve passage gas flow rate changes. It is assumed that the intake pipe inflow exhaust gas flow rate changes toward the EGR control valve passage gas flow rate by this time constant $\tau 1$ from when the dead time Td1 elapses so as to calculate the intake pipe inflow exhaust gas flow rate.

Figure 16B:
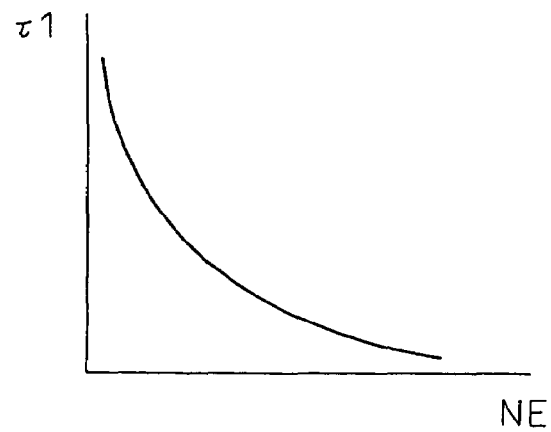
FIG. 16B is a view of a relationship of an engine speed NE and a time constant τ1 relating to an inflow exhaust gas recirculation rate.

Specifically, if representing the calculation period of the EGR control valve passage gas flow rate $m_{egr}$ as $\Delta t$(sec) and representing the number of calculations of the EGR control valve passage gas flow rate $m_{egr}$ by k, the EGR control valve passage gas flow rate $m_{egr}(k)$ at the k-th calculation routine is calculated, then the time constant $\tau 1$ is read from the map as shown in FIG. 16B based on the engine speed NE at this time and the time constant $\tau 1$ is utilized for first-order lag processing of the EGR control valve passage gas flow rate $m_{egr}(k)$ in accordance with the following equation (26) so as to calculate the intake pipe inflow exhaust gas flow rate $m'_{egr\text{-}k}(k)$ accompanied with the first-order lag at the time of the k-th calculation routine:

$$m'_{egr\text{-}k}(k) = m'_{egr\text{-}k}(k-1) + \Delta t/\tau 1 \cdot (m_{egr}(k) - m'_{egr\text{-}k}(k-1)) \quad (26)$$

Further, the dead time Td1 is read from the map shown in FIG. 16A based on the engine speed NE at the time of the same k-th calculation routine. The dead time Td1 is utilized to calculate the number of dead routines Idx1 corresponding to the dead time Td1 in accordance with the following equation (27):

$$Idx1 = \frac{Td1}{\Delta t} \quad (27)$$

Next, this number of dead routines Idx1 is utilized for dead time processing of the intake pipe inflow exhaust gas flow rate $m'_{egr\text{-}k}(k)$ in accordance with the following equation (28) to calculate the intake pipe inflow exhaust gas flow rate $m_{egr\text{-}k}(k)$ at the time of the k-th calculation routine:

$$m_{egr\text{-}k}(k) = m'_{egr\text{-}k}(k - Idx1) \quad (28)$$

Figure 17A:
FIG. 17A is a view of a relationship of an engine speed NE and a dead time Td2 relating to a cylinder inflow exhaust gas recirculation rate.

The thinking of the dead time and first-order lag relating to the intake pipe inflow exhaust gas flow rate may be similarly applied to a cylinder inflow exhaust gas flow rate as well. That is, the dead time Td2 relating to the cylinder inflow exhaust gas flow rate is stored in advance in the ROM 34 in the form of a map as shown in FIG. 17A. When the EGR control valve passage gas flow rate changes, the dead time Td2 is calculated based on the engine speed NE. It is assumed that the cylinder inflow exhaust gas flow rate starts to change toward the EGR control valve passage gas flow rate after the elapse of the dead time Td2 so as to calculate the cylinder inflow exhaust gas flow rate.

Figure 17B:
FIG. 17B is a view of a relationship of an engine speed NE and a time constant τ2 relating to a cylinder inflow exhaust gas recirculation rate.

Further, the time constant $\tau 2$ relating to the cylinder inflow exhaust gas flow rate is stored in advance in the ROM 34 in the form of a map as shown in FIG. 17B. When the EGR control valve passage gas flow rate changes, the time constant $\tau 2$ is calculated based on the engine speed NE. It is assumed that the cylinder inflow exhaust gas flow rate changes toward the EGR control valve passage gas flow rate by this time constant $\tau 2$ after the dead time Td2 elapses so as to calculate the cylinder inflow exhaust gas flow rate.

Specifically, the EGR control valve passage gas flow rate $m_{egr}(k)$ at the k-th calculation routine is calculated, then the time constant $\tau 2$ is read from the map as shown in FIG. 17B based on the engine speed NE at this time and this time constant $\tau 2$ is utilized for first-order lag processing of the EGR control valve passage gas flow rate $m_{egr}(k)$ in accordance with the following equation (29) so as to calculate the cylinder inflow exhaust gas flow rate $m'_{egr\text{-}egr}(k)$ accompanied with the first-order lag at the time of the k-th calculation routine:

$$m'_{egr\text{-}egr}(k) = m'_{egr\text{-}egr}(k-1) + \Delta t/\tau 1 \cdot (m_{egr}(k) - m'_{egr\text{-}egr}(k-1)) \quad (29)$$

Further, the dead time Td2 is read from the map shown in FIG. 17A based on the engine speed NE at the time of the k-th calculation routine. The dead time Td2 is utilized to calculate the number of dead routines Idx2 corresponding to the dead time Td2 in accordance with the following equation (30):

$$Idx2 = \frac{Td2}{\Delta t} \quad (30)$$

Next, this number of dead routines Idx2 is utilized for dead time processing of the cylinder inflow exhaust gas flow rate $m=_{egr\text{-}egr}(k)$ in accordance with the following equation (31) so as to calculate the cylinder inflow exhaust gas flow rate $m_{egr\text{-}egr}(k)$ at the time of the k-th calculation routine:

$$m_{egr\text{-}egr}(k) = m'_{egr\text{-}egr}(k - Idx2) \quad (31)$$

Note that the distance from the EGR control valve 22 to the cylinder is longer than the distance from the EGR control valve 22 to the intake pipe portion, so the dead time Td2 relating to the cylinder inflow exhaust gas flow rate tends to also be longer than the dead time Td1 relating to the intake pipe inflow exhaust gas flow rate, while the time constant $\tau 2$ relating to the cylinder inflow exhaust gas flow rate tends to be larger than the time constant $\tau 1$ relating to the intake pipe inflow exhaust gas flow rate.

FIG. 18 shows an example of the routine for calculating the cylinder inflow exhaust gas flow rate $m_{egr\text{-}egr}$ utilizing the first-order lag processing and dead time processing. In the routine shown in FIG. 18, first, at step 10, the EGR control valve passage gas flow rate $m_{egr}(k)$ is calculated in accordance with the above equation (17). Next, at step 11, the time constant $\tau 2$ is read from the map shown in FIG. 17B based on the engine speed NE.

Further, next, at step 12, the EGR control valve passage gas flow rate $m_{egr}(k)$ calculated at step 10 is subjected to first-order lag processing, whereby the cylinder inflow exhaust gas flow rate $m=_{egr\text{-}egr}(k)$ accompanied with first-order lag is calculated. That is, here, the above equation (29) is utilized. Next, at step 13, the dead time Td2 is read from the map shown in FIG. 17A based on the engine speed NE. Further, next, at step 14, the number of dead routines Idx2 is calculated in accordance with equation (30).

Figure 19A:
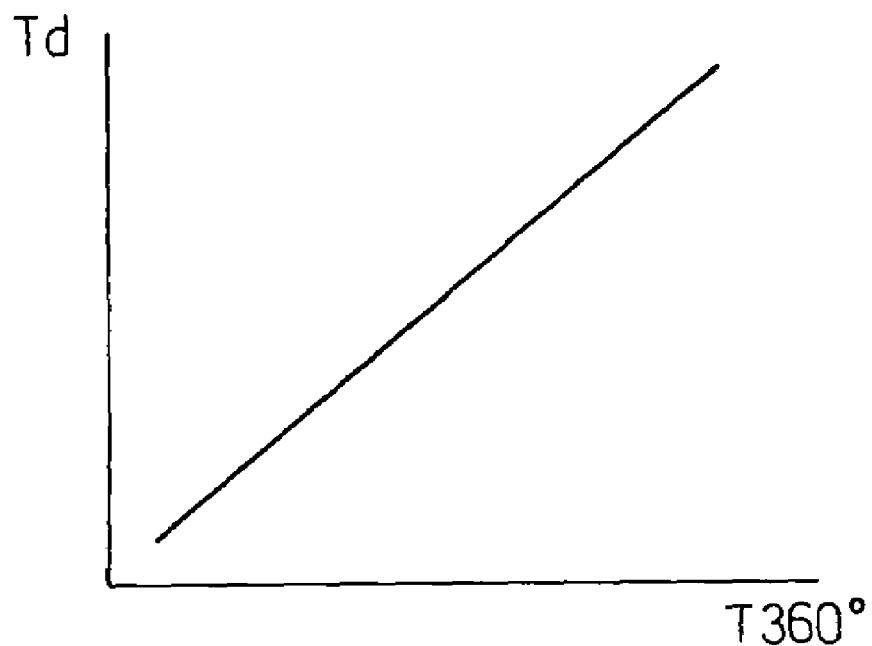
FIG. 19A is a view of a relationship between a time T360° taken for a crankshaft to rotate 360° and a dead time Td.
Figure 19B:
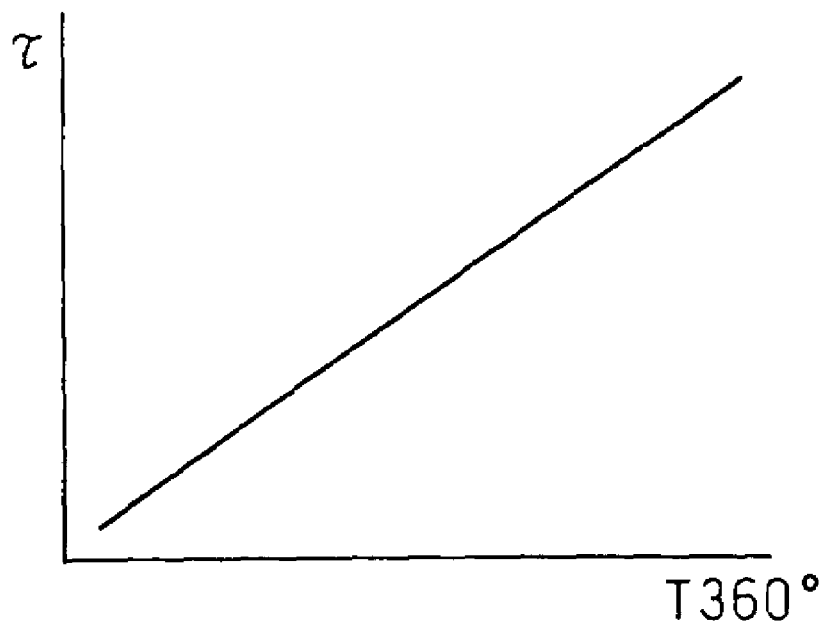
FIG. 19B is a view of a relationship between a time T360° taken for a crankshaft to rotate 360° and a time constant τ.

Next, at step 15, the cylinder inflow exhaust gas flow rate $m=_{egr\text{-}egr}(k)$ calculated at step 12 is subjected to dead time processing in accordance with equation (31). Note that in the above embodiment, the dead time Td (Td1, Td2) and the time constant $\tau$ ($\tau 1$, $\tau 2$) are calculated using the engine speed NE as a variable, but specifically the dead time Td and the time constant $\tau$ are substantially proportional to the time taken for the crankshaft to rotate 360°, so as shown in FIG. 19A and FIG. 19B, it is preferable to prepare maps of the dead time Td and the time constant $\tau$ using the time T360° taken for the crankshaft to rotate 360° as a variable.

However, the EGR control valve passage gas flow rate $m_{egr}$ changes due to various parameters, for example, the number of steps of the EGR control valve 22, that is, the EGR opening degree $\theta_e$, as will be understood by reference to equation (17). Therefore, when the EGR opening degree $\theta_e$ changes, by subjecting the EGR opening degree $\theta_e$ itself to dead time processing and lag processing (smoothing processing) and inputting the EGR opening degree $\theta_e$ after processing in this way to the above-mentioned equation (17), an intake pipe inflow exhaust gas flow rate $m_{egr-k}$ or a cylinder inflow exhaust gas flow rate $m_{egr-egr}$ in a form reflecting the dead time and tracking lag is obtained with respect to a change in the EGR control valve passage gas flow rate $m_{egr}$ accompanied with changes in the EGR opening degree $\theta_e$.

Figure 20A:
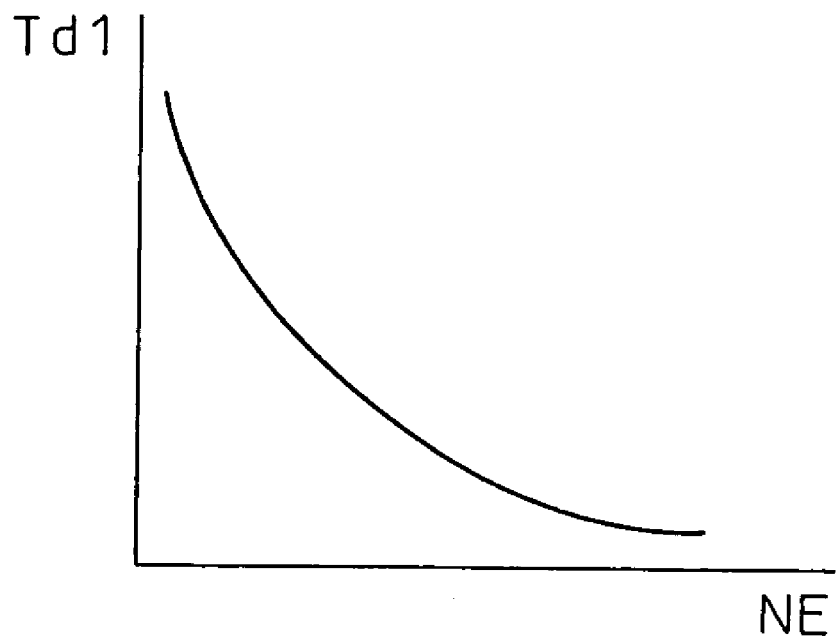
FIG. 20A is a view of a relationship between an engine speed NE and dead time Td1 relating to an inflow exhaust gas recirculation rate.
Figure 20B:
FIG. 20B is a view of a relationship between an engine speed NE and smoothing number N1 relating to an inflow exhaust gas recirculation rate.

For example, when the EGR opening degree $\theta_e$ changes, it is also possible to calculate the dead time Td1 from the map such as shown in FIG. 20A based on the engine speed NE, start to change the EGR opening degree $\theta_e$ after the elapse of the dead time Td1, calculate the smoothing number N1 from the map such as shown in FIG. 20B based on the engine speed NE, smooth the change in the EGR opening degree $\theta_e$ by the smoothing number N1, and calculate the intake pipe inflow exhaust gas flow rate $M_{egr-k}$ from equation (17) based on the thus smoothed EGR opening degree $\theta_e$.

Specifically, when the k-th calculation routine is performed, when the EGR opening degree $\theta_e$ for example changes from the value $\theta_e1$ to the value $\theta_e2$, the smoothing number N1 is read from the map such as shown in FIG. 20B based on the engine speed NE at that time, the smoothing number N1 is utilized to smooth the EGR opening degree $\theta_e2$ in accordance with the following equation (32), and the EGR opening degree $\theta_e'(k)$ accompanied with the tracking lag at the time of the k-th calculation routine is calculated.

$$\theta_e'(k)=[(N1-1)\cdot\theta_e(k-1)+\theta_e2] \quad (32)$$

Further, the dead time Td1 is read from the map shown in FIG. 20A based on the engine speed NE at the time of the k-th calculation routine. The dead time Td1 is utilized to calculate the number of dead routines Idx1 corresponding to the dead time Td1 in accordance with the following equation (33):

$$Idx1 = \frac{Td1}{\Delta t} \quad (33)$$

Next, this number of dead routines Idx1 is utilized to subject the EGR opening degree $\theta_e'(k)$ to dead time processing in accordance with the following equation (34) to calculate the EGR opening degree $\theta_e(k)$ at the time of the k-th calculation routine:

$$\theta_e(k)=\theta_e'(k-Idx1) \quad (34)$$

Further, the value calculated by inputting this $\theta_e(k)$ into equation (17) represents the true intake pipe inflow exhaust gas flow rate $m_{egr-k}(k)$ at the time of the k-th calculation routine.

Of course, similar thinking to this also applies to the case of calculating the cylinder inflow exhaust gas flow rate. That is, when the EGR opening degree $\theta_e$ changes, it is also possible to calculate the dead time Td2 from the map such as shown in FIG. 21A based on the engine speed NE, start to change the EGR opening degree $\theta_e$ after the elapse of the dead time Td2, calculate the smoothing number N2 from the map such as shown in FIG. 21B based on the engine speed NE, smooth the change in the EGR opening degree $\theta_e$ by the smoothing number N2, and calculate the cylinder inflow exhaust gas flow rate $m_{egr-egr}$ from equation (17) based on the thus smoothed EGR opening degree $\theta_e$.

Figure 21A:
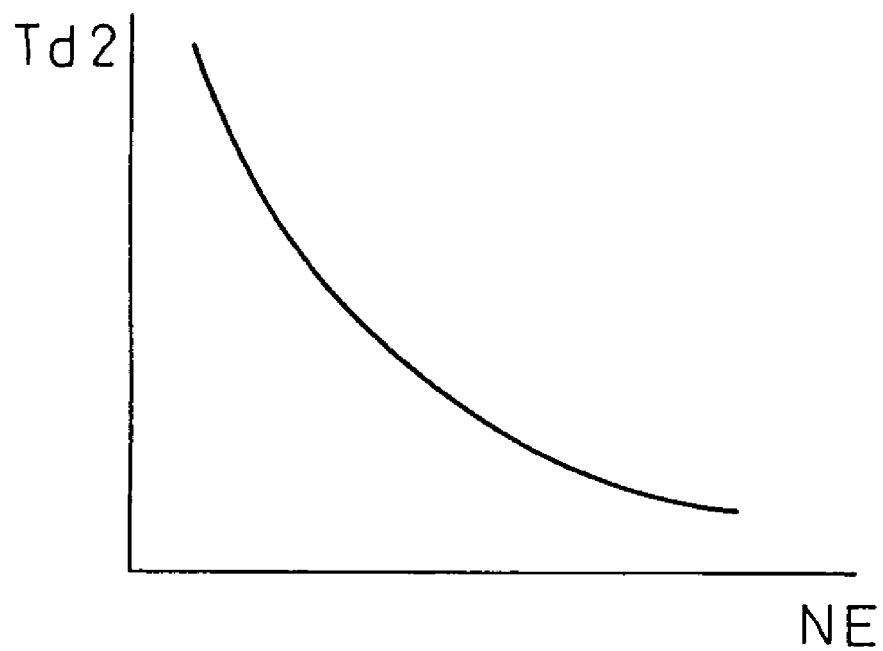
FIG. 21A is a view of a relationship between an engine speed NE and dead time Td2 relating to a cylinder inflow exhaust gas flow rate.
Figure 21B:
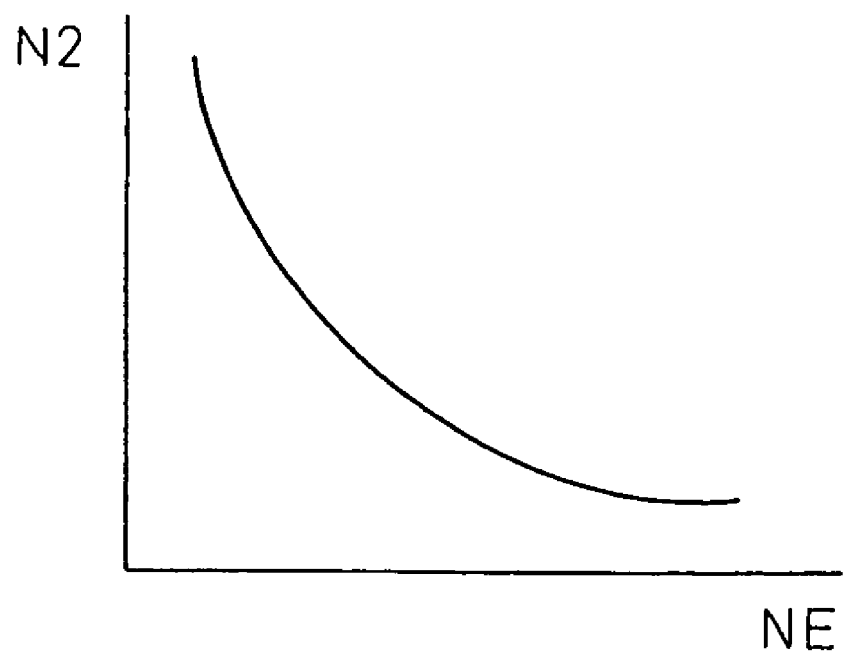
FIG. 21B is a view of a relationship between an engine speed NE and smoothing number N2 relating to a cylinder inflow exhaust gas flow rate.

Specifically, when the k-th calculation routine is performed, when the EGR opening degree $\theta_e$ for example changes from the value $\theta_e1$ to the value $\theta_e2$, the smoothing number N2 is read from the map such as shown in FIG. 21B based on the engine speed NE at that time, the smoothing number N2 is utilized to smooth the EGR opening degree $\theta_e2$ in accordance with the following equation (35), and the EGR opening degree $\theta_e'(k)$ accompanied with the tracking lag at the time of the k-th calculation routine is calculated.

$$\theta_e'(k)=[(N2-1)\cdot\theta_e(k-1)+\theta_e2] \quad (35)$$

Further, the dead time Td2 is read from the map shown in FIG. 21A based on the engine speed NE at the time of the k-th calculation routine. The dead time Td2 is utilized to calculate the number of dead routines Idx2 corresponding to the dead time Td2 in accordance with the following equation (36):

$$Idx2 = \frac{Td2}{\Delta t} \quad (36)$$

Next, this number of dead routines Idx2 is utilized to subject the EGR opening degree $\theta_e'(k)$ to dead time processing in accordance with the following equation (37) to calculate the EGR opening degree $\theta_e(k)$ at the time of the k-th calculation routine:

$$\theta_e(k)=\theta_e'(k-Idx2) \quad (37)$$

Further, the value calculated by inputting this $\theta_e(k)$ into equation (17) represents the true intake pipe inflow exhaust gas flow rate $m_{egr-k}(k)$ at the time of the k-th calculation routine. Note that instead of the above smoothing number, it is also possible to use the above time constants $\tau1$ and $\tau2$.

Figure 22:
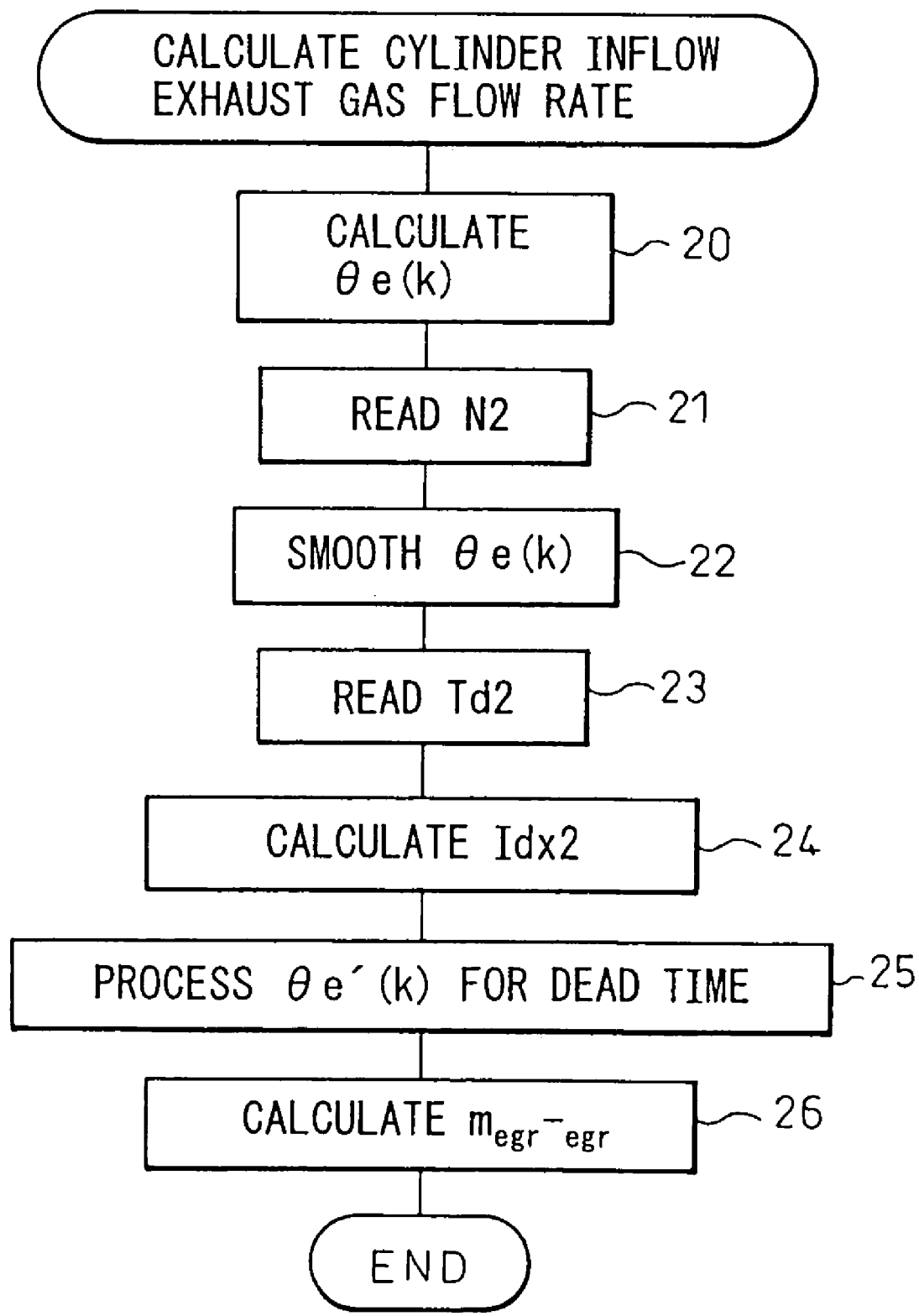
FIG. 22 is a flow chart of a routine for calculating a cylinder inflow exhaust gas flow rate $m_{egr-egr}$.

FIG. 22 shows an example of the routine for calculating the cylinder inflow exhaust gas flow rate $m_{egr-egr}$ utilizing the smoothing processing (tracking lag processing) and dead time processing as explained above. In the routine shown in FIG. 22, first, at step 20, the EGR opening degree $\theta_e(k)$ at the k-th calculation routine is read. Next, at step 21, the smoothing number N2 is read from the map such as shown in FIG. 21B based on the engine speed NE.

Further, next, at step 22, the EGR opening degree $\theta_e(k)$ detected at step 20 is smoothed, whereby the EGR opening degree $\theta'_e(k)$ reflecting the tracking lag is calculated. That is, here, the above equation (35) is utilized. Next, at step 23, the dead time Td2 is read from the map such as shown in FIG. 21A based on the engine speed NE. Further, next, at step 24, the number of dead routines Idx2 is calculated in accordance with equation (36). Next, at step 25, the EGR opening degree $\theta'_e(k)$ reflecting the tracking lag calculated at step 22 is processed for dead time in accordance with equation (37). Further, next, at step 26, the $\theta_e(k)$ calculated at step 25 is input to the above equation (17), whereby the cylinder inflow exhaust gas flow rate $m_{egr-egr}(k)$ is calculated.

However, in the above embodiment, the cylinder inflow exhaust gas flow rate $m_{egr-egr}$ is utilized to calculate the cylinder inflow fresh air amount $M_{c-air}$ and finally the fuel injection amount is determined based on the amount of cylinder inflow fresh air $M_{c-air}$ so that the air-fuel ratio becomes the target air-fuel ratio. In other words, the above embodiment determines the fuel injection amount predicated on the cylinder inflow exhaust gas flow rate $m_{egr-egr}$ being the same value for each cylinder. However, sometimes the actual cylinder inflow exhaust gas flow rate $m_{egr-egr}$ differs for each cylinder due to the shape of the channel from the EGR control valve 22 to each cylinder or various other factors. Therefore, to determine the fuel injection amount so that the air-fuel ratio becomes more accurately the target air-fuel ratio, the fact that the cylinder inflow exhaust gas flow rate $m_{egr-egr}$ differs for each cylinder should be considered.

Therefore, it is also possible to find the ratio of the actual cylinder inflow exhaust gas flow rate at each cylinder with respect to the cylinder inflow exhaust gas flow rate $m_{egr-egr}$ calculated at the above embodiment in advance by experiments etc. as the distribution coefficient or find it each time a specific condition stands during engine operation, multiply the cylinder inflow exhaust gas flow rate $m_{egr-egr}$ calculated at the above embodiment with this distribution coefficient, and utilize the cylinder inflow exhaust gas flow rate $m_{egr-egr}$ after reflection of this distribution coefficient to determine the fuel injection amount for each cylinder. If adopting this method, the air-fuel ratio becomes the target air-fuel ratio more accurately.

Note that the distribution coefficient for each cylinder is for example found in advance by experiments etc. or is found during engine operation as follows. That is, in the operating state where the EGR rate (amount of cylinder charging exhaust gas/amount of cylinder charging gas) is the largest, the EGR opening degree is made constant, the throttle opening degree is made constant, then the same amount of fuel is injected at each cylinder, the air-fuel ratio of the exhaust gas exhausted from each cylinder at that time is detected, and the air-fuel ratio at each cylinder is estimated based on the detected value of the air-fuel ratio of the exhaust gas.

Here, for a cylinder where the air-fuel ratio is estimated to be lean, air is charged into the cylinder more than imagined and therefore the exhaust gas is not charged in the cylinder as much as expected. In this case, the distribution coefficient for the cylinder becomes smaller than 1.0. Specifically, if calculating in reverse the cylinder inflow exhaust gas flow rate relating to the cylinder based on the estimated air-fuel ratio and dividing the cylinder inflow exhaust gas flow rate calculated by reverse calculation by the cylinder inflow exhaust gas flow rate calculated in the above embodiment, the distribution coefficient relating to the cylinder is calculated. On the other hand, even for a cylinder where the air-fuel ratio is estimated as being rich, by similar thinking, the distribution coefficient can be calculated. In this case, the distribution coefficient becomes larger than 1.0.

Figure 23:
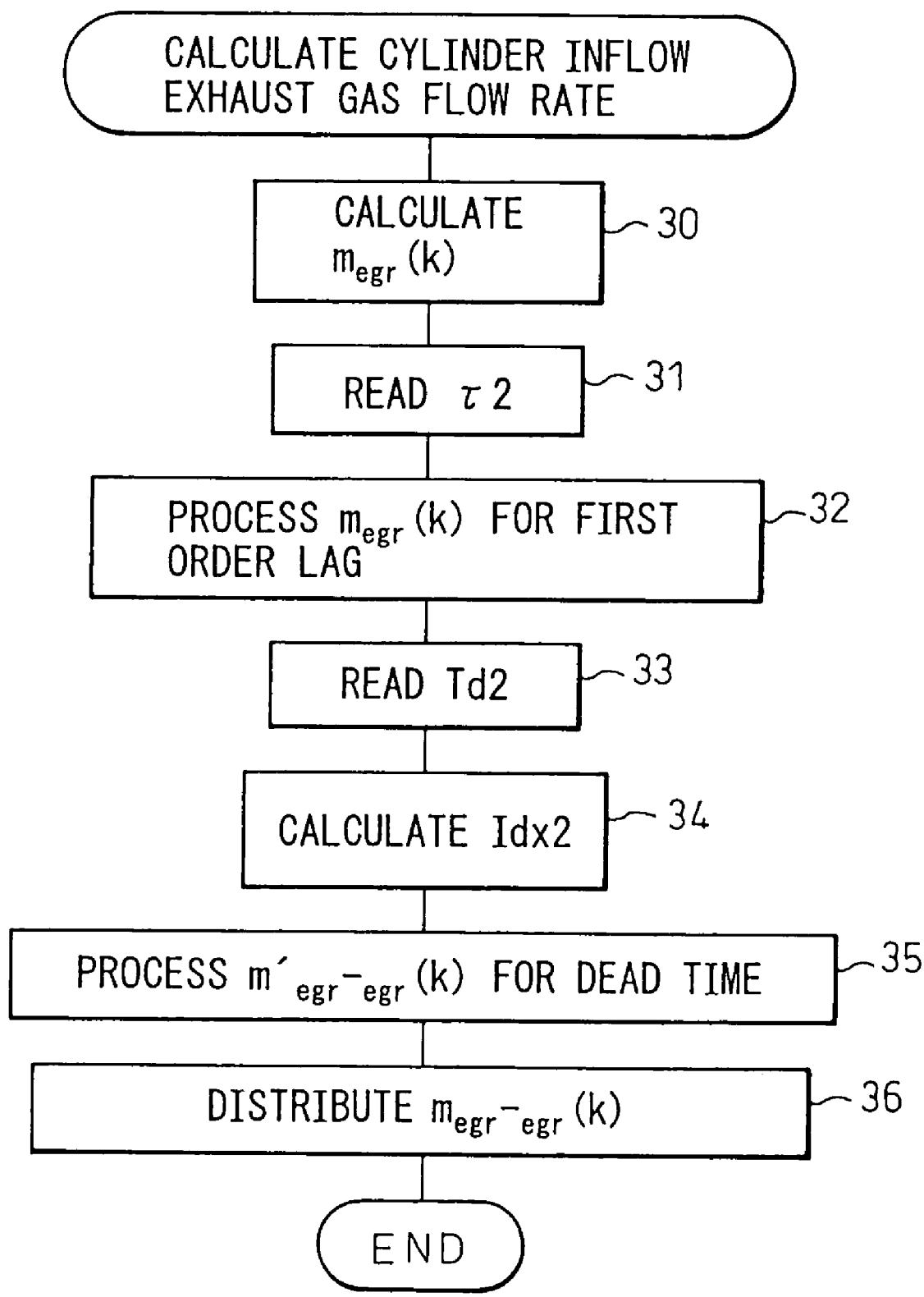
FIG. 23 is a flow chart of a routine for calculating a cylinder inflow exhaust gas flow rate $m_{egr-egr}$ considering a distribution coefficient for each cylinder.

FIG. 23 shows an example of the routine for calculating the cylinder inflow exhaust gas flow rate $m_{egr-egr}$ considering the distribution coefficient for each cylinder. The following routine is applied to an internal combustion engine provided with four cylinders. In the routine shown in FIG. 23, first, at step 30, the EGR control valve passage gas flow rate $m_{egr}(k)$ is calculated in accordance with the above equation (17). Next, at step 31, the time constant τ2 is read from the map such as shown in FIG. 17B based on the engine speed NE.

Further, next, at step 32, the EGR control valve passage gas flow rate $m_{egr}(k)$ calculated at step 30 is subjected to first-order lag processing and the cylinder inflow exhaust gas flow rate $m'_{egr-egr}(k)$ accompanied with first-order lag is calculated. That is, here, the above equation (29) is utilized. Next, at step 33, the dead time Td2 is read from the map such as shown in FIG. 17A based on the engine speed NE. Further, next, at step 34, the number of dead routines Idx2 is calculated in accordance with equation (30).

Next, at step 35, the cylinder inflow exhaust gas flow rate $m'_{egr-egr}(k)$ calculated at step 32 is processed with respect to dead time in accordance with equation (31). Further, finally, at step 36, the cylinder inflow exhaust gas flow rate $m_{egr-egr}(k)$ calculated at step 35 is multiplied with the distribution coefficients K1 to K4 relating to the cylinders in accordance with the following equations (38) so as to calculate the cylinder inflow exhaust gas flow rate $m_{egr-egr}(k)(1)$ to (4):

$$m_{egr-egr}(k)(1)=m_{egr-egr}(k)\cdot K1$$

$$m_{egr-egr}(k)(2)=m_{egr-egr}(k)\cdot K2$$

$$m_{egr-egr}(k)(3)=m_{egr-egr}(k)\cdot K3$$

$$m_{egr-egr}(k)(4)=m_{egr-egr}(k)\cdot Kr \tag{38}$$

Note that in equation (38), $m_{egr-egr}(k)$ (1) is the cylinder inflow exhaust gas flow rate relating to the first cylinder, K1 is the distribution coefficient relating to the first cylinder, $m_{egr-egr}(k)$ (2) is the cylinder inflow exhaust gas flow rate relating to the second cylinder, K2 is the distribution coefficient relating to the second cylinder, $m_{egr-egr}(k)$ (3) is the cylinder inflow exhaust gas flow rate relating to the third cylinder, K3 is the distribution coefficient relating to the third cylinder, $m_{egr-egr}(k)$ (4) is the cylinder inflow exhaust gas flow rate relating to the fourth cylinder, and K4 is the distribution coefficient relating to the fourth cylinder.

However, the above embodiment found the distribution coefficient for each cylinder and found the cylinder inflow exhaust gas flow rate $m_{egr-egr}$ for each cylinder considering the fact that the actual cylinder inflow exhaust gas flow rate $m_{egr-egr}$ differs with each cylinder due to the shape of the channel from the EGR control valve 22 to each cylinder and various other factors, but for example when the channel length from the EGR control valve 22 to each cylinder is extremely long and the channel resistance there is extremely large, the dead time, time constant, or smoothing number also differ.

Therefore, as in the above embodiment, not only is it possible to reflect the distribution coefficient to the found cylinder inflow exhaust gas flow rate $m_{egr-egr}$, but also it is possible to reflect the distribution coefficient in the dead time, time constant, or smoothing number. That is, more specifically, in the above embodiment, only the found cylinder inflow exhaust gas flow rate $m_{egr-egr}$ is multiplied with the distribution coefficient, but it is also possible to multiply the dead time and time constant or the smoothing number with the same distribution coefficient for each cylinder. According to this, the cylinder inflow exhaust gas flow rate $m_{egr-egr}$ is calculated for each cylinder more accurately.

Figure 24:
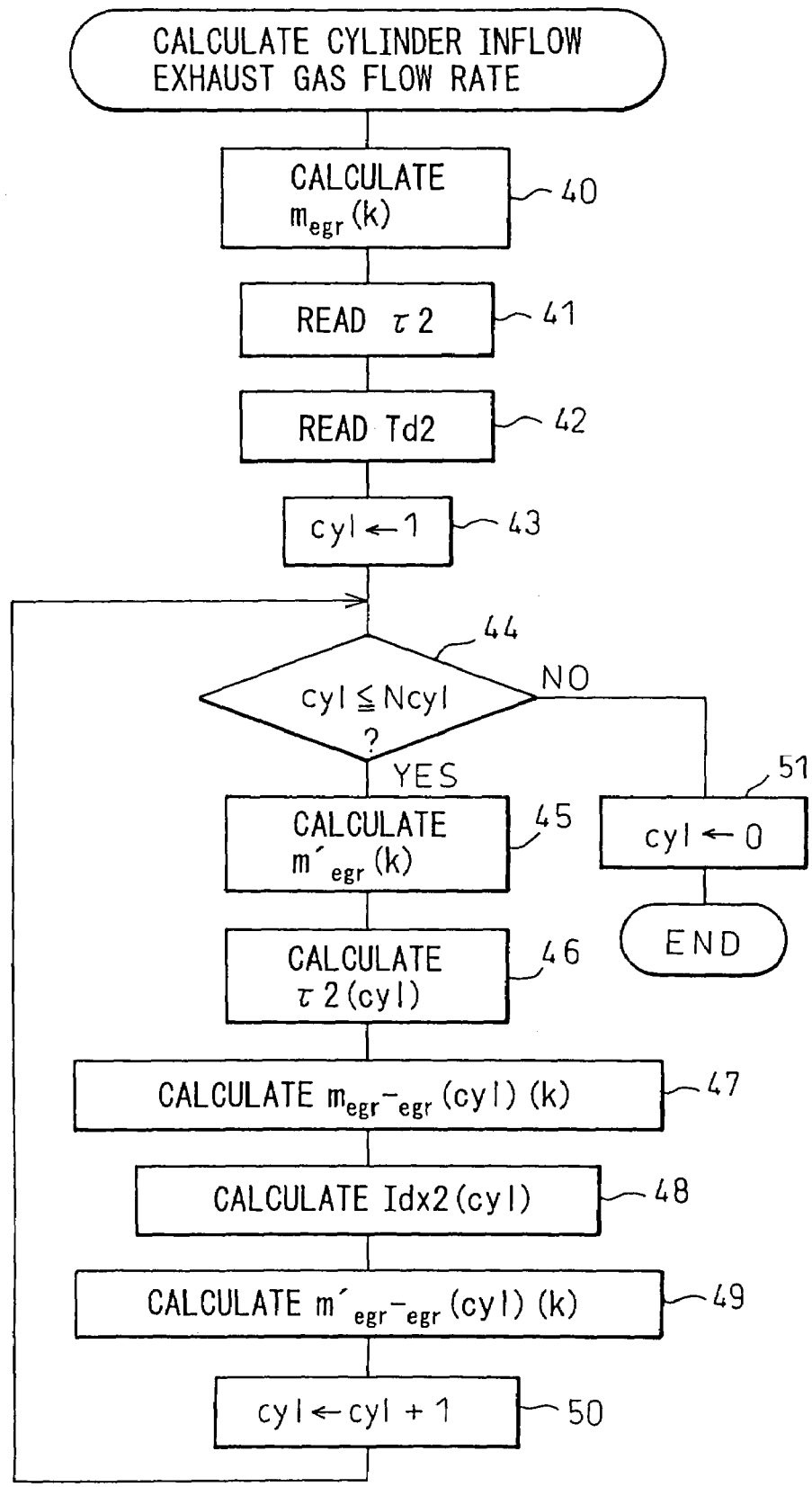
FIG. 24 is a flow chart of a routine for calculating a cylinder inflow exhaust gas flow rate $m_{egr-egr}$ considering a distribution coefficient for each cylinder and a dead time and time constant.

FIG. 24 shows an example of the routine for calculating the cylinder inflow exhaust gas flow rate $m_{egr-egr}$ at each cylinder by reflecting the distribution coefficient for each cylinder in the dead time and the time constant. In the routine shown in FIG. 24, at step 40, the EGR control valve passage gas flow rate $m_{egr}$ is calculated from equation (17). Next, at step 41, the time constant T2 is read from the map shown in FIG. 17B based on the engine speed NE. Next, at step 42, the dead time Td2 is read from the map shown in FIG. 17A based on the engine speed NE. Next, at step 43, 1 is input to the parameter cyl showing the number of the cylinder. In this case, cyl=1, so the parameter cyl shows the first cylinder.

Next, at step 44, it is judged if the parameter cyl is the total number Ncyl of cylinders or less (cyl≦Ncyl). Here, when it is judged that cyl≦Ncyl, the routine proceeds to step

45. Here, the EGR control valve passage gas flow rate $m_{egr}(k)$ in the k-th calculation routine is calculated from the above equation (17).

Next, at step 46, the time constant $\tau 2$ relating to the corresponding cylinder (cyl), that is, the time constant $\tau 2(1)$ relating to the first cylinder when the parameter cyl is 1 and the time constant $\tau 2(2)$ relating to the second cylinder when the parameter cyl is 2, is calculated in accordance with the following equation (39):

$$\tau 2(cyl) = K(cyl) \cdot \tau 2 \tag{39}$$

Here, K(cyl) is the distribution coefficient relating to each cylinder. For example, when the parameter cyl is 1, it is the distribution coefficient K(1) relating to the first cylinder, while when the parameter cyl is 2, it is the distribution coefficient K(2) relating to the second cylinder.

Next, at step 47, the EGR control valve passage gas flow rate $m_{egr}(k)$ is subjected to first-order processing in accordance with the following equation (40) and the cylinder inflow exhaust gas flow rate $m'_{egr\text{-}egr}(cyl)(k)$ relating to the corresponding cylinder in the k-th calculation routine is calculated.

$$m'_{egr\text{-}egr}(cyl)(k) = m'_{egr\text{-}egr}(cyl)(k-1) + \Delta t/\tau 2(cyl) \cdot (m_{egr}(cyl)(k) - m'_{egr\text{-}egr}(cyl)(k-1)) \tag{40}$$

Here, $\Delta t$ is the calculation period of the EGR control valve passage gas flow rate.

Next, at step 48, the number of dead routines Idx2 corresponding to the dead time relating to the corresponding cylinder is calculated in accordance with the following equation (41):

$$Idx2 = K(cyl) \cdot Td2/\Delta t \tag{41}$$

Next, at step 49, the cylinder inflow exhaust gas flow rate $m_{egr\text{-}egr}(cyl)(k)$ relating to the corresponding cylinder at the k-th calculation routine is calculated in the dead time processed form from the following equation (42):

$$m_{egr\text{-}egr}(cyl)(k) = m'_{egr\text{-}egr}(cyl)(k-Idx2) \tag{42}$$

Next, at step 50, the parameter cyl is increased by exactly 1 and the routine returns to step 44. Therefore, if the parameter cyl is 1 when the routine reaches step 50, the parameter cyl is made 2 at step 50 and steps 44 to 49 are repeated.

Further, if the parameter cyl is 4 when the routine reaches step 50, the parameter cyl is made 5 at step 50. When the routine returns to step 44, it is judged at step 44 that cyl>Ncyl and the routine proceeds to step 51. That is, when it is judged at step 44 that cyl>Ncyl, the cylinder inflow exhaust gas flow rate $m_{egr\text{-}egr}(cyl)(k)$ is calculated with respect to all cylinders. Note that at step 51, zero is input to the parameter cyl, that is, the parameter cyl is cleared. Note that this routine can also be utilized as a routine for calculating the intake pipe inflow exhaust gas flow rate $m_{egr\text{-}k}$ flowing into each intake tube 13 if changing Td2 to Td1 and $\tau 2$ to $\tau 1$.

There is known an internal combustion engine provided with a valve timing changing mechanism for changing the closing timing of the intake valve. For example, in one certain valve timing changing mechanism, it is possible to change the closing timing of the intake valve to after bottom dead center of the intake stroke. When the intake valve closes after bottom dead center of the intake stroke, part of the gas flowing into the cylinder once is exhausted by the piston in the cylinder from the cylinder to the intake passage.

Further, the amount of the gas exhausted from the cylinder to the intake passage in this way (hereinafter referred to as the "blowback gas") differs depending on at what timing after bottom dead center of the intake stroke the intake valve closes and becomes greater the more retarded the timing the intake valve closes from after bottom dead center of the intake stroke.

That is, in an internal combustion engine provided with a valve timing mechanism changing the closing timing of the intake valve after bottom dead center of the intake stroke, if the closing timing of the intake valve is changed by the valve timing mechanism, the amount of blowback gas changes. Here, if considering the diffusion of the exhaust gas in the intake passage in the case where the gas is exhausted from the cylinder to the intake passage, the greater the amount of the blowback gas, the more the diffusion of the exhaust gas in the intake passage tends to be suppressed. That is, the greater the amount of the blowback gas, the more the diffusion of the exhaust gas flowing into the intake passage through the EGR control valve 22 tends to be suppressed. That is, this means that the greater the amount of the blowback gas, that is, the more retarded the closing timing of the intake valve, the greater the above time constant $\tau 2$.

Further, if considering the EGR passage 21, the pressure in the EGR passage 21 is much higher than the pressure in the intake passage, so even if the gas is exhausted from the cylinder to the intake passage, this gas will never flow into the EGR passage 21. Therefore, even if gas is exhausted from the cylinder to the intake passage, the time taken for the exhaust gas passing through the EGR control valve 22 to reach the cylinder will not change that much. That is, this means that the above dead time Td2 does not change that much regardless of the amount of the blowback gas, that is, regardless of the closing timing of the intake valve.

Figure 25A:
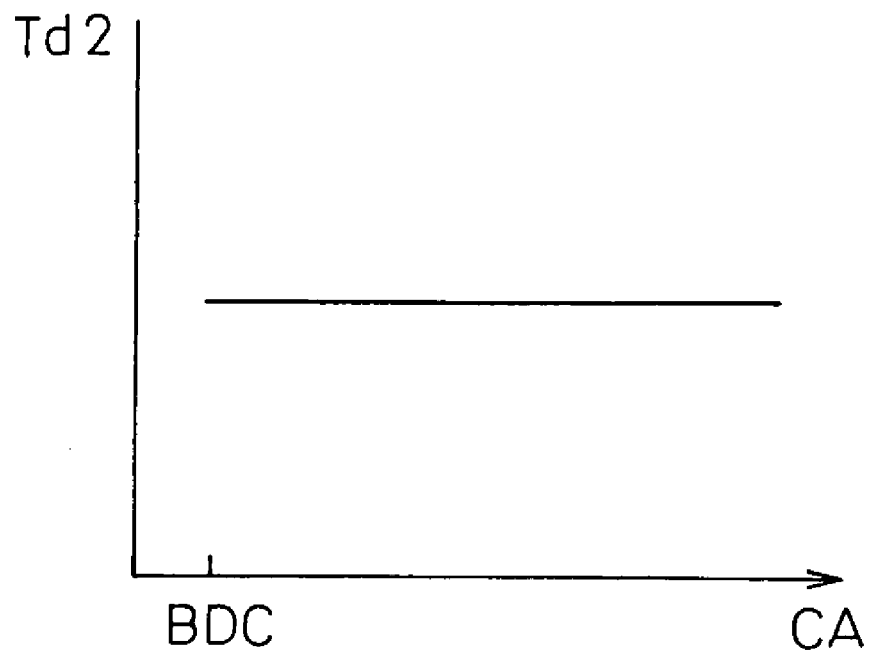
FIG. 25A is a view of a relationship between an intake valve closing timing CA and dead time Td2.
Figure 25B:
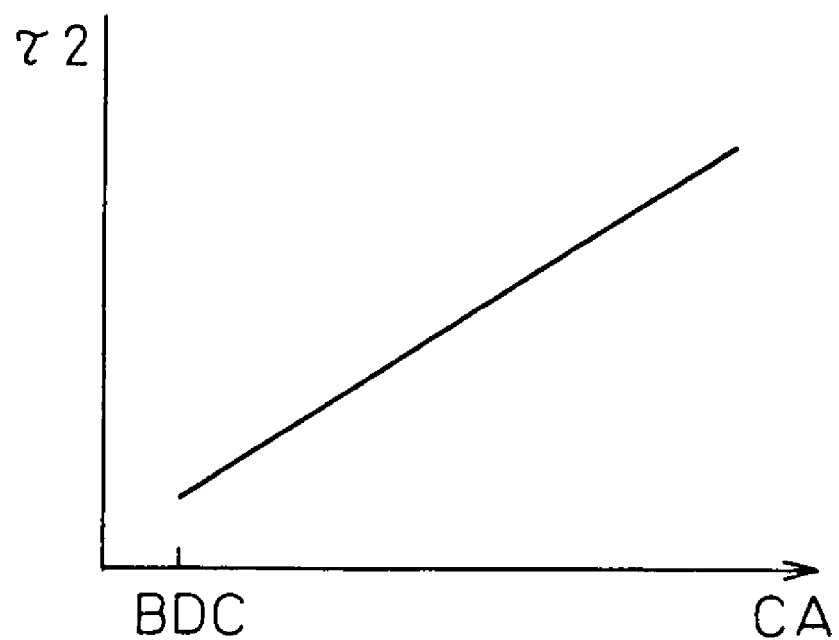
FIG. 25B is a view of a relationship between an intake valve closing timing CA and time constant τ2.

Therefore, in an internal combustion engine designed so that the closing timing of the intake valve can be changed after bottom dead center of the intake stroke considering the fact that the above time constant $\tau 2$ changes in accordance with the closing timing of the intake valve, in the above embodiment, it is also possible to determine the dead time Td2 and the time constant $\tau 2$ in accordance with the intake valve closing timing by the relationships as shown in FIG. 25A and FIG. 25B.

As shown in FIG. 25A, here, no matter what angle after bottom dead center BDC of the intake stroke the intake valve closing crank angle CA corresponding to the closing timing of the intake valve is, the dead time Td2 becomes constant. On the other hand, as shown in FIG. 25B, the more retarded the intake valve closing crank angle CA is from bottom dead center BDC of the intake stroke, the larger the time constant $\tau 2$ becomes.

Note that as explained above, the dead time Td2 and the time constant $\tau 2$ are also dependent on the engine speed NE, so it is also possible to determine the dead time Td2 and the time constant $\tau 2$ as functions of the engine speed NE and intake valve closing timing. For example, in this case, the dead time Td2 and the time constant $\tau 2$ when the closing timing of the intake valve is bottom dead center of the intake stroke are found in advance and stored in the ROM 34 in the form of maps as shown in FIG. 17A and FIG. 17B using the engine speed NE as a variable.

Figure 26A:
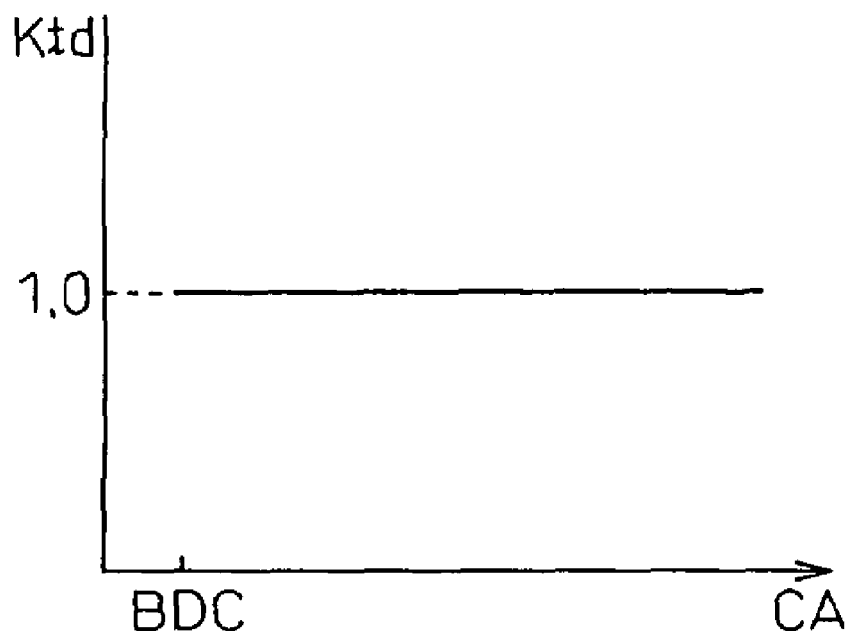
FIG. 26A is a view of a relationship between an intake valve closing timing CA and correction coefficient Ktd relating to a dead time Td2.

Further, as the dead time, use is made of the dead time Td2 found from the map shown in FIG. 17A based on the engine speed NE multiplied with the correction coefficient Ktd found from the map shown in FIG. 26A based on the intake valve closing crank angle CA. In this case, as will be understood from FIG. 26A, the correction coefficient Ktd is a constant 1.0 regardless of the intake valve closing crank angle CA, so de facto the dead time Td2 found from the map shown in FIG. 17A is used as it is.

Figure 26B:
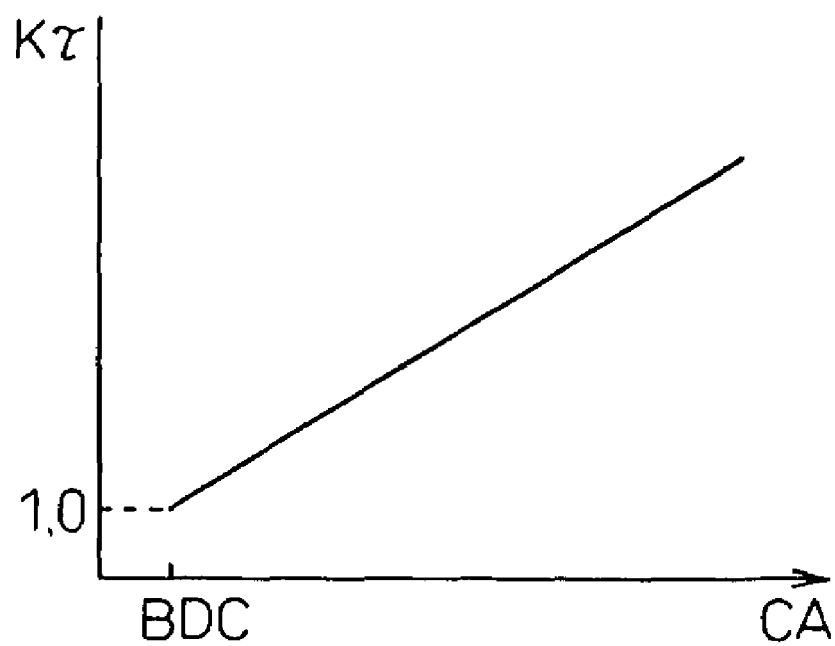
FIG. 26B is a view of a relationship between an intake valve closing timing CA and correction coefficient Kτ relating to a time coefficient τ2.

On the other hand, as the time constant, use is made of the time constant $\tau 2$ found from the map shown in FIG. 17B based on the engine speed NE multiplied with the correction coefficient $K\tau$ found from the map shown in FIG. 26B based on the intake valve closing crank angle CA. In this case, as will be understood from FIG. 26B, the correction coefficient $K\tau$ is 1.0 when the intake valve closing crank angle CA is the bottom dead center BDC of the intake stroke and is a value which becomes larger the more retarded the intake valve closing crank angle CA from the bottom dead center BDC of the intake stroke.

Note that in an internal combustion engine designed so that the intake valve closing timing can be changed after bottom dead center of the intake stroke, it is also possible to determine the above dead time Td1 and time constant $\tau 1$ by relationships similar to the relationships shown in FIG. 25A and FIG. 25B. In this case, the dead time Td1 and the time constant $\tau 1$ are values smaller than the dead time Td2 and the time constant $\tau 2$.

Further, it is also possible to determine the dead time Td1 and the time constant $\tau 1$ as a function of the engine speed NE and the intake valve closing timing. For example, in this case, the dead time Td1 and the time constant $\tau 1$ at the time when the intake valve closing timing is bottom dead center of the intake stroke are found in advance and stored in the ROM 34 in the form of maps as shown in FIG. 16A and FIG. 16B using the engine speed NE as variables.

Further, as the dead time, use is made of the dead time Td1 found from the map shown in FIG. 16A based on the engine speed NE multiplied with the correction coefficient Ktd found from the map shown in FIG. 26A based on the intake valve closing crank angle CA. In this case, as will be understood from FIG. 26A, the correction coefficient Ktd is a constant 1.0 regardless of the intake valve closing crank angle CA, so de facto the dead time Td1 found from the map shown in FIG. 16A is used as it is.

On the other hand, as the time constant, use is made of the time constant $\tau 1$ found from the map shown in FIG. 16B based on the engine speed NE multiplied with the correction coefficient $K\tau$ found from the map shown in FIG. 26B based on the intake valve closing crank angle CA. In this case, as will be understood from FIG. 26B, the correction coefficient $K\tau$ is 1.0 when the intake valve closing crank angle CA is the bottom dead center BDC of the intake stroke and is a value which becomes larger the more retarded the intake valve closing crank angle CA from the bottom dead center BDC of the intake stroke.

However, in an internal combustion engine provided with a valve timing mechanism changing the closing timing of the intake valve before the bottom dead center of the intake stroke, if the closing timing of the intake valve is changed by the valve timing mechanism, the amount of blowback gas is almost zero, but the total amount of gas charged in the cylinder changes. Here, if the amount of blowback gas is almost zero, even if the closing timing of the intake valve changes before bottom dead center of the intake stroke, the change in closing timing of the intake valve has no effect at all on the diffusion of the exhaust gas in the intake passage. That is, this means that the time constant $\tau 2$ is constant regardless of the closing timing of the intake valve.

On the other hand, if considering the time taken for the exhaust gas to reach the cylinder from the EGR control valve 22 in the case where the total amount of gas charged in the cylinder changes, the smaller the total amount of gas charged in the cylinder, the longer the time tends to become.

That is, this means that the smaller the total amount of gas charged in the cylinder, that is, the more advanced the closing timing of the intake valve in the range before bottom dead center of the intake stroke, the longer the dead time Td2.

Figure 27A:
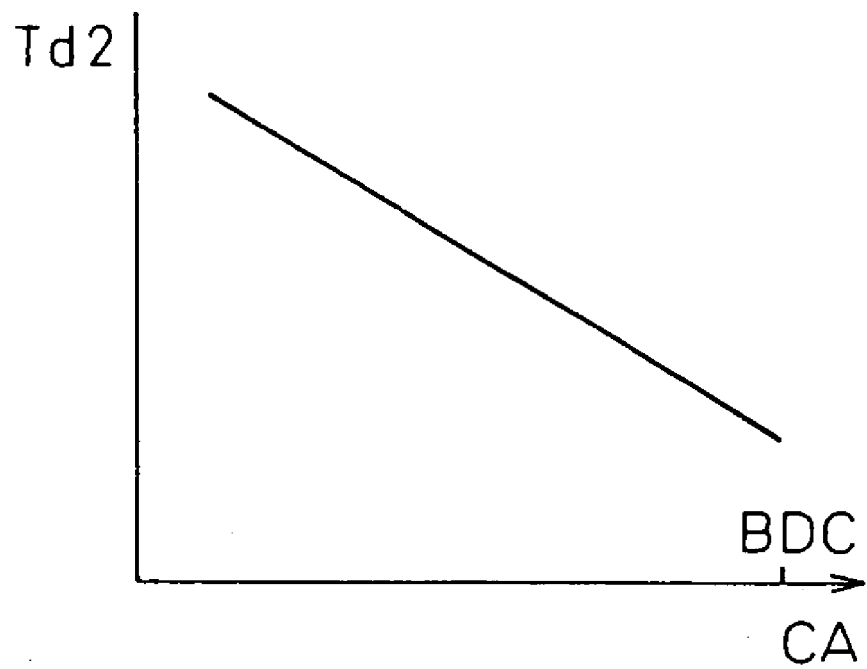
FIG. 27A is a view of a relationship between an intake valve closing timing CA and a dead time Td2.
Figure 27B:
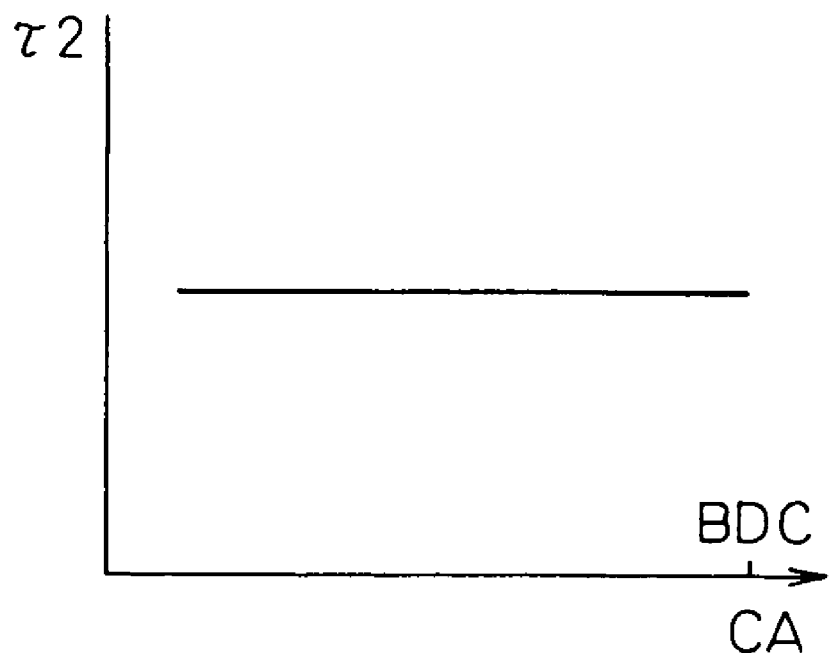
FIG. 27B is a view of a relationship between an intake valve closing timing CA and a time coefficient τ2.

In an internal combustion engine designed to enable change of the closing timing of the intake valve before bottom dead center of the intake stroke considering the fact that the above dead time Td2 changes in accordance with the closing timing of the intake valve, in the above embodiment, it is also possible to determine the dead time Td2 and the time constant $\tau 2$ in accordance with the closing timing of the intake valve by a relation such as shown in FIG. 27A and FIG. 27B. As shown in FIG. 27A, the more advanced the intake valve closing crank angle CA before bottom dead center BDC of the intake stroke, the larger the dead time Td2.

On the other hand, as shown in FIG. 27B, no matter what the intake valve closing crank angle CA before bottom dead center BDC of the intake stroke, the time constant $\tau 2$ becomes constant. Note that as explained above, the dead time Td2 and the time constant $\tau 2$ are also dependent on the engine speed NE, so it is also possible to determine the dead time Td2 and the time constant $\tau 2$ as a relation between the engine speed NE and the intake valve closing timing. For example, in this case, the dead time Td2 and the time constant $\tau 2$ when the closing timing of the intake valve is at bottom dead center of the intake stroke are found in advance and stored in the ROM 34 in the form of a map as shown in FIG. 17A and FIG. 17B using the engine speed NE as a variable.

Figure 28A:
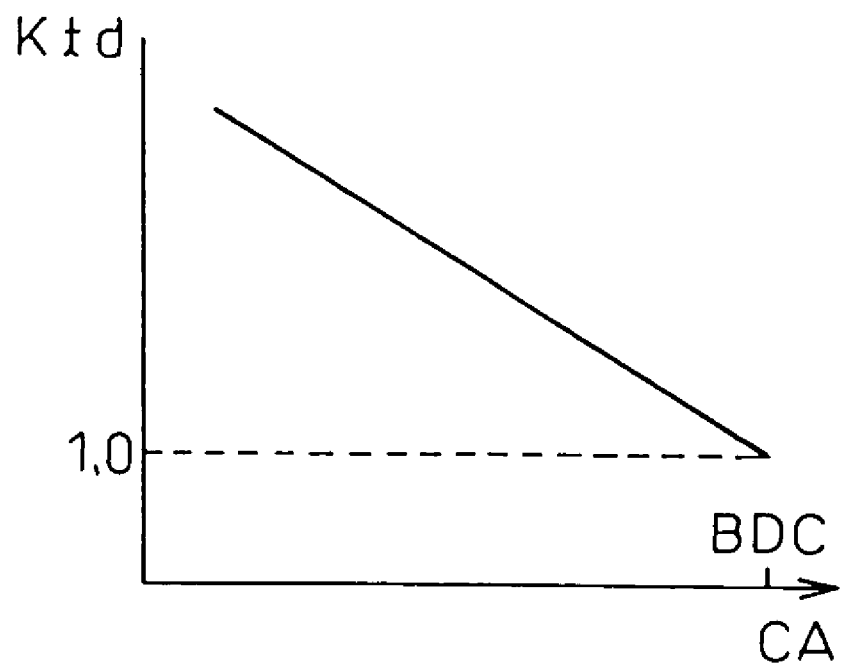
FIG. 28A is a view of a relationship between an intake valve closing timing CA and correction coefficient Ktd relating to a dead time Td2.

Further, as the dead time, use is made of the dead time Td2 found from the map shown in FIG. 17A based on the engine speed NE multiplied with a correction coefficient Ktd found from the map shown in FIG. 28A based on the intake valve closing crank angle CA. In this case, as will be understood from FIG. 28A, the correction coefficient Ktd is 1.0 when the intake valve closing crank angle CA is at bottom dead center BDC of the intake stroke and is a value which becomes larger the more advanced the intake valve closing crank angle CA from bottom dead center BDC of the intake stroke.

Figure 28B:
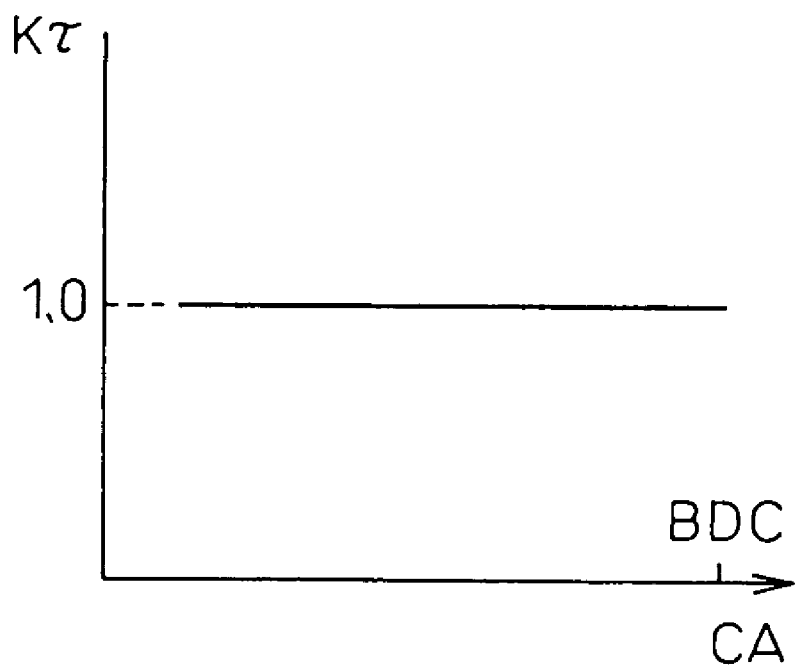
FIG. 28B is a view of a relationship between an intake valve closing timing CA and correction coefficient Kτ relating to a time coefficient τ2.

On the other hand, as the time constant, use is made of the time constant $\tau 2$ found from the map shown in FIG. 17B based on the engine speed NE multiplied with the correction coefficient $K\tau$ found from the map shown in FIG. 28B based on the intake valve closing crank angle CA. In this case, as will be understood from FIG. 28B, the correction coefficient $K\tau$ is 1.0 regardless of the intake valve closing crank angle CA, so de facto the time constant $\tau 2$ found from the map shown in FIG. 17B is used as it is.

Note that in an internal combustion engine designed so that the intake valve closing timing can be changed before bottom dead center of the intake stroke, it is also possible to determine the above dead time Td1 and time constant $\tau 1$ by relationships similar to the relationships shown in FIG. 27A and FIG. 27B. In this case, the dead time Td1 and the time constant $\tau 1$ are values smaller than the dead time Td2 and the time constant $\tau 2$.

Further, it is also possible to determine the dead time Td1 and the time constant $\tau 1$ as a function of the engine speed NE and the intake valve closing timing. For example, in this case, the dead time Td1 and the time constant $\tau 1$ at the time when the intake valve closing timing is bottom dead center of the intake stroke are found in advance and stored in the ROM 34 in the form of maps as shown in FIG. 16A and FIG. 16B using the engine speed NE as variables.

Further, as the dead time, use is made of the dead time Td1 found from the map shown in FIG. 16A based on the engine speed NE multiplied with the correction coefficient Ktd found from the map shown in FIG. 28A based on the intake valve closing crank angle CA. In this case, as will be understood from FIG. 28A, the correction coefficient Ktd is a constant 1.0 when the intake valve closing crank angle CA is at bottom dead center BDC of the intake stroke and is a value becoming larger the more advanced the intake valve closing crank angle CA than bottom dead center of the intake valve.

On the other hand, as the time constant, use is made of the time constant τ1 found from the map shown in FIG. 16B based on the engine speed NE multiplied with the correction coefficient Kτ found from the map shown in FIG. 28B based on the intake valve closing crank angle CA. In this case, as will be understood from FIG. 28B, the correction coefficient Kτ is 1.0 regardless of the intake valve closing crank angle CA and de facto the time constant τ1 found from the map shown in FIG. 16B is used as it is.

There is known an internal combustion engine provided with a valve timing mechanism enabling the intake valve closing timing to be changed skipping bottom dead center of the intake stroke. Such a valve timing mechanism for example adopts a mechanism opening or closing the intake valve electromagnetically. When able to change the intake valve closing timing skipping the bottom dead center of the intake stroke in this way, the intake valve closing timing is changed before bottom dead center of the intake stroke or is changed after bottom dead center of the intake stroke, so the above dead time Td2 and time constant τ2 become different.

Here, when the intake valve closing timing is changed before bottom dead center of the intake stroke, the dead time Td2 and the time constant τ2 exhibit the tendency explained in relation to FIG. 27A and FIG. 27B. On the other hand, when the intake valve closing timing is changed after bottom dead center of the intake stroke, the dead time Td2 and the time constant τ2 exhibit the tendency explained in relation to FIG. 25A and FIG. 25B.

Figure 29A:
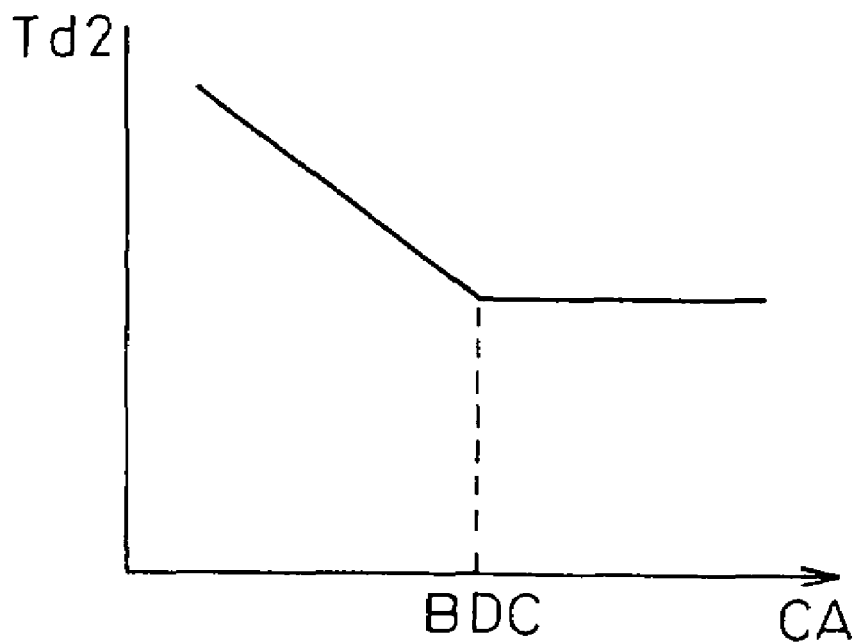
FIG. 29A is a view of a relationship between an intake valve closing timing CA and a dead time Td2.
Figure 29B:
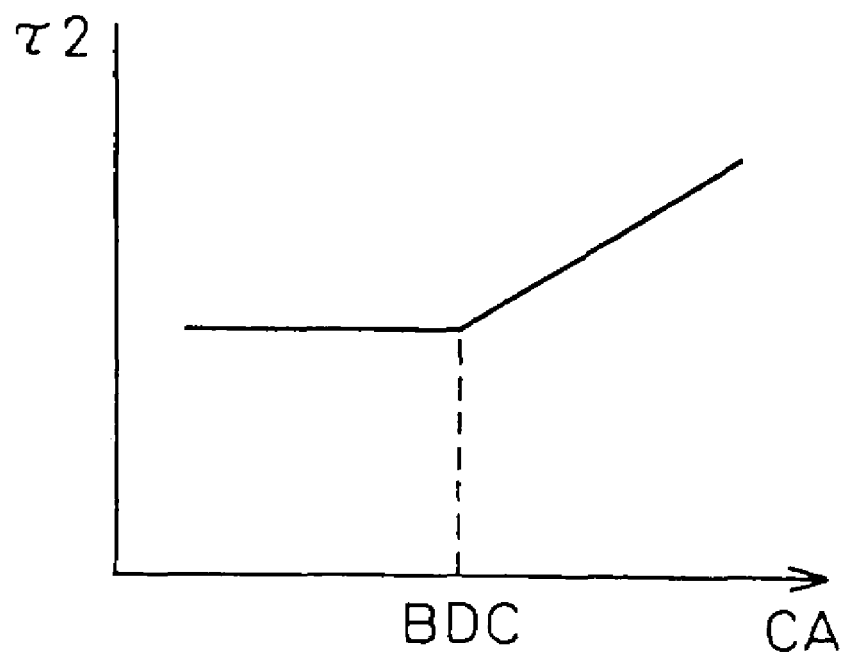
FIG. 29B is a view of a relationship between an intake valve closing timing CA and a time coefficient τ2.

Therefore, in an internal combustion engine designed so that the intake valve closing timing can be changed skipping bottom dead center of the intake stroke, in the above embodiment, it is also possible to determine the dead time Td2 and the time constant τ2 in accordance with the intake valve closing timing by the relationships shown in FIG. 29A and FIG. 29B.

As shown in FIG. 29A, here, in the region before bottom dead center BDC of the intake stroke, the more advanced the intake valve closing crank angle CA, the larger the dead time Td2. In the region after bottom dead center BDC of the intake stroke, the dead time Td2 becomes constant regardless of the intake valve closing crank angle CA. On the other hand, as shown in FIG. 29B, here, in the region before bottom dead center BDC of the intake stroke, the time constant τ2 becomes constant regardless of the intake valve closing crank angle CA, while in the region after bottom dead center BDC of the intake valve, the time constant τ2 becomes larger the more retarded the intake valve closing crank angle CA. Note that as explained above, the dead time Td2 and the time constant τ2 are also dependent on the engine speed NE, so it is also possible to determine the dead time Td2 and the time constant τ2 as a function of the engine speed NE and the intake valve closing timing.

For example, in this case, the dead time Td2 and the time constant τ2 when the intake valve closing timing is at bottom dead center of the intake stroke are found in advance and stored in the ROM 34 in the form of maps as shown in FIG. 17A and FIG. 17B using the engine speed NE as a variable.

Figure 30A:
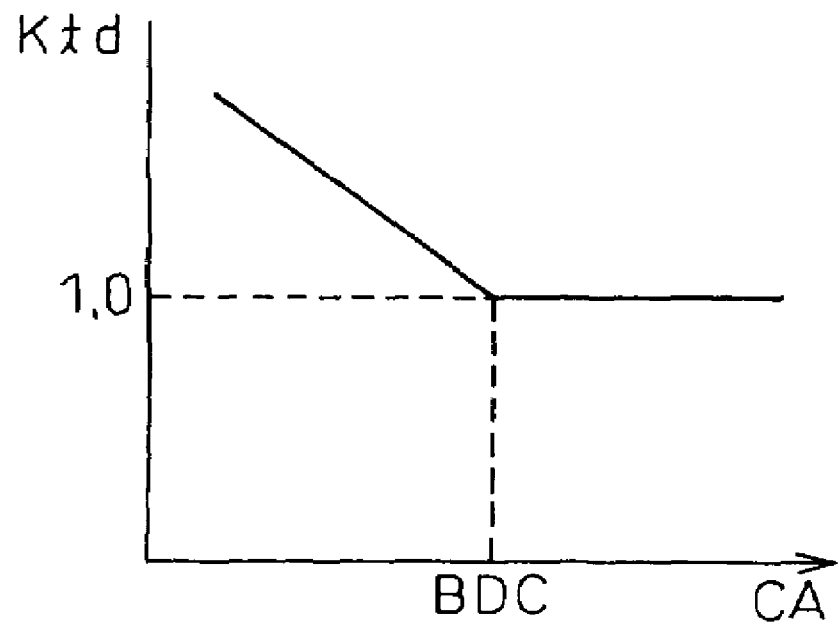
FIG. 30A is a view of a relationship between an intake valve closing timing CA and correction coefficient Ktd relating to a dead time Td2.

Further, as the dead time, use is made of the dead time Td2 found from the map shown in FIG. 17A based on the engine speed NE multiplied with the correction coefficient Ktd found from the map shown in FIG. 30A based on the intake valve closing crank angle CA. Here, in the map shown in FIG. 30A, in the region before bottom dead center BDC of the intake stroke, the correction coefficient Ktd becomes larger the more advanced the intake valve closing crank angle CA, while in the region after bottom dead center BDC of the intake stroke, the correction coefficient is a constant 1.0 regardless of the intake valve closing crank angle CA.

Figure 30B:
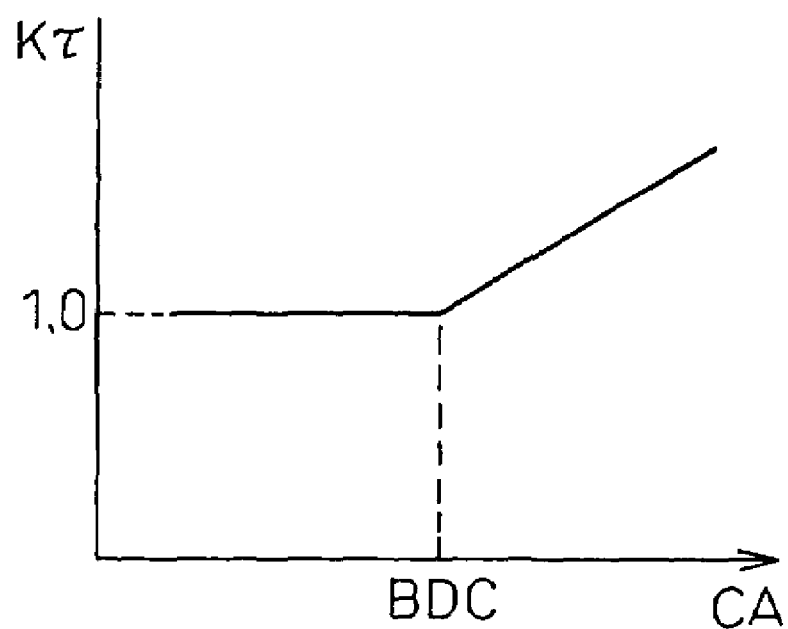
FIG. 30B is a view of a relationship between an intake valve closing timing CA and correction coefficient $K_T$ relating to a time coefficient τ2.

On the other hand, as the time constant, use is made of the time constant τ2 found from the map shown in FIG. 17B based on the engine speed NE multiplied with the correction coefficient Kτ found from the map shown in FIG. 30B based on the intake valve closing crank angle CA. Here, in the map of FIG. 30B, in the region before bottom dead center BDC of the intake stroke, the correction coefficient Kτ is a constant 1.0 regardless of the intake valve closing crank angle CA, while in the region after bottom dead center BDC of the intake stroke, the correction coefficient Kτ becomes larger the more retarded the intake valve closing crank angle CA. Note that in an internal combustion engine designed so that the intake valve closing timing can be changed skipping bottom dead center of the intake stroke, it is also possible to determine the above dead time Td1 and time constant τ1 by relationships similar to the relationships shown in FIG. 29A and FIG. 29B. In this case, the dead time Td1 and the time constant τ1 are values smaller than the dead time Td2 and the time constant τ2.

Further, it is also possible to determine the dead time Td1 and the time constant τ1 as a function of the engine speed NE and the intake valve closing timing. For example, in this case, the dead time Td1 and the time constant τ1 at the time when the intake valve closing timing is bottom dead center of the intake stroke are found in advance and stored in the ROM 34 in the form of maps as shown in FIG. 16A and FIG. 16B using the engine speed NE as variables.

Further, as the dead time, use is made of the dead time Td1 found from the map shown in FIG. 16A based on the engine speed NE multiplied with the correction coefficient Ktd found from the map shown in FIG. 30A based on the intake valve closing crank angle CA.

On the other hand, as the time constant, use is made of the time constant τ1 found from the map shown in FIG. 16B based on the engine speed NE multiplied with the correction coefficient Kτ found from the map shown in FIG. 30B based on the intake valve closing crank angle CA.

In the above embodiment, however, the EGR control valve passage gas flow rate $m_{egr}$ is calculated utilizing calculation equations, that is, equations (17) and (18), but the inventors devised the method of calculating the EGR control valve passage gas flow rate $m_{egr}$ relatively simply even without utilizing such calculation equations. Therefore, in the above embodiment, instead of utilizing equations (17) and (18), it is also possible to utilize the method explained below to calculate the EGR control valve passage gas flow rate.

It is known that the amount of cylinder charging gas $M_c$ is represented by the first-order function equation of the intake pipe pressure $P_m$ when the intake valve 6 is closed. That is, according to theory and experience, the amount of cylinder charging gas $M_c$ is proportional to the cylinder pressure when the intake valve 6 is closed, while the cylinder pressure substantially matches the air-fuel mixture pressure upstream of the intake valve 6, that is, the intake pipe pressure $P_m$. Only fresh air is charged in the cylinder when the EGR gas is not being supplied, so it is possible to represent the amount of cylinder charging fresh air $M_{c\text{-}air}$ at this time, therefore, the engine load factor KL at this time, by a first-order function equation of the intake pipe pressure $P_m$. That is, it is possible to easily and accurately find the engine load factor KL.

However, the situation is completely different when EGR gas is being supplied. The cylinder is charged with not only fresh air, but also EGR gas. Therefore, in the past, it had been thought that the amount of cylinder charging fresh air $M_{c\text{-}air}$ or the engine load factor KL could not be represented by a first-order function equation of the intake pipe pressure $P_m$. If it were possible to represent the amount of cylinder charging EGR gas $M_{c\text{-}egr}$ by a first-order function equation of the intake pipe pressure $P_m$, it would be possible to represent the amount of cylinder charging gas $M_c$ by a first-order function equation of the intake pipe pressure $P_m$. Considering the fact that the amount of cylinder charging gas $M_c$ is the sum of the amount of cylinder charging fresh air $M_{c\text{-}air}$ and the amount of cylinder charging EGR gas $M_{c\text{-}egr}$, it would be possible to represent the amount of cylinder charging fresh air $M_{c\text{-}air}$ or the engine load factor KL when the EGR gas is supplied by a first-order function equation of the intake pipe pressure $P_m$.

However, in the past, it had been thought that the amount of cylinder charging EGR gas $M_{c\text{-}egr}$ also could not be represented by a first-order function equation of the intake pipe pressure $P_m$. This will be explained while referring to FIG. 12 and FIG. 31. First, as explained above, the EGR control valve passage gas flow rate $m_{egr}$ (g/sec) is represented by equation (17), while the function $\Phi(P_m/P_e)$ is represented by equation (18).

Figure 31:
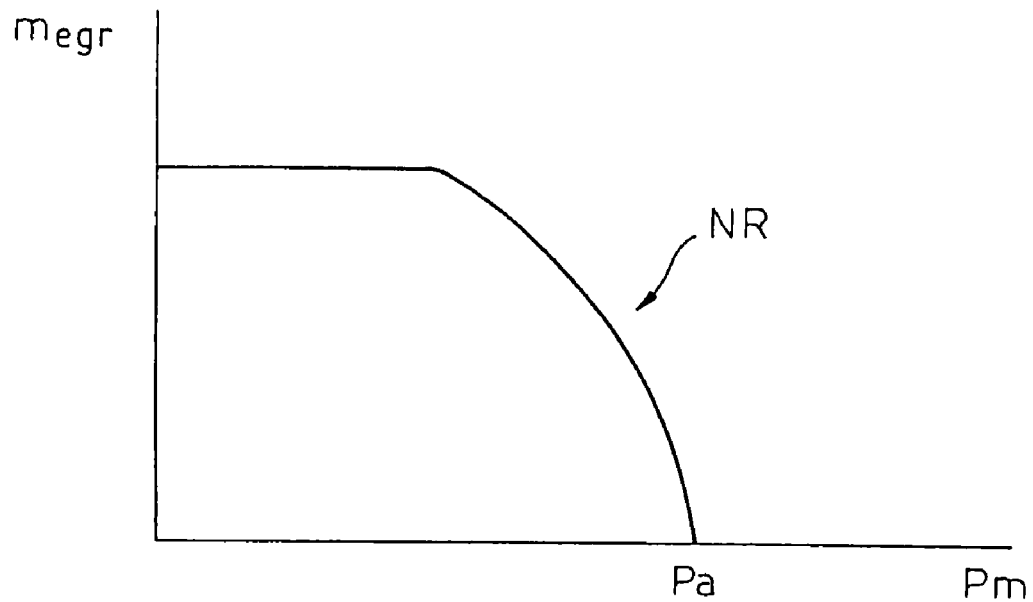
FIG. 31 is a view for explaining an amount of EGR control valve passage gas $m_{egr}$.

Here, if the exhaust pressure $P_e$ is made the atmospheric pressure $P_a$ for simplifying the calculation, the EGR control valve passage gas flow rate $m_{egr}$ represented by equation (17) becomes as shown in FIG. 31. That is, the EGR control valve passage gas flow rate $m_{egr}$ is maintained substantially constant when the intake pipe pressure $P_m$ is small, while is reduced toward atmospheric pressure $P_a$ while exhibiting nonlinearity with respect to the intake pipe pressure $P_m$ as shown by NR in FIG. 31 if the intake pipe pressure $P_m$ becomes high. Note that the nonlinear portion NR is due to the portion of $P_e/\sqrt{T_e}$ and the function $\Phi(P_m/P_e)$ in equation (17).

Therefore, it had been thought that the EGR control valve passage gas flow rate $m_{egr}$, in particular the nonlinear portion NR, could not be represented by a first-order function equation of the intake pipe pressure $P_m$. Of course, if using a considerably large number of first-order function equations, it is considered that the EGR control valve passage gas flow rate $m_{egr}$ can be represented by first-order function equations of the intake pipe pressure $P_m$. However, in this case, it can no longer be said that the engine load factor KL is found simply.

Figure 32:
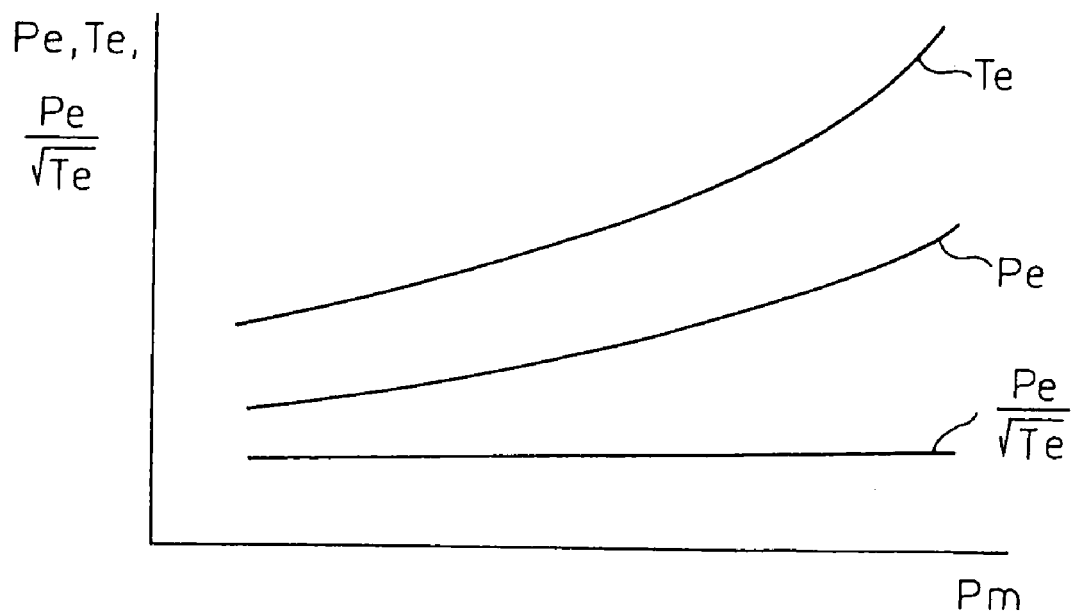
FIG. 32 is a graph of an exhaust pressure $P_e$, exhaust temperature $T_e$, and $P_e/\sqrt{T_e}$.

However, according to the inventors, it was found that it is possible to represent the EGR control valve passage gas flow rate $m_{egr}$ by two first-order function equations of the intake pipe pressure $P_m$ and therefore it is possible to represent the amount of cylinder charging fresh air $M_{c\text{-}air}$ or the engine load factor KL by two first-order function equations of the intake pipe pressure $P_m$. That is, first, as shown by FIG. 32, the exhaust temperature $T_e$ increases more with respect to the increase of the intake pipe pressure $P_m$ than the exhaust pressure $P_e$ increases and as a result it is possible to represent $P_e/\sqrt{T_e}$ by a first-order function equation of the intake pipe pressure $P_m$.

Figure 33A:
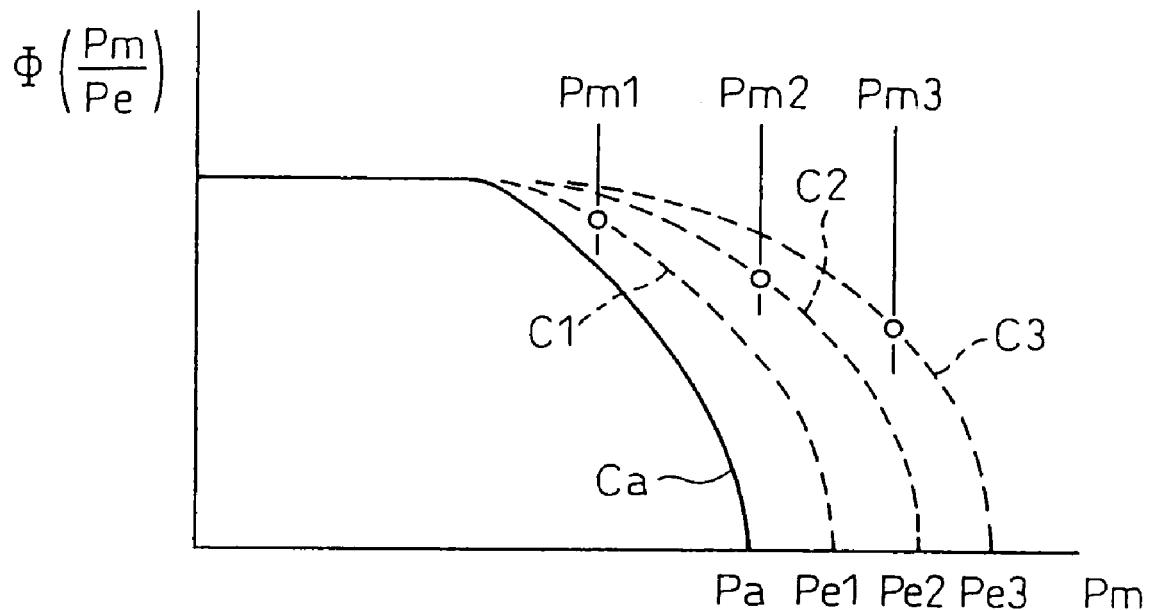
FIG. 33A is a graph of a function $\Phi(P_m/P_e)$.

Further, the function $\Phi(P_m/P_e)$ can also be represented by a first-order function equation of the intake pipe pressure $P_m$. This will be explained with reference to FIG. 33A and FIG. 33B. Considering the fact that the exhaust pressure $P_e$ is not maintained at a constant atmospheric pressure $P_a$, but fluctuates in accordance with the intake pipe pressure $P_m$, as shown in FIG. 33A, the function $\Phi(P_m/P_e)$ when the intake pipe pressure $P_m$ is $P_m1$ is not on a curve Ca converging at the atmospheric pressure $P_a$, but is on the curve C1 converging on the exhaust pressure $P_e1$. This is represented by the plot (o). In the same way, the $\Phi(P_d/P_e)$ when $P_m = P_m2$ (> $P_m1$) is on the curve C2 converging on the exhaust pressure $P_e2$ (>$P_e1$), while the $\Phi(P_m/P_e)$ when $P_m = P_m3$ (> $P_m2$) is on the curve C3 converging on the exhaust pressure $P_e3$ (>$P_e2$).

Figure 33B:
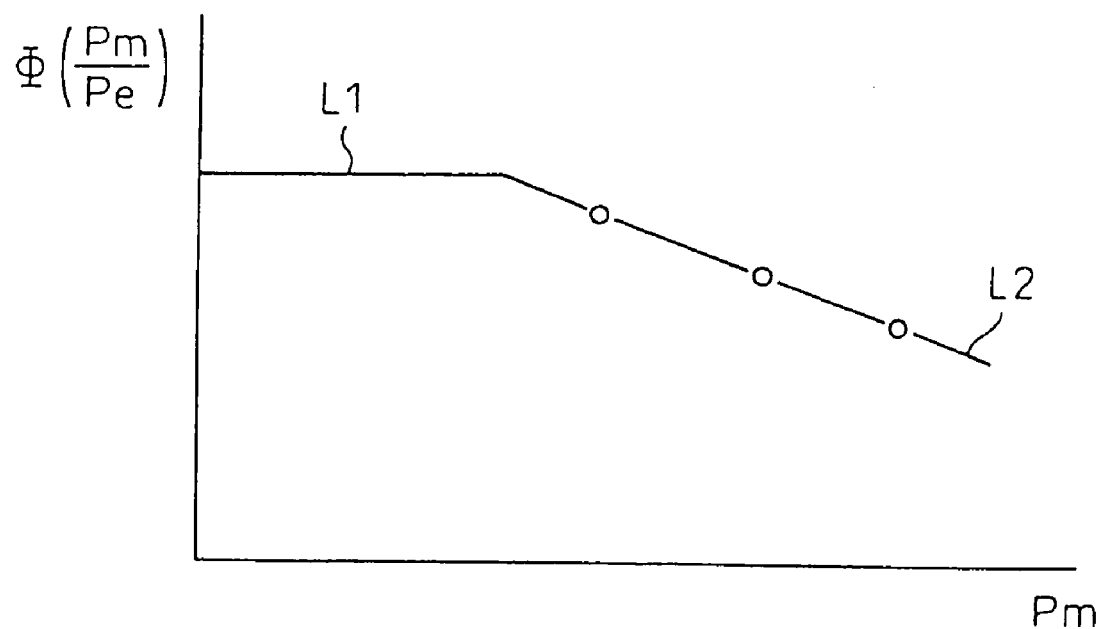
FIG. 33B is a graph of a function $\Phi(P_m/P_e)$.

The plot obtained in this way, as shown in FIG. 33B, can be connected by the line L2. Therefore, the function $\Phi(P_m/P_e)$ can be represented by a first-order function equation of the intake pipe pressure $P_m$ corresponding to the line L1 when the intake pipe pressure $P_m$ is small and by a first-order function equation of the intake pipe pressure $P_m$ corresponding to the line L2 when the intake pipe pressure $P_m$ is large and therefore can be represented by two first-order function equations of the intake pipe pressure $P_m$. That is, the EGR control valve passage gas flow rate $m_{egr}$ can be represented by two first-order function equations of the intake pipe pressure $P_m$.

Here, at the time of steady state operation, the EGR control valve passage gas flow rate $m_{egr}$ (g/sec) and the cylinder inflow EGR gas flow rate $m_{c\text{-}egr}$ (g/sec) are equal. Further, the amount of cylinder charging EGR gas $M_{c\text{-}egr}$ is obtained by multiplying the cylinder inflow EGR gas flow rate $m_{c\text{-}egr}$ with the time $\Delta T$ (sec) required for one intake stroke of each cylinder, that is, obtained by dividing the time required for one cycle of the internal combustion engine by the number of cylinders. This being so, it is possible to represent the amount of cylinder EGR gas $M_{c\text{-}egr}$ at the time of steady state operation by a first-order function equation of the intake pipe pressure $P_m$.

Therefore, the amount of cylinder charging fresh air $M_{c\text{-}air}$ or the engine load factor KL at the time of steady state operation and when the EGR gas is being supplied can be represented by two first-order function equations of the intake pipe pressure $P_m$.

Figure 34:
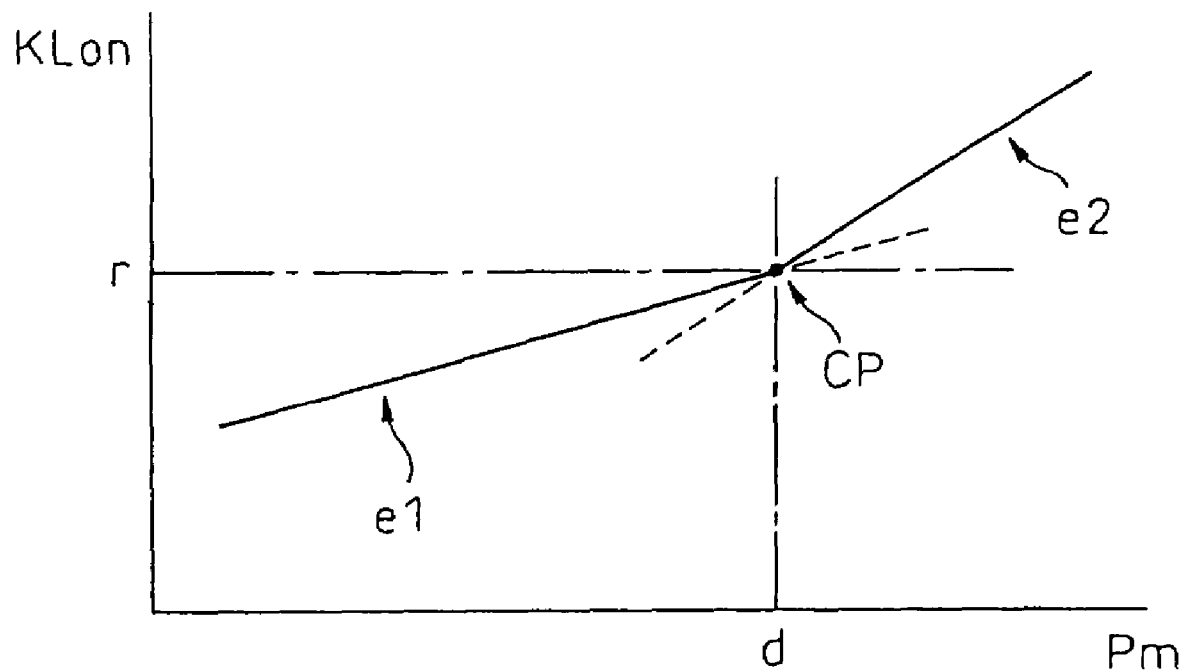
FIG. 34 is a graph of an example of a relationship between an engine load factor KLon and an intake pipe pressure $P_m$.

If making the engine load factor KL at the time the EGR gas is being supplied KLon, FIG. 34 shows an example of the two first-order function equations of the intake pipe pressure $P_m$ representing the engine load factor KLon at the time of steady state operation (when the engine speed NE and the EGR opening degree $\theta_e$ are held constant). As shown in FIG. 34, the engine load factor KLon is represented by two first-order function equations of the intake pipe pressure $P_m$ with different gradients and connected at the connection point CP. That is, when the intake pipe pressure $P_m$ is small, the engine load factor KLon is represented by a first-order function equation of the gradient e1, while when the intake pipe pressure $P_m$ is high, the engine load factor KLon is represented by a first-order function equation of the gradient e2.

Here, if the gradients of the two first-order functions are e1 and e2 and the intake pipe pressure and engine load factor at the connection point CP are d and r, these two first-order functions can be represented by the following equations:

$$KLon = e1 \cdot (P_m - d) + r \ldots P_m \leq d$$

$$KLon = e2 \cdot (P_m - d) + r \ldots P_m > d$$

If representing these together, the following equation (43) is obtained:

$$KLon = e \cdot (p_m - d) + r \quad (43)$$

$e = e1 \ldots P_m \leq d$ $e = e2 \ldots P_m > d$

In this embodiment, the two first-order function equations of the intake pipe pressure $P_m$ representing the engine load factor KLon at the time of steady state operation are stored in advance in the ROM 34 in the form shown in equation (43). By doing this, it is possible to represent the two first-order function equations by the three parameters e, d, and r. That is, it is possible to reduce the number of parameters required for representing the two first-order function equations. The parameters e, d, and r of equation (43) are calculated based on the following equation:

$$e1 = e1^* \cdot ktha$$

$$e2 = e2^* \cdot ktha$$

$$d = d^* \cdot ktha \cdot kpa$$

$$r = r^* \cdot ktha \cdot kpa$$

Here, e1* and e2* are the gradients when the engine ambient environmental conditions are predetermined standard environmental conditions, and d* and r* are the intake pipe pressure and engine load factor, respectively, at the connection point when the engine ambient environmental conditions are predetermined standard environmental conditions. It is possible to use any conditions as the standard environmental conditions, but in the present embodiment, standard conditions (1 atmosphere and 25° C.) are used as the standard environmental conditions.

On the other hand, ktha represents the atmospheric temperature correction coefficient, while kpa represents the atmospheric pressure correction coefficient. The atmospheric temperature correction coefficient ktha is for correcting the parameters e1*, e2*, d*, and r* at the standard environmental conditions in accordance with the actual atmospheric temperature detected by the atmospheric temperature sensor 44. When there is no need for correction, it is made 1.0. Further, the atmospheric pressure correction coefficient kpa is for correcting the parameters d* and r* in the standard environmental conditions in accordance with the actual atmospheric pressure detected by the atmospheric pressure sensor 45. When there is no need for correction, it is made 1.0.

Therefore, considering the fact that the atmospheric temperature correction coefficient ktha and the atmospheric pressure correction coefficient kpa are representative values representing the actual engine ambient environmental conditions, the parameters e1*, e2, d*, and r* in the standard environmental conditions are corrected based on the representative values representing the actual engine ambient environmental conditions. Alternatively, there is also the viewpoint of correcting the engine load factor KLon in the standard environmental conditions based on the representative values representing the actual engine ambient environmental conditions.

On the other hand, considering the fact that the opening sectional area $A_e$ of the EGR control valve 22 at equation (17) depends on the EGR opening degree $\theta_e$ and the engine charging efficiency depends on the engine speed NE, in the present embodiment, the parameters e (e1*, e2*), d*, and r* are set in accordance with the EGR opening degree $\theta_e$ and/or the engine speed NE.

Explaining this in more detail, as shown in FIG. 35A, the gradient e1* becomes larger as the engine speed NE becomes higher when the engine speed NE is low, becomes smaller as the engine speed NE becomes higher when the engine speed NE is high, and becomes larger as the EGR opening degree $\theta_e$ becomes larger. Further, as shown in FIG. 35B, the gradient e2* becomes larger as the engine speed NE becomes higher when the engine speed NE is low, becomes smaller as the engine speed NE becomes higher when the engine speed NE is high, and becomes larger as the EGR opening degree $\theta_e$ becomes larger. Further, the gradients e1* and e2* are found in advance by experiments and are stored in advance in the ROM 34 in the form of maps as shown in FIG. 35C and FIG. 35D as functions of the engine speed NE and EGR opening degree $\theta_e$.

Figure 36:
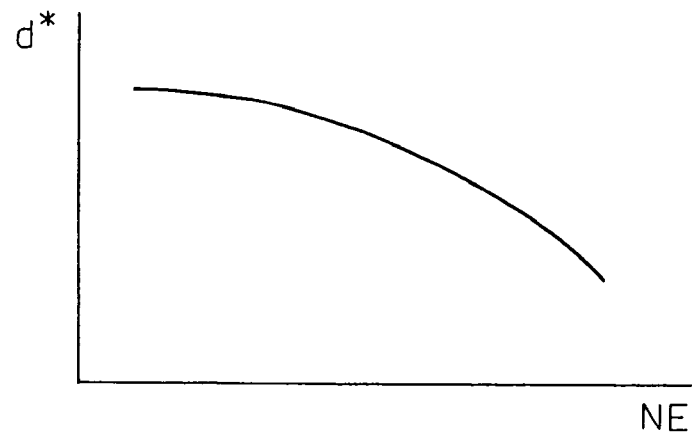
FIG. 36 is a graph of an intake pipe pressure d* at a connection point.

On the other hand, the intake pipe pressure d* at the connection point CP, as shown in FIG. 36, becomes smaller as the engine speed becomes higher. The intake pipe pressure d* at the connection point CP is found in advance by experiments and is stored in advance in the ROM 34 in the form of a map shown in FIG. 36 as a function of the engine speed NE.

Figure 37A:
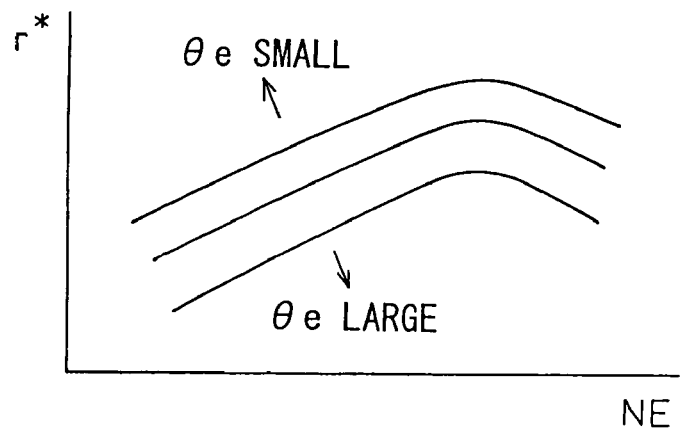
FIG. 37A is a graph of an engine speed NE, EGR opening degree $θ_e$, and engine load factor r* at a connection point.
Figure 37B:
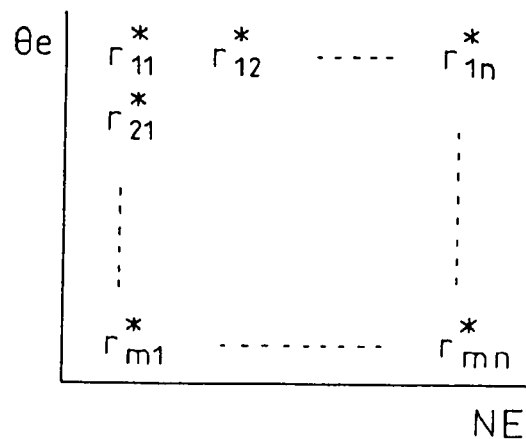
FIG. 37B is a view of a map of an engine load factor r* of a function of the engine speed NE and EGR opening degree $θ_e$.

Further, the engine load factor r* at the connection point CP, as shown in FIG. 37A, becomes larger as the engine speed NE becomes higher when the engine speed NE is low, becomes smaller as the engine speed NE becomes higher when the engine speed NE is high, and becomes smaller as the EGR opening degree $\theta_e$ becomes larger. The engine load factor r* at the connection point CP is also found in advance by experiments and stored in advance in the ROM 34 in the form of a map as shown in FIG. 37B as a function of the engine speed NE and the EGR opening degree $\theta_e$.

Therefore, speaking generally, two first-order function equations of the intake pipe pressure $P_m$ representing the amount of cylinder charging fresh air $M_{c-air}$ or the engine load factor KLon at the time of steady state operation are found in advance and stored for a plurality of different EGR opening degrees $\theta_e$. Further, two first-order function equations of the intake pipe pressure $P_m$ representing the amount of cylinder charging fresh air $M_{c-air}$ or the engine load factor KLon at the time of steady state operation are found in advance and stored for a plurality of different engine speeds NE.

Figure 38:
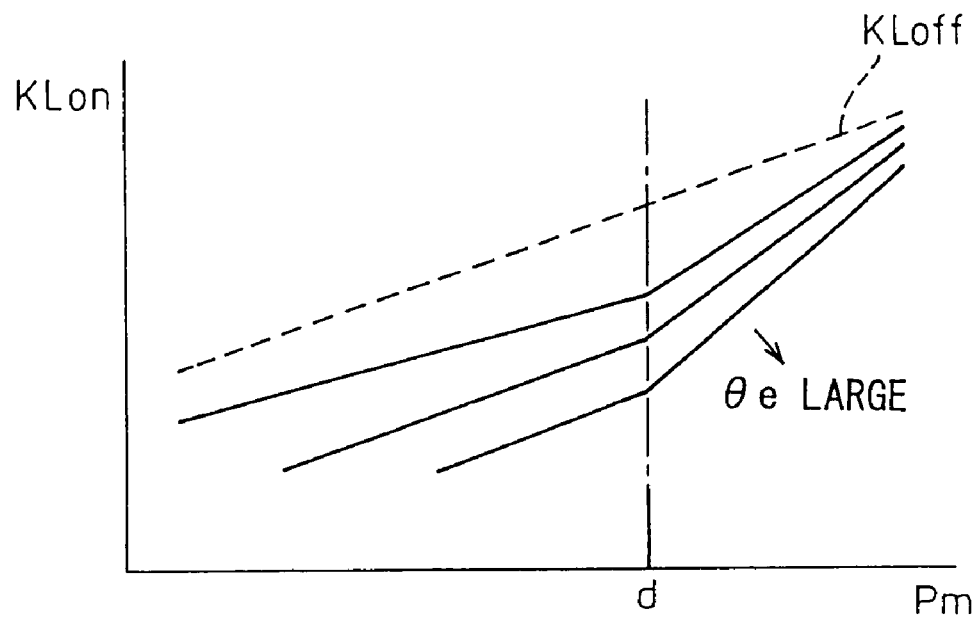
FIG. 38 is a graph of an example of a relationship between an engine load factor KLon and an intake pipe pressure $P_m$.

FIG. 38 shows an example of two first-order function equations of the intake pipe pressure $P_m$ showing the engine load factor KLon at the time of steady state operation at a constant engine speed NE and various EGR opening degrees $\theta_e$. Note that the broken line in FIG. 38 shows the engine load factor KLoff when the EGR gas is not being supplied, that is, when the EGR opening degree $\theta_e$ is zero.

Figure 39:
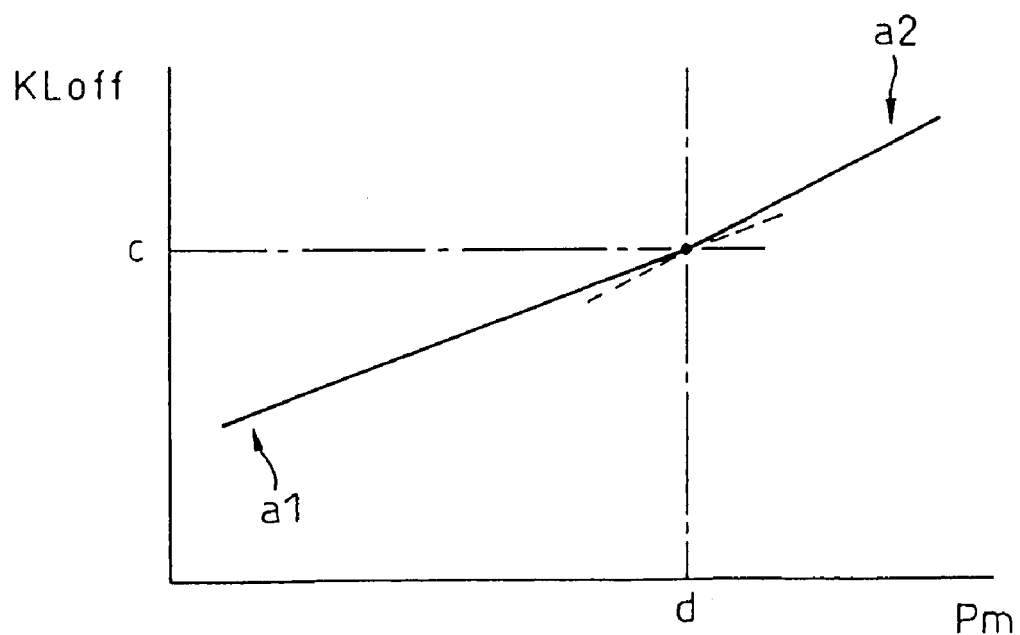
FIG. 39 is a graph of an example of a relationship between an engine load factor KLoff and an intake pipe pressure $P_m$.

On the other hand, as explained above, it is possible to represent the engine load factor KLoff when the EGR gas is not being supplied by a first-order function equation of the intake pipe pressure $P_m$. FIG. 39 shows an example of two first-order function equations of the intake pipe pressure $P_m$ representing the engine load factor KLoff at the time of steady state operation (for example, when the engine speed NE is being held constant). In this embodiment, as shown in FIG. 39, the engine load factor KLoff is represented by two first-order function equations of the intake pipe pressure $P_m$ with different gradients and connected at the connection point CP. That is, when the intake pipe pressure $P_m$ is low, the engine load factor KLoff is represented by a first-order function equation of the gradient a1, while when the intake pipe pressure $P_m$ is high, the engine load factor KLoff is represented by a first-order function equation of the gradient a2.

Here, if making the gradients of the two first-order function equations a1 and a2 and making the intake pipe pressure and engine load factor at the connection point CP d and c, it is possible to represent the two first-order function equations by the following equations:

$$KLoff = a1 \cdot (P_m - d) + c \ldots P_m \leq d$$

$$KLoff = a2 \cdot (P_m - d) + c \ldots P_m > d$$

If representing these all together, the following equation (44) results:

$$KLoff = a \cdot (P_m - d) + c \quad (44)$$

a=a1 ... $P_m \leq d$ a=a2 ... $P_m > d$

In the present embodiment, the two first-order function equations of the intake pipe pressure $P_m$ representing the engine load factor KLoff at the time of steady state operation are stored in advance in the ROM 34 in the form shown in equation (44). Note that the intake pipe pressure d at the connection point CP in this case is the same as the intake pipe pressure d at the connection point CP for the above-mentioned engine load factor KLon. Therefore, it is possible to further reduce the number of parameters. Of course, it is also possible to make the intake pipe pressures at the connection points CP differ. The parameters a and r of this equation (44) are calculated based on the following equations:

$$a1 = a1^* \cdot ktha$$

$$a2 = a2^* \cdot ktha$$

$$c = c^* \cdot ktha \cdot kpa$$

Here, a1* and a2* are the gradients when the engine ambient environmental conditions are the above-mentioned standard environmental conditions, that is, the standard conditions, and c* is the engine load factor when the engine ambient environmental conditions are the above-mentioned standard environmental conditions, that is, the standard conditions.

Therefore, if considering that the atmospheric temperature correction coefficient ktha and the atmospheric pressure correction coefficient kpa are representative values representing the actual engine ambient environmental conditions, the parameters a1*, a2*, and c* at the standard environmental conditions are corrected based on the representative values representing the actual engine ambient environmental conditions. Alternatively, there is also the viewpoint of correcting the engine load factor KLoff at the standard environmental conditions based on the representative values representing the actual engine ambient environmental conditions.

On the other hand, in the present embodiment, the parameters a* (a1*, a2*) and c* are set in accordance with the engine speed NE considering the fact that the engine charging efficiency depends on the engine speed NE.

Figure 40A:
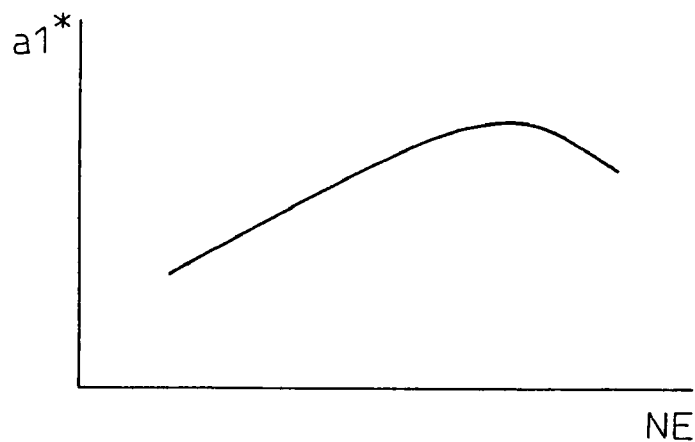
FIG. 40A is a graph of a relationship between an engine speed NE and a gradient a1*.
Figure 40B:
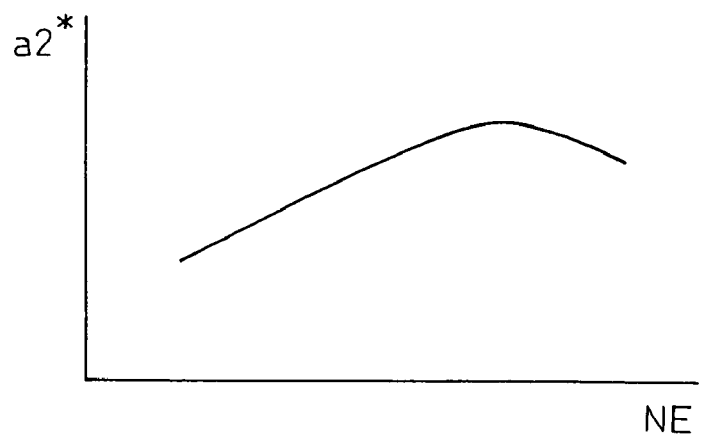
FIG. 40B is a graph of a relationship between an engine speed NE and a gradient a2*.

Explaining this more concretely, the gradient a1*, as shown in FIG. 40A, becomes larger as the engine speed NE becomes higher when the engine speed NE is low and becomes smaller as the engine speed NE becomes higher when the engine speed NE is high. Further, the gradient a2*, as shown in FIG. 40B, becomes larger as the engine speed NE becomes higher when the engine speed NE is low and becomes smaller as the engine speed becomes higher when the engine speed NE is high. These gradients a1* and a2* are found in advance by experiments and are stored in advance in the ROM 34 in the form of the map shown in FIG. 40A and FIG. 40B as a function of the engine speed NE.

Figure 41:
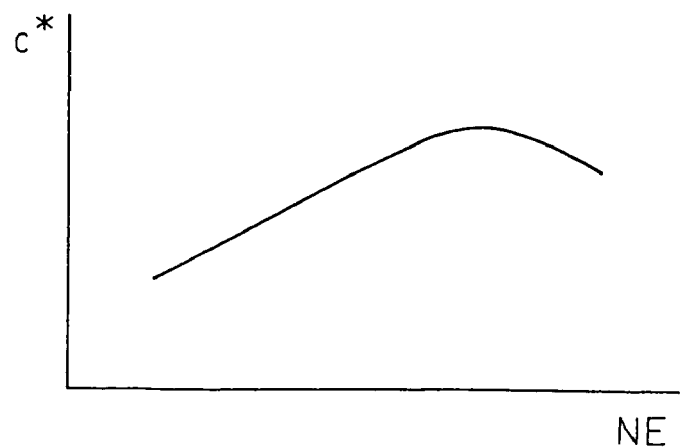
FIG. 41 is a graph of an engine load factor c at a connection point.

Further, the engine load factor c* at the connection point CP, as shown in FIG. 41, becomes larger as the engine speed NE becomes higher when the engine speed NE is low and becomes smaller as the engine speed becomes higher when the engine speed NE is high. The engine load factor c* at the connection point CP is also found in advance by experiments and stored in advance in the ROM 34 in the form of a map shown in FIG. 41 as a function of the engine speed NE.

Therefore, generally speaking, two first-order function equations of the intake pipe pressure $P_m$ representing the amount of cylinder charging fresh air $M_{c\text{-}air}$ or the engine load factor KLoff at the time of steady state operation are found in advance and stored for a plurality of different engine speeds NE. This being the case, if detecting the intake pipe pressure $P_m$ by for example the pressure sensor 39, it is possible to accurately and simply find the engine load factor KLon or KLoff using the above equation (43) or (44) from the detected intake pipe pressure $P_m$ and therefore possible to make the air-fuel ratio accurately and simply match the target air-fuel ratio.

Representing the engine load factors KLon and KLoff by the first-order function equations of the intake pipe pressure $P_m$ in this way means that it is possible to prepare maps representing the relationships between the engine load factors KLon and KLoff and the intake pipe pressure $P_m$. Therefore, first, the labor in preparing the maps is eliminated. Further, it means there is no need to solve complicated differential equations etc. Therefore, the calculation load of the CPU 35 can be lightened.

As will be understood with reference to equation (25), however, the engine load factor KL can be said to represent the amount of cylinder charging fresh air $M_{c\text{-}air}$. Here, if considering the fact that only fresh air is charged in a cylinder when EGR gas is not being supplied, the engine load factor KLoff when EGR gas is not being supplied can be considered to represent the total amount of the gas charged in the cylinder at this time, that is, the amount of cylinder charging gas $M_c$ at this time.

Here, if considering the fact that the amount of cylinder charging gas $M_c$ does not change between when the EGR gas is being supplied and is not being supplied, the engine load factor KLoff when the EGR gas is not being supplied can be said to represent not only the amount of cylinder charging gas $M_c$ when the EGR gas is not being supplied, but also the amount of cylinder charging gas $M_c$ when the EGR gas is being supplied.

On the other hand, the fact that the amount of cylinder charging fresh air $M_{c\text{-}air}$ at the time of steady state operation and the time when the EGR gas is being supplied is represented by the engine load factor KLon was explained above. Therefore, the result ΔKL (=KLoff−KLon) obtained by subtracting the engine load factor KLon when the EGR gas is being supplied from the engine load factor KL off when the EGR gas is not being supplied represents the amount of cylinder charging EGR gas $M_{c\text{-}egr}$ at the time of steady state operation.

Figure 42:
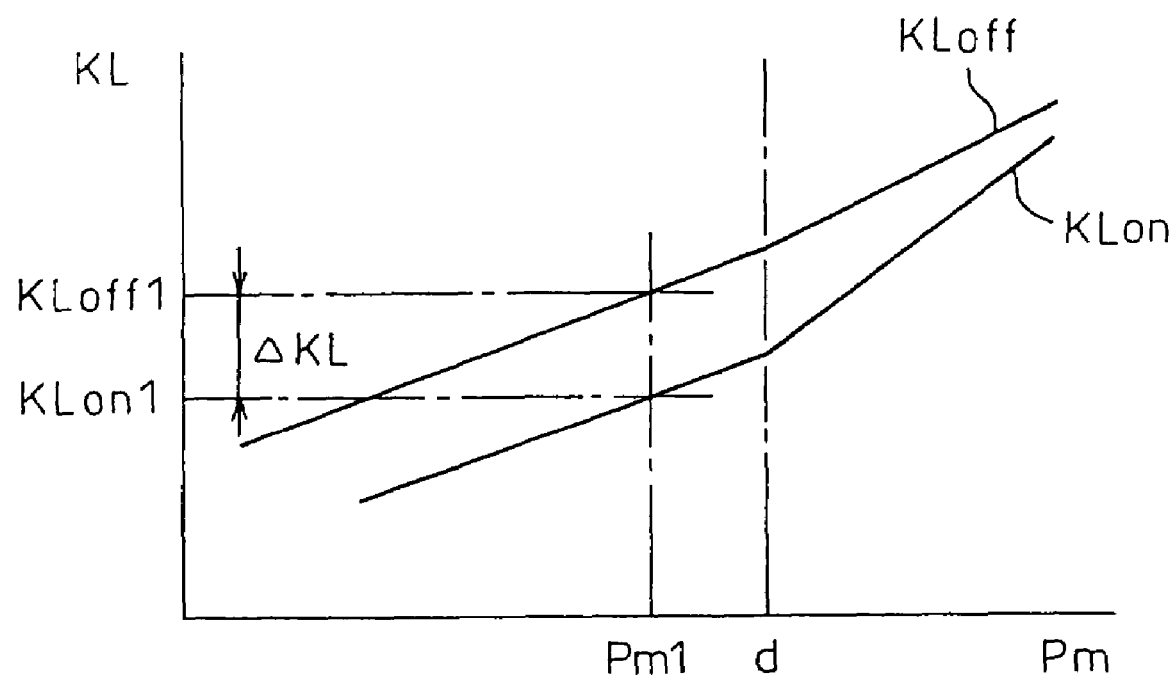
FIG. 42 is a graph for explaining a difference ΔKL.

Explaining this more specifically, for example, as shown in FIG. 42, when $P_m = P_m1$, KLoff=KLoff1 and KLon=KLon1, the amount of cylinder charging EGR gas $M_{c\text{-}egr}$ at the time of steady state operation is represented by $\Delta KL$ (=KLoff1−KLon1).

Therefore, the amount of cylinder charging EGR gas $M_{c\text{-}egr}$ at the time of steady state operation can be calculated based on the following equation (45):

$$M_{c\text{-}egr} = kegr1 \cdot \Delta KL \quad (45)$$

Here, kegr1 represents the conversion coefficient from the engine load factor KL to the amount of cylinder charging EGR gas $M_{c\text{-}egr}$, while KLoff and KLon represent the engine load factor calculated from the above equations (43) and (44).

Therefore, if calculating the intake pipe pressure $P_m$ by the above calculation equation or detecting it by a pressure sensor, it is possible to accurately and simply find the amount of cylinder charging EGR gas $M_{c\text{-}egr}$ at the time of steady state operation from the intake pipe pressure $P_m$ using the above equation (45).

As explained above, however, at the time of steady state operation, the EGR control valve passage gas flow rate $m_{egr}$ and the amount of cylinder intake EGR gas $m_{c\text{-}egr}$ are equal, and the amount of cylinder charging EGR gas $M_{c\text{-}egr}$ is represented by the product of the amount of cylinder intake EGR gas $m_{c\text{-}egr}$ and $\Delta T$(sec) ($M_{c\text{-}egr} = m_{c\text{-}egr} \cdot \Delta T$) Therefore, the above difference $\Delta KL$ represents the EGR control valve passage gas flow rate $m_{egr}$ at the time of steady state operation.

In the present embodiment, the EGR control valve passage gas flow rate $m_{egr}$ at the time of steady state operation is calculated based on the following equation (46):

$$m_{egr} = kegr2 \cdot \Delta KL \quad (46)$$

Here, kegr2 represents the conversion coefficient from the engine load factor KL to the EGR control valve passage gas flow rate $m_{egr}$, while KLoff and KLon represent the engine load factors calculated from the above equations (43) and (44).

As explained up until now, the EGR control valve passage gas flow rate $m_{egr}$ at the time of steady state operation was calculated using the above equation (46). However, it is also possible to calculate the EGR control valve passage gas flow rate $m_{egr}$ at the time of transient operation using this equation (46). That is, the EGR control valve passage gas flow rate $m_{egr}$ is greatly dependent on the pressure difference upstream and downstream of the EGR control valve 22, that is, the difference between the exhaust pressure $P_e$ and the intake pipe pressure $P_m$. If considering the fact that the exhaust pressure $P_e$ and the exhaust temperature $T_e$ upstream of the EGR control valve 22 at the time of transient operation are not that different from the exhaust pressure $P_e$ and exhaust temperature $T_e$ at the time of steady state operation, whether the steady state operation or transient operation, if the intake pipe pressure $P_m$ is determined, the EGR control valve passage gas flow rate $m_{egr}$ is determined.

Therefore, it is possible to accurately and simply find the EGR control valve passage gas flow rate $m_{egr}$ at the time of steady state operation and transient operation from the intake pipe pressure $P_m$ using the above equation (46). In this case, the amount of cylinder charging EGR gas $M_{c\text{-}egr}$ at the time of steady state operation can be calculated from the EGR control valve passage gas flow rate $m_{egr}$ at the time of steady state operation and can be calculated from the difference $\Delta KL$ using the above equation (45).

Figure 43:
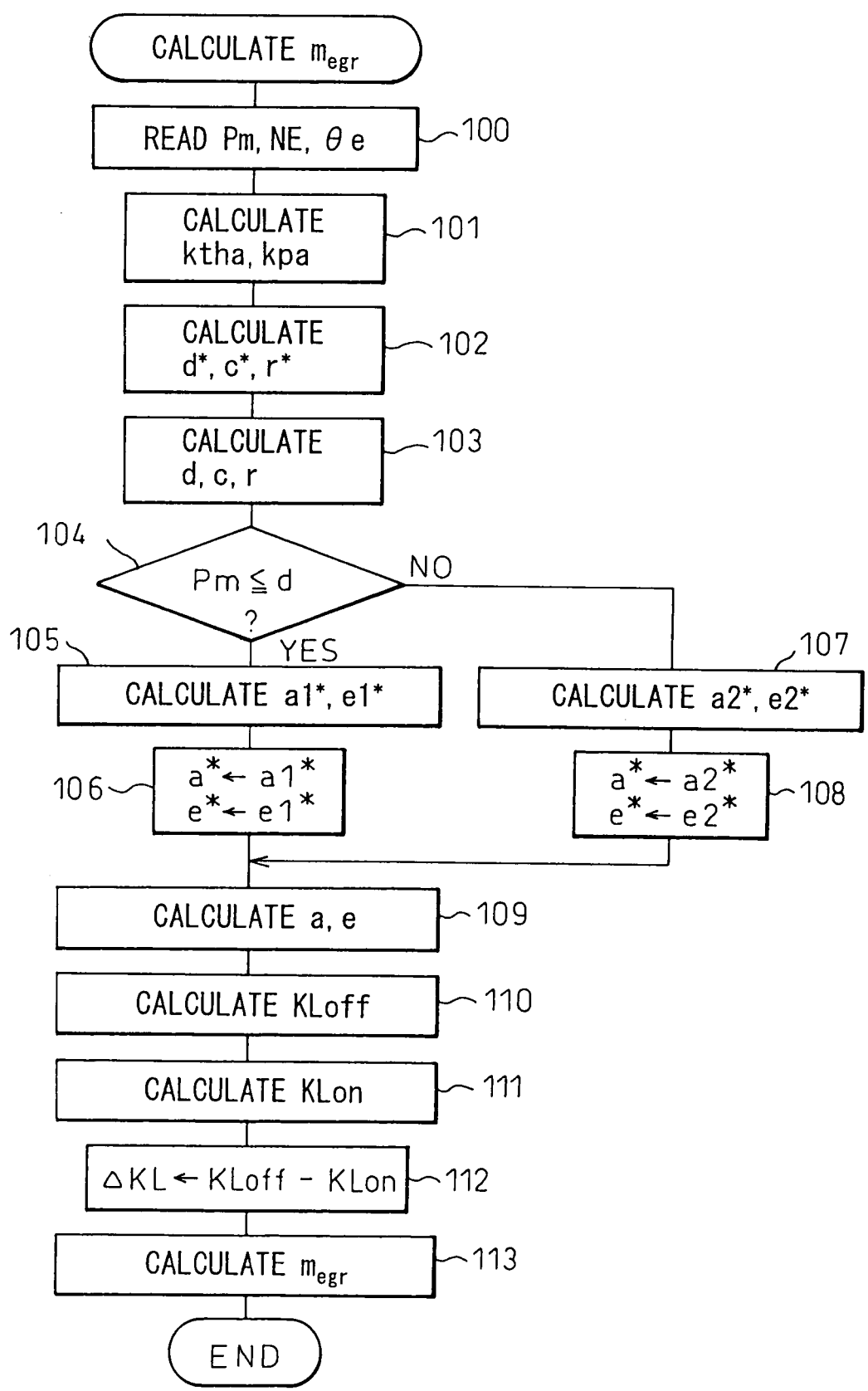
FIG. 43 is a flow chart of a routine for calculation of an EGR control valve passage gas flow rate $m_{egr}$.

FIG. 43 shows a routine for calculating the EGR control valve passage gas flow rate $m_{egr}$ in the above embodiment. This routine is executed by interruption every predetermined set time.

Referring to FIG. 43, first, at step 100, the intake pipe pressure $P_m$, the engine speed NE, and the EGR opening degree $\theta_e$ are read in. Next, at step 101, the atmospheric temperature correction coefficient ktha and the atmospheric pressure correction coefficient kpa are calculated. Next, at step 102, the intake pipe pressure d* and the engine load factors c* and r* at the connection point CP under the standard environmental conditions are calculated from the maps of FIG. 36, FIG. 37B, and FIG. 41. Next, at step 103, the parameters d, c, and r are calculated by correcting d*, c*, and r* by ktha and kpa. Next, at step 104, it is judged if the detected intake pipe pressure $P_m$ is the intake pipe pressure d at the connection point or less. When $P_m \leq d$, next, the routine proceeds to step 105, where a1* and e1* are calculated from the maps of FIG. 35C and FIG. 40A. Next, at step 106, the gradients a* and e* are made a1* and e1*. Next, the routine proceeds to step 109. As opposed to this, when $P_m > d$, next the routine proceeds to step 107, where a2* and e2* are calculated from the maps of FIG. 35D and FIG. 40B. Next, at step 108, the gradients a* and e* are made a2* and e2*. Next, the routine proceeds to step 109.

At step 109, by correcting a* and e* by ktha and kpa, the parameters a and e are calculated. Next, at step 110, the engine load factor KLoff is calculated based on equation (44) (KLoff=a·($P_m$−d)+c). Next, at step 111, the engine load factor KLon is calculated based on equation (43) (KLon=e·($P_m$−d)+r). Next, at step 112, the difference $\Delta KL$ is calculated ($\Delta KL$=KLoff−KLon). Next, at step 113, the EGR control valve passage gas flow rate $m_{egr}$ is calculated based on equation (45) ($m_{egr}$=kegr2·$\Delta KL$).

In the above embodiment, the engine load factors KLoff and KLon are represented by two first-order function equations each. However, it is also possible to represent the engine load factors KLoff and KLon by n number of m-order function equations each (n, m=1, 2 . . . ).

Therefore, in the above embodiment, the amount of cylinder charging fresh air or engine load factor KLoff when in the steady state operation and the EGR gas is not being supplied is represented by a first function equation defined as the function equation of the intake pipe pressure $P_m$ and the first function equation is found in advance and stored, the amount of cylinder charging fresh air or engine load factor KLon when in the steady state operation and the EGR gas is being supplied is represented by a second function equation defined as the function equation of the intake pipe pressure $P_m$ and the second function equation is found in advance and stored, the amounts of cylinder charging fresh air or engine load factors KLoff and KLon are calculated from the found intake pipe pressure $P_m$ using the first function equation and second function equation, the difference $\Delta KL$ of the calculated amounts of cylinder charging fresh air or of the engine load factors KLoff and KLon is calculated, and the amount of EGR control valve passage gas $m_{egr}$ is calculated based on the difference $\Delta KL$.

Further, generally speaking, the difference $\Delta KL$ between the amount of cylinder charging fresh air or engine load factor KLoff when in the steady state operation and the EGR gas is not being supplied and the amount of cylinder charging fresh air or engine load factor KLon when in the steady state operation and the EGR gas is being supplied is represented by a function equation of the intake pipe pressure $P_m$ and the function equation is found in advance and stored, the difference $\Delta KL$ is calculated from the found intake pipe pressure $P_m$ using the function equation, and the amount of EGR control valve passage gas $m_{egr}$ at the steady state operation and transient operation and the amount of cylinder charging EGR gas $M_{c\text{-}egr}$ at the steady state operation are calculated based on the difference $\Delta KL$.

Next, another embodiment of the present invention will be explained. The above-mentioned difference $\Delta KL$ can be represented as shown by the following equation (47) using equations (44) and (43) representing the KLoff and KLon:

$$\Delta KL = KLoff - KLon \qquad (47)$$
$$= (a-e)\cdot(P_m - d) + (c - r)$$

Here, if replacing (a-e) with h and (c-r) with i, equation (47) becomes as follows:

$$\Delta KL = h\cdot(P_m-d)+i \qquad (48)$$

h=h1 ... $P_m \leq d$ h=h2 ... $P_m > d$

Figure 44:
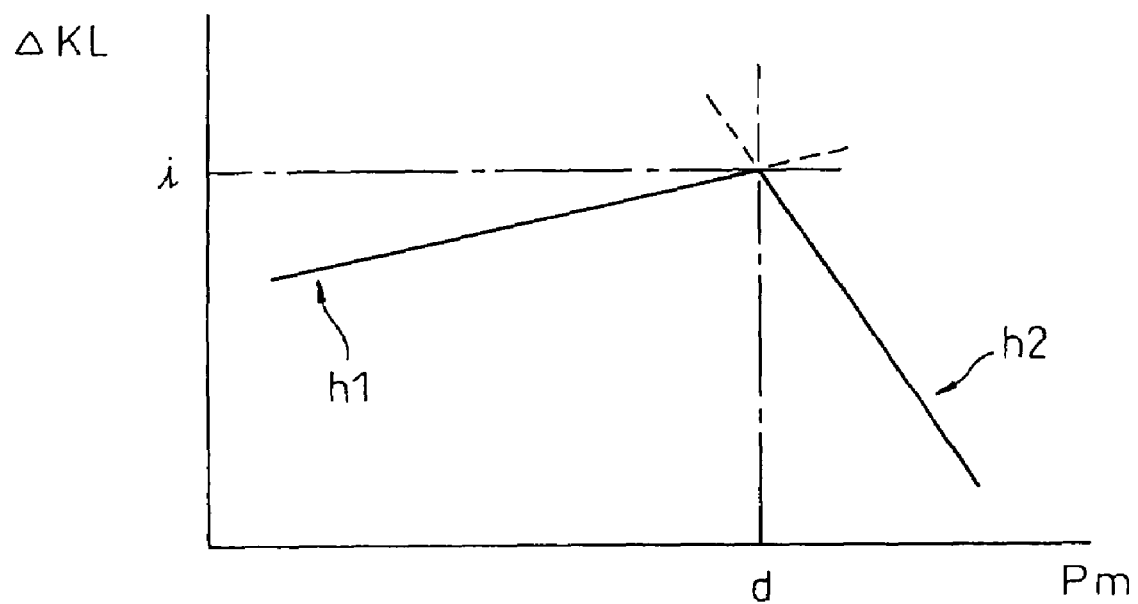
FIG. 44 is a graph of an example of a relationship between a difference ΔKL and an intake pipe pressure $P_m$.

Therefore, the difference $\Delta KL$, as shown in FIG. 44, is represented by two first-order function equations of the intake pipe pressure $P_m$ with different gradients and connected at the connection point CP. That is, the difference $\Delta KL$ is represented by a first-order function equation of the gradient h1 when the intake pipe pressure $P_m$ is small, while the difference $\Delta KL$ is represented by a first-order function equation of the gradient h2 when the intake pipe pressure $P_m$ is high.

In the present embodiment, two first-order function equations of the intake pipe pressure $P_m$ representing the difference $\Delta KL$ are stored in advance in the ROM 34 in the form shown in equation (48). By doing this, the number of parameters can be further reduced. The parameters h, d, and i in equation (48) are calculated based on the following equations:

$$h1 = h1^* \cdot ktha$$

$$h2 = h2^* \cdot ktha$$

$$i = i^* \cdot ktha \cdot kpa$$

Here, h1* and h2* are the gradients when the engine ambient environmental conditions are the standard environmental conditions and i* is the difference at the connection point CP when the engine ambient environmental conditions are the standard environmental conditions. These h1*, h2*, and i* are found in advance by experiments and are stored in advance in the ROM 34 in the form of maps as shown in FIG. 45A, FIG. 45B, and FIG. 45C as functions of the engine speed NE and the EGR opening degree $\theta_e$. Note that the parameter d is similar to that in the above embodiment, so its explanation will be omitted.

Therefore, generally speaking, two first-order function equations of the intake pipe pressure $P_m$ representing the difference $\Delta KL$ are found in advance and stored for a plurality of different EGR opening degrees $\theta_e$. Further, two first-order function equations of the intake pipe pressure $P_m$ representing the difference $\Delta KL$ are found in advance and stored for a plurality of different engine speeds NE.

Figure 46:
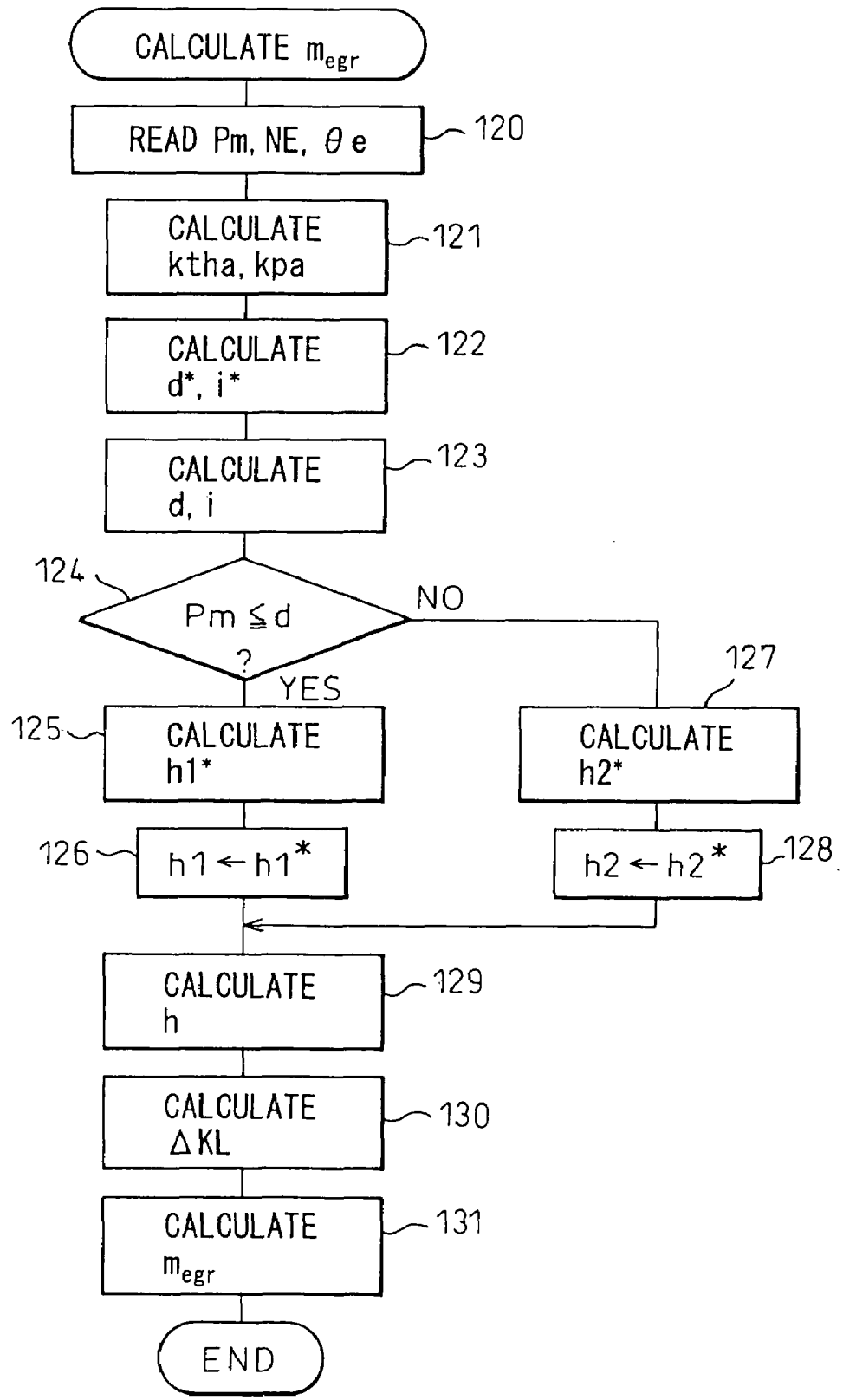
FIG. 46 is a flow chart of a routine for calculation of an EGR control valve passage gas flow rate $m_{egr}$ according to another embodiment of the present invention.

FIG. 46 shows the routine for calculation of the EGR control valve passage gas flow rate $m_{egr}$ in another embodiment of the present invention explained above. This routine is executed by interruption every predetermined set time.

Referring to FIG. 46, first, at step 120, the intake pipe pressure $P_m$, the engine speed NE, and the EGR opening degree $\theta_e$ are read in. Next, at step 121, the atmospheric temperature correction coefficient ktha and the atmospheric pressure correction coefficient kpa are calculated. Next, at step 122, the intake pipe pressure d* and the difference i* at the connection point CP under standard environmental conditions are calculated from the maps of FIG. 36 and FIG. 45C. Next, at step 123, d* and i* are corrected by ktha and kpa to calculate the parameters d and i. Next, at step 124, it is judged if the detected intake pipe pressure $P_m$ is the intake pipe pressure d at the connection point or less. When $P_m \leq d$, the routine next proceeds to step 125, where h1* is calculated from the map of FIG. 45A. Next, at step 126, the gradient h* is made h1*. Next, the routine proceeds to step 129. As opposed to this, when $P_m > d$, next, the routine proceeds to step 127, where h2* is calculated from the map of FIG. 45B. Next, at step 128, the gradient h* is made h2*. Next, the routine proceeds to step 129.

At step 129, by correcting h* by ktha and kpa, the parameter h is calculated. Next, at step 130, the difference $\Delta KL$ is calculated based on equation (48) ($\Delta KL = h\cdot(P_m-d)+i$). Next, at step 131, the EGR control valve passage gas flow rate $m_{egr}$ is calculated based on equation (46) ($m_{egr}=kegr2\cdot\Delta KL$). Here, the EGR opening degree $\theta_e$ will be simply explained. As explained above, the EGR opening degree is represented by the number of steps STP of the step motor of the EGR control valve 22. That is, if the number of steps becomes zero, the EGR control valve 22 closes. If the number of steps STP becomes greater, the EGR opening degree also becomes larger.

Figure 47:
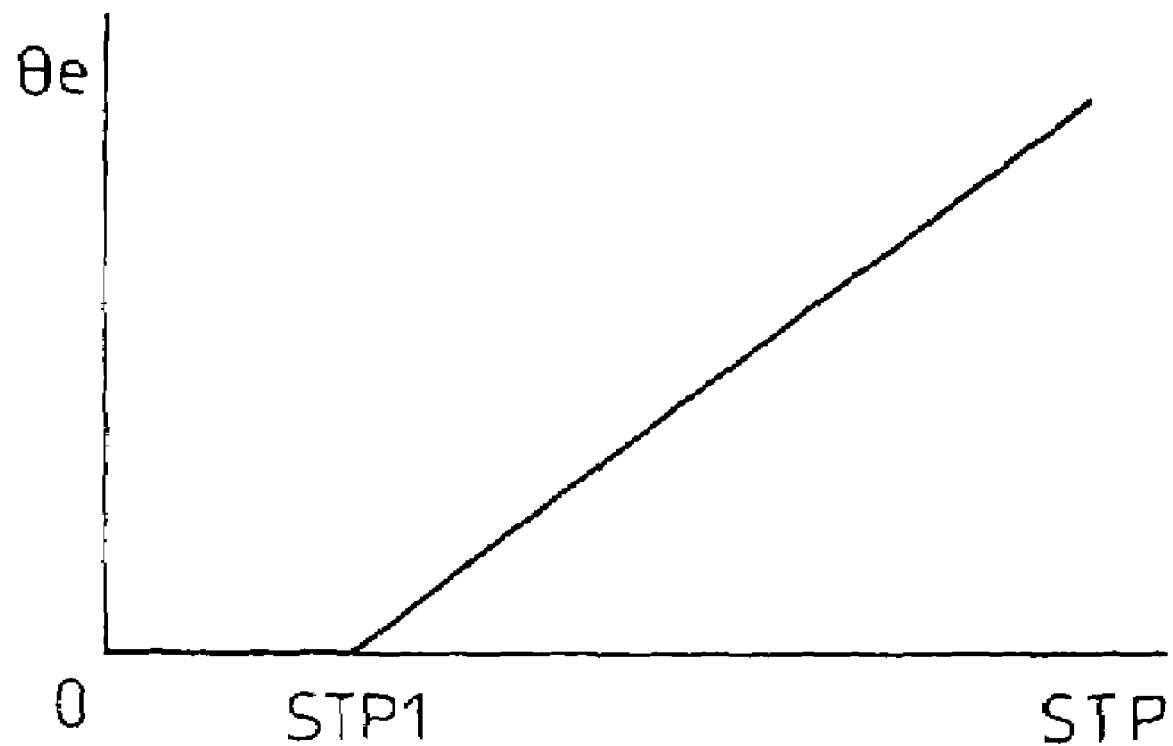
FIG. 47 is a graph of a relationship between an EGR opening degree $θ_e$ and a number of steps STP.

However, in actuality, even if the number of steps STP becomes large from zero as shown in FIG. 47, the EGR control valve 22 will not immediately open. If the number of steps STP exceeds STP1, the EGR control valve 22 finally opens. Therefore, it is necessary to represent the EGR opening degree $\theta_e$ by the result (STP−STP1) of the number of steps STP minus exactly STP1. Further, the EGR control valve 22 usually includes manufacturing error, so the actual EGR opening degree $\theta_e$ for the number of steps STP is liable to become off from the normal opening degree. Therefore, in the internal combustion engine shown in FIG. 1, a correction coefficient kg for making the actual EGR opening degree match with the normal opening degree is found and that correction coefficient kg is added to the number of steps STP.

Therefore, the EGR opening degree $\theta_e$ is represented by the following equation:

$$\theta_e = STP - STP0 + kg$$

where, STP0 is the number of steps at which the EGR control valve 22 starts to open in a center part of the tolerance of the drawings. In this embodiment, the thus calculated EGR opening degree $\theta_e$ is used as an argument of the map.

However, it is possible to further correct the EGR control valve passage gas flow rate $m_{egr}$ calculated in the above way or the amount of cylinder charging EGR gas $M_{c\text{-}egr}$ at the time of steady state operation considering the exhaust temperature $T_e$.

Explaining the case of correcting the EGR control valve passage gas flow rate $m_{egr}$, the EGR control valve passage gas flow rate $m_{egr}$ in this case is represented for example by the following equation:

$$m_{egr} = m_{egr}\cdot kwu\cdot krtd\cdot kinc$$

Here, kwu represents the warmup correction coefficient, krtd the retardation correction coefficient, and kinc the increase correction coefficient.

The warmup correction coefficient kwu is for correcting the EGR control valve passage gas flow rate $m_{egr}$ at the time of engine warmup operation. That is, at the time of warmup operation, the exhaust temperature $T_e$ becomes lower compared with after completion of warmup operation. The EGR control valve passage gas flow rate $m_{egr}$ (g/sec) becomes greater by that amount. The EGR control valve passage gas flow rate $m_{egr}$ calculated using equations (43) and (44) or equation (48) is the EGR control valve passage gas flow rate after the end of warmup operation. It is necessary to correct this.

Figure 48A:
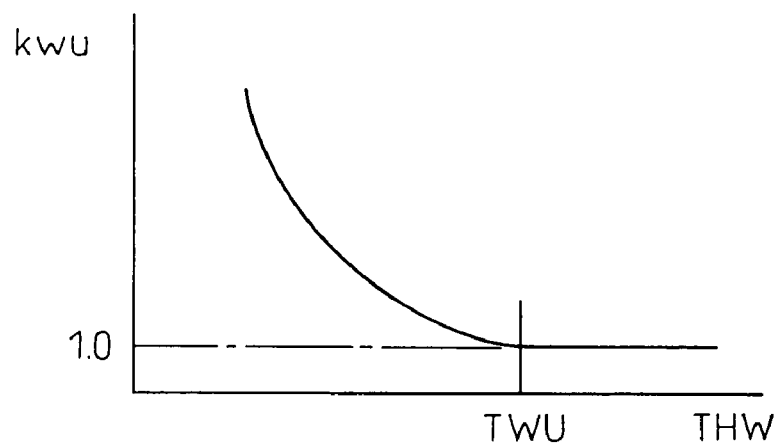
FIG. 48A is a view of a relationship between an engine cooling water temperature THW and engine warmup correction coefficient kwu.

The warmup correction coefficient kwu, as shown in FIG. 48A, becomes smaller as the engine cooling water temperature THW representing the extent of warmup becomes higher and is held at 1.0 when above the temperature TWU representing completion of warmup. The warmup correction coefficient kwu is stored in advance in the ROM 34 in the form of the map shown in FIG. 48A. On the other hand, the retardation correction coefficient krtd corrects the EGR control valve passage gas flow rate $m_{egr}$ when the ignition timing is retarded. That is, when the ignition timing is retarded, the exhaust temperature $T_e$ becomes higher compared with when the ignition timing is not retarded. The EGR control valve passage gas flow rate $m_{egr}$ becomes smaller by exactly that amount.

Figure 48B:
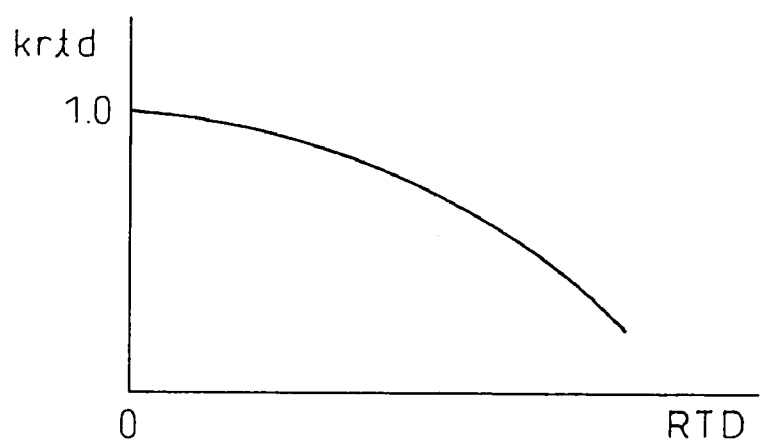
FIG. 48B is a view of a relationship between a retardation angle RTD and a retardation correction coefficient krtd.

The retardation correction coefficient krtd, as shown in FIG. 48B, is 1.0 when the retardation RTD is zero and becomes smaller as the retardation RTD becomes larger. This retardation correction coefficient krtd is stored in the ROM 34 in advance in the form of a map as shown in FIG. 48B.

Figure 48C:
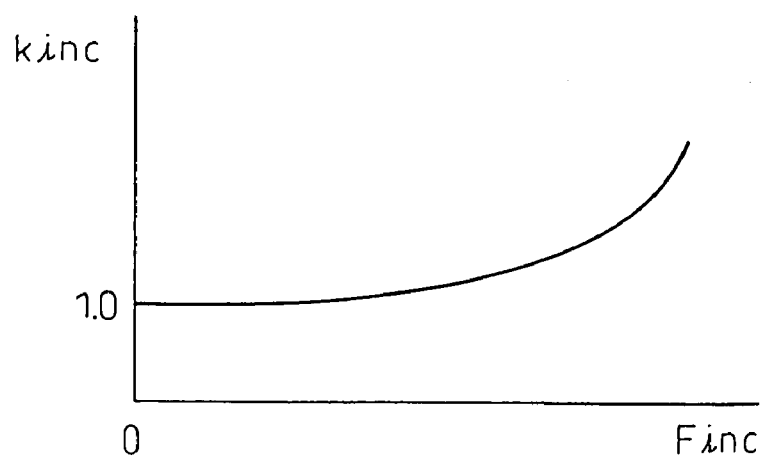
FIG. 48C is a view of a relationship between an increase correction Finc and an increase correction coefficient kinc.

Further, the increase correction coefficient kinc is for correcting the EGR control valve passage gas flow rate $m_{egr}$ when the fuel injection amount is increased. That is, when the fuel injection amount is increased, the exhaust temperature $R_e$ becomes lower compared with when the fuel injection amount is not increased. The EGR control valve passage gas flow rate $m_{egr}$ becomes larger by exactly that amount. The increase correction coefficient kinc, as shown in FIG. 48C, is 1.0 when the increase correction Finc is zero and becomes larger as the increase correction Finc becomes larger. This increase correction coefficient kinc is stored in advance in the ROM 34 in the form of the map shown in FIG. 48C. By doing this, it is possible to find the EGR control valve passage gas flow rate $m_{egr}$ by a further higher precision.

Note that it is also possible to find the exhaust temperature $T_e$ when the ignition timing is not being retarded or the fuel injection amount is not being increased in advance as a function of the engine operating state (for example, the engine speed NE and required load L), detect or estimate the actual exhaust temperature $T_e$, and correct the EGR control valve passage gas flow rate $m_{egr}$ based on the difference between the exhaust temperature $T_e$ when the ignition timing is not being retarded or the fuel injection amount is not being increased and the actual exhaust temperature $T_e$. The same is true for the amount of cylinder charging EGR gas $M_{c\text{-}egr}$ at the time of steady state operation, so the explanation will be omitted.

Figure 49:
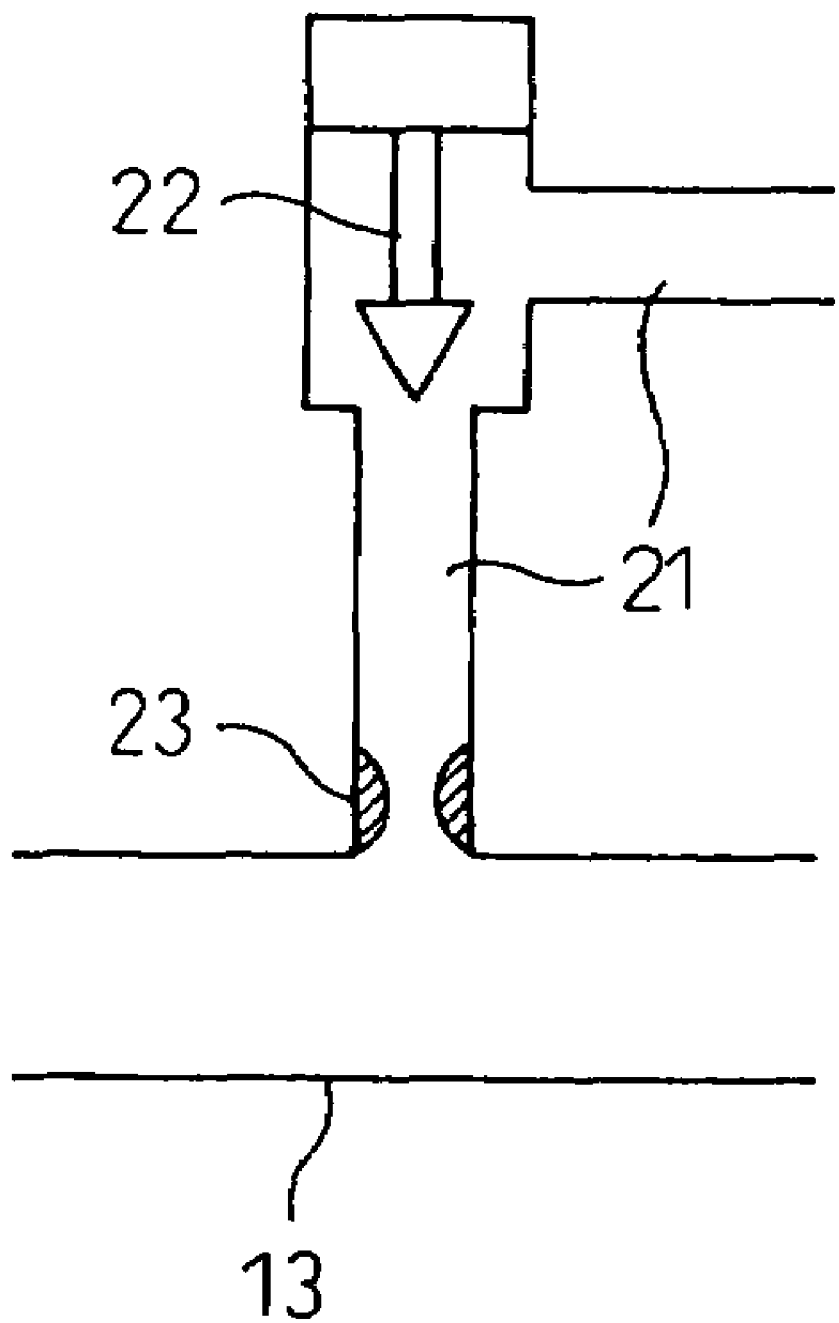
FIG. 49 is a partial view of an internal combustion engine of still another embodiment of the present invention.

In the internal combustion engine shown in FIG. 1, as explained above, the EGR passage 21 downstream of the EGR control valve 22 is divided and connected to the intake tubes 12 of the different cylinders. In this configuration, to suppress fluctuations in the amount of EGR gas fed to the cylinders, as shown in FIG. 49, it is possible to provide a constriction 23 in the EGR passage 21 downstream of the EGR control valve 22.

In this case, first, at the time of steady state operation, the constriction passage gas flow rate $m_{chk}$ (g/sec) defined as the flow rate of the EGR gas passing through the constriction 23 matches with the EGR control valve passage gas flow rate $m_{egr}$. Therefore, as will be understood from the explanation up until now, it is possible to calculate the constriction passage gas flow rate $m_{chk}$ at the time of steady state operation based on the difference $\Delta KL$. Note that the constriction passage gas flow rate $m_{chk}$ represents the flow rate of the EGR gas flowing into the intake pipe portion.

On the other hand, the constriction passage gas flow rate $m_{chk}$ does not necessarily match with the EGR control valve passage gas flow rate $m_{egr}$ at the time of transient operation. However, when the volume of the EGR passage 21 from the EGR control valve 22 to the constriction 23 is relatively small, $m_{chk}$ generally matches with $m_{egr}$. Therefore, when the volume of the EGR passage 21 from the EGR control valve 22 to the constriction 23 is relatively small, whether the steady state operation or the transient operation, it is possible to calculate the constriction passage gas flow rate $m_{chk}$ based on the difference $\Delta KL$.

In the present embodiment explained above, for example, the engine load factors KLon and KLoff or the difference $\Delta KL$ are calculated from the intake pipe pressure $P_m$ estimated using a calculation model or intake pipe pressure $P_m$ detected by the pressure sensor 39. However, for example, it is also possible to estimate the intake pipe pressure $P_m$ based on the throttle opening degree or the output of the air-flow meter arranged in the intake duct 14 upstream of the throttle valve 17 and calculate the engine load factor KL from the estimated intake pipe pressure $P_m$. Here, when estimating the intake pipe pressure $P_m$ based on the throttle opening degree, the intake pipe pressure $P_m$ is found in advance as a function of the throttle opening degree $\theta_t$, the engine speed NE, and the EGR opening degree $\theta_e$. This is stored in the form of a map.

On the other hand, when estimating the intake pipe pressure $P_m$ based on the output of the air-flow meter, due to the detection precision etc. of the air-flow meter, the estimated intake pipe pressure $P_m$ is liable to exceed the maximum pressure $P_{mmax}$ which the intake pipe pressure $P_m$ can take. In the region where $P_m > P_{mmax}$, however, as shown in FIG. 50B, sometimes the engine load factor KLon expressed by the above equation (43) becomes larger than even the engine load factor KLoff expressed by equation (44). In this case, the difference $\Delta KL$ becomes a negative value. That is, if the estimated intake pipe pressure $P_m$ exceeds the maximum pressure $P_{mmax}$, the difference $\Delta KL$ is liable to no longer be able to be accurately calculated.

Figure 50A:
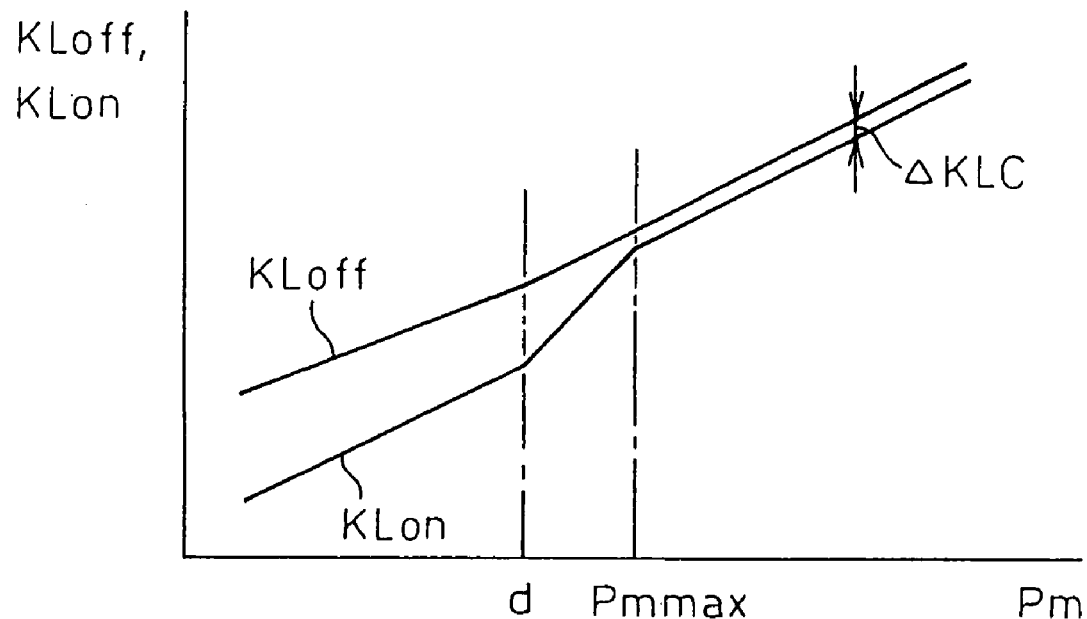
FIG. 50A is a view of a relationship between an intake pipe pressure $P_m$ and engine load factors KLon and KLoff.
Figure 50B:
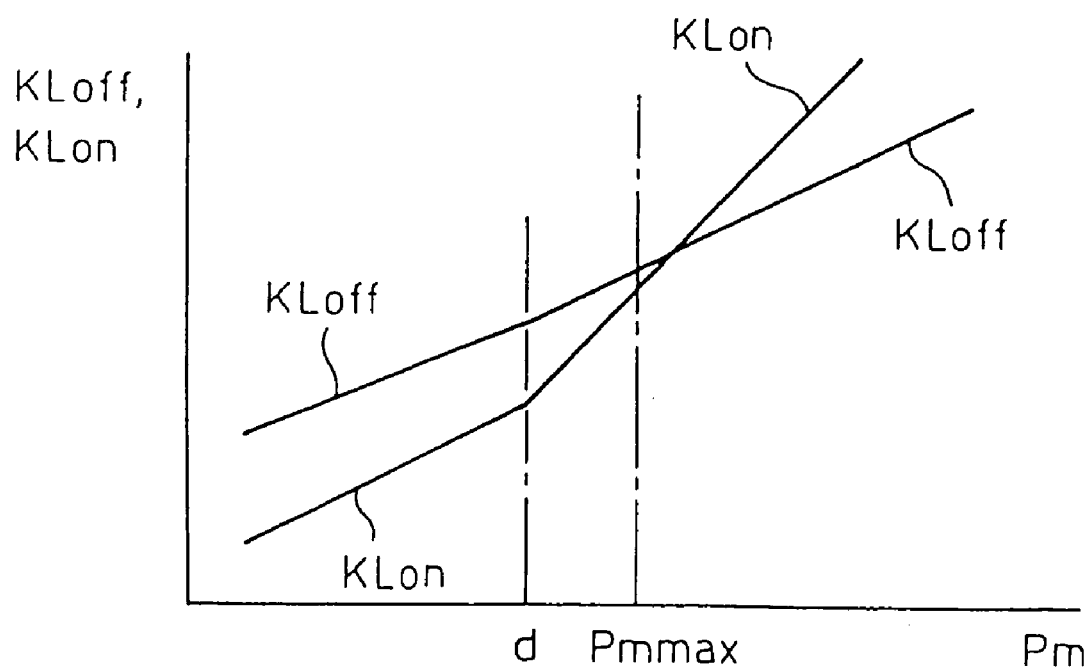
FIG. 50B is a view of a relationship between an intake pipe pressure $P_m$ and engine load factors KLon and KLoff.

Therefore, as shown in FIG. 50A, in the region where $P_m > P_{mmax}$, if holding the difference $\Delta KL$ at a constant value $\Delta KLC$, it is possible to eliminate such inconveniences. That is, when the estimated intake pipe pressure $P_m$ exceeds the maximum pressure $P_{mmax}$, it is possible to continue to accurately calculate the difference $\Delta KL$.

Figure 51A:
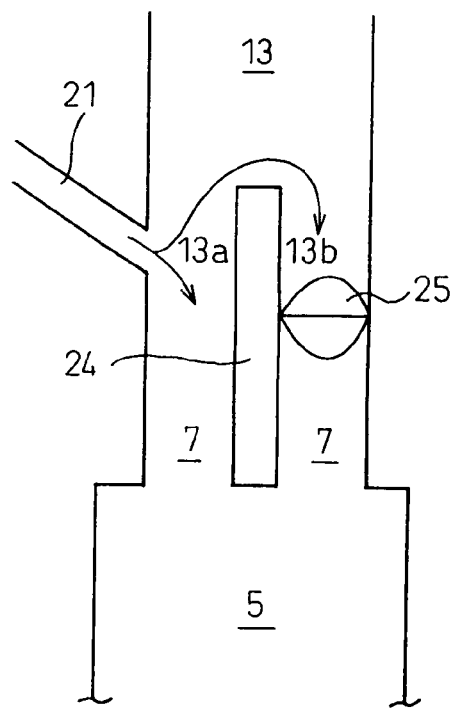
FIG. 51A is a view of an intake tube of an internal combustion engine provided with a swirl control valve.
Figure 51B:
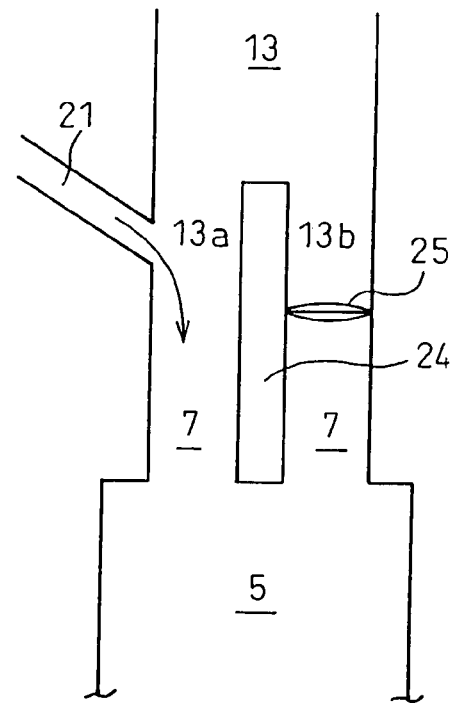
FIG. 51B is a view of an intake tube of an internal combustion engine provided with a swirl control valve in a state separate from the state shown in FIG. 51A.

However, as shown in FIG. 51A and FIG. 51B, there is known an internal combustion engine wherein a pair of intake passages 13a and 13b separated by a partition 24 are provided inside the intake tube 13 corresponding to each cylinder 5 and a swirl control valve 25 is arranged inside the intake passage 13b.

The swirl control valve 25 is for example closed at the time of engine low load operation and is open at the time of engine high load operation. As shown in FIG. 51A, when the swirl control valve 25 is open, the gas flows from the two intake passages 13a and 13b to the inside of the cylinder 5 and therefore sufficient fresh air is fed inside the cylinder 5. On the other hand, when the swirl control valve 25 is closed, gas from only the intake passage 13a flows into the cylinder 5 and therefore a swirl is formed around the cylinder axis inside the cylinder 5.

Here, if the swirl control valve 25 is closed, as explained above, the gas flows from only the intake passage 13a into the cylinder 5, so the volume of the channel from the EGR control valve 22 to the cylinder 5 becomes smaller compared with when the swirl control valve 25 is open. Further, when the swirl control valve 25 is closed, the flow rate of the gas near the outlet of the EGR passage 21 becomes faster. In particular, as shown in FIG. 51A and FIG. 51B, when the EGR passage 21 is connected to the intake passage 13a in the region separated by the partition 24, the rise in the gas flow rate near the outlet of the EGR passage 21 when the swirl control valve 25 is closed is large.

In this way, when the swirl control valve 25 is closed, the volume of the channel from the EGR control valve 22 to the cylinder 5 becomes smaller compared with the case where the swirl control valve 25 is open and the flow rate of the gas near the outlet of the EGR passage 21 becomes faster, so the time taken from when the exhaust gas passes through the EGR control valve 22 to when it reaches the cylinder 5 becomes shorter and the diffusion of the exhaust gas in the EGR passage 21 and intake passage 13a downstream from the EGR control valve 22 is promoted. That is, if the swirl control valve 25 is closed, the above dead time Td2 becomes shorter and the above time constant τ2 becomes smaller compared with when the swirl control valve 25 is open.

Therefore, when an internal combustion engine is provided with a swirl control valve 25, in the above embodiments, maps of the dead time Td2 and the time constant τ2 using the engine speed NE as a variable are found by experiments etc. based on the state where the swirl control valve 25 is open and stored in the ROM 34. When the swirl control valve 25 is open, the dead time Td2 and time constant τ2 found from the maps based on the engine speed NE are used to calculate the cylinder inflow exhaust gas flow rate $m_{egr\text{-}egr}$.

The maps of the dead time Td2 and time constant τ2 here take the forms such as shown in FIG. 17A and FIG. 17B. On the other hand, when the swirl control valve 25 is closed, the dead time Td2 and the time constant τ2 are found from the maps shown in FIG. 17A and FIG. 17B based on the engine speed NE, and the dead time Td2 and time constant τ2 calculated by multiplying the dead time Td2 and time constant τ2 with a correction coefficient smaller than 1.0 are used to calculate the cylinder inflow exhaust gas flow rate $m_{egr\text{-}egr}$. According to this, even when the internal combustion engine is provided with a swirl control valve, it is possible to calculate the cylinder inflow exhaust gas flow rate more accurately.

Note that this technical concept, explained more generally, may also be equally applied to an internal combustion engine designed so that the volume of the passage from the EGR control valve to the intake valve can be changed in accordance with the engine operating state or the channel sectional area of the intake passage can be changed in accordance with the engine operating state so that the gas flow rate near the outlet of the EGR passage opening to the intake passage can be changed.

However, if the swirl control valve is closed in an internal combustion engine provided with a swirl control valve such as shown in FIG. 51A and FIG. 51B, as explained above, the volume of the channel from the EGR control valve to the cylinder becomes smaller compared with the case where the swirl control valve is open and the flow rate of the gas near the outlet of the EGR passage becomes faster, so the amount of EGR gas charged in the cylinder becomes greater. That is, when the swirl control valve is closed, the amount of EGR gas charged in the cylinder becomes greater, so conversely the amount of fresh air charged in the cylinder becomes smaller and therefore the engine load factor becomes smaller.

Therefore, if the internal combustion engine is provided with a swirl control valve, when utilizing the above equation (43) to calculate the engine load factor KLon for when the EGR gas is fed into the cylinder, it is preferable to take into consideration the fact that the amount of EGR gas charged into the cylinder differs depending on whether the swirl control valve is open or closed.

Therefore, when the internal combustion engine is provided with a swirl control valve 25, in the above embodiments, maps for setting the parameters e (e1*, e2*), d*, r* used in equation (43) are found by experiments etc. based on the state where the swirl control valve 25 is open and stored in the ROM 34. When the swirl control valve 25 is open, the parameters e (e1*, e2*), d*, r* are found from these maps and the engine load factor KLon is calculated from equation (43) based on these parameters.

On the other hand, when the swirl control valve 25 is closed, the parameters e (e1*, e2*), d*, r* are found from the above map and the engine load factor KLon is calculated from equation (43) based on the parameter calculated by multiplying at least one of these parameters with a correction coefficient larger than 1.0. According to this, even if the internal combustion engine is provided with a swirl control valve, it is possible to more accurately calculate the engine load factor KLon. Note that this technical concept, explained more generally, may also be equally applied to an internal combustion engine designed so that the volume of the passage from the EGR control valve to the intake valve can be changed in accordance with the engine operating state or the channel sectional area of the intake passage can be changed in accordance with the engine operating state so that the gas flow rate near the outlet of the EGR passage opening to the intake passage can be changed.

Further, if directly calculating the cylinder inflow fresh air flow rate rather than calculating the cylinder inflow exhaust gas flow rate, when the swirl control valve is closed and the cylinder inflow exhaust gas flow rate becomes greater, it is sufficient to correct the cylinder inflow fresh air flow rate to become small faster compared with the case where the swirl control valve is open. Further, in the above equations (43) and (44), the parameter d* is made the value found from the same map in equations (43) and (44) in the above embodiments, but it is also possible to make the parameter d* used in equation (43) and the parameter d* used in equation (44) values found from different maps. Note that the amount is obtained by multiplying the flow rate with the time, so the flow rate in the above embodiments substantially also means the amount.

Further, the present invention is particularly advantageous if applied to an internal combustion engine having an EGR passage connected to an intake tube (or intake port) so that the exhaust gas fed to the intake tube through the EGR passage accumulates there.

While the invention has been described with reference to specific embodiments chosen for purpose of illustration, it should be apparent that numerous modifications could be made thereto by those skilled in the art without departing from the basic concept and scope of the invention.

The invention claimed is:

1. A cylinder inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, and the system calculating an amount of cylinder inflow exhaust gas defined as an amount of exhaust gas flowing into a cylinder, utilizing an amount of passage exhaust gas defined as an amount of exhaust gas passing through the exhaust gas flow rate control valve, wherein an amount of cylinder inflow exhaust gas is calculated considering the dead time corresponding to the time taken until the exhaust gas passing through said exhaust gas flow rate control valve reaches the cylinder and a tracking lag of a change in the amount of cylinder inflow exhaust gas with respect to a change in said amount of passage exhaust gas.

2. A cylinder inflow exhaust gas calculation system as set forth in claim 1, wherein said tracking lag is a first-order lag and a time constant of said first-order lag and said dead time are changed in accordance with an engine speed.

3. A cylinder inflow exhaust gas calculation system as set forth in claim 1, wherein the internal combustion engine is provided with a plurality of cylinders, a ratio of an actual amount of cylinder inflow exhaust gas in each cylinder with respect to said calculated amount of cylinder inflow exhaust gas is found in advance as a distribution constant, and said distribution constant is multiplied with said calculated amount of cylinder inflow exhaust gas to calculate the amount of cylinder inflow exhaust gas in each cylinder.

4. A cylinder inflow exhaust gas calculation system as set forth in claim 1, wherein the internal combustion engine is provided with a plurality of cylinders, and said tracking lag and dead time are set for each cylinder.

5. A cylinder inflow exhaust gas calculation system as set forth in claim 1, wherein the internal engine is provided with an intake valve with a variable closing timing, and the setting of said tracking lag and the setting of said dead time are changed in accordance with a closing time of the intake valve.

6. A cylinder inflow exhaust gas amount calculation system as set forth in claim 1, wherein a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

7. A cylinder inflow exhaust gas amount calculation system as set forth in claim 1, wherein a flow rate of gas near an opening of an exhaust gas recirculation passage opening to the intake passage can be changed by one of a change of passage volume from said exhaust gas flow rate control valve to said intake valve in accordance with an engine operating state and a change of a channel sectional area of said intake passage in accordance with the engine operating state, a function equation expressing the amount of passage exhaust gas by a function of the pressure in the intake passage, and a parameter other than the pressure in said intake passage is found and stored in advance, an amount of passage exhaust gas is calculated from the pressure in the intake passage utilizing the function equation, and the parameter other than the pressure in the intake passage is changed in accordance with one of said passage volume and said flow rate of gas.

8. A cylinder inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of passage exhaust gas defined as an amount of exhaust gas passing through an exhaust gas flow rate control valve, utilizing a parameter changing said amount of passage exhaust gas and the system calculating an amount of cylinder inflow exhaust gas defined as an amount of exhaust gas flowing into a cylinder, utilizing said calculated amount of passage exhaust gas, wherein a value of said parameter is read in, a dead time corresponding to the time taken until the exhaust gas passing through said exhaust gas flow rate control valve reaches the cylinder and a tracking lag of a change in the amount of cylinder inflow exhaust gas with respect to a change in said amount of passage exhaust gas are reflected in said read value, and the amount of passage exhaust gas is calculated utilizing the read value in which the dead time and tracking lag are reflected.

9. A cylinder inflow exhaust gas calculation system as set forth in claim 8, wherein said tracking lag is a first-order lag, and a time constant of said first-order lag and said dead time are changed in accordance with an engine speed.

10. A cylinder inflow exhaust gas calculation system as set forth in claim 8, wherein the internal combustion engine is provided with a plurality of cylinders, a ratio of an actual amount of cylinder inflow exhaust gas in each cylinder with respect to said calculated amount of cylinder inflow exhaust gas is found in advance as a distribution constant, and said distribution constant is multiplied with said calculated amount of cylinder inflow exhaust gas to calculate the amount of cylinder inflow exhaust gas in each cylinder.

11. A cylinder inflow exhaust gas calculation system as set forth in claim 8, wherein the internal combustion engine is provided with a plurality of cylinders, and said tracking lag and dead time are set for each cylinder.

12. A cylinder inflow exhaust gas amount calculation system as set forth in claim 8, wherein the internal engine is provided with an intake valve with a variable closing timing, and the setting of said tracking lag and the setting of said dead time are changed in accordance with a closing time of the intake valve.

13. A cylinder inflow exhaust gas amount calculation system as set forth in claim 8, wherein a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

14. An intake passage inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of an intake passage inflow exhaust gas defined as an amount of exhaust gas flowing into the intake passage, utilizing an amount of passage exhaust gas defined as an amount of exhaust gas passing through said exhaust gas flow rate control valve, wherein an intake passage inflow exhaust gas is calculated considering the dead time corresponding to the time taken until the exhaust gas passing through said exhaust gas flow rate control valve reaches the intake passage and a tracking lag of a change in the intake passage inflow exhaust gas with respect to a change in said amount of passage exhaust gas.

15. An intake passage inflow exhaust gas calculation system as set forth in claim 14, wherein said tracking lag is a first-order lag, and a time constant of said first-order lag and said dead time are changed in accordance with an engine speed.

16. An intake passage inflow exhaust gas calculation system as set forth in claim 14, wherein the internal combustion engine is provided with a plurality of cylinders, said exhaust gas recirculation passage is connected to an intake passage connected to each cylinder, a ratio of an actual amount of intake passage inflow exhaust gas to the intake passage cylinder connected to each cylinder with respect to said calculated amount of cylinder inflow exhaust gas is found in advance as a distribution constant, and said distribution constant is multiplied with said calculated amount of intake passage inflow exhaust gas to calculate the amount of intake passage inflow exhaust gas in the intake passage connected to each cylinder.

17. An intake passage inflow exhaust gas calculation system as set forth in claim 14, wherein the internal combustion engine is provided with a plurality of cylinders, and said tracking lag and dead time are set for each cylinder.

18. An intake passage inflow exhaust gas amount calculation system as set forth in claim 14, wherein the internal engine is provided with an intake valve with a variable closing timing, and the setting of said tracking lag and the setting of said dead time are changed in accordance with a closing time of the intake valve.

19. An intake passage inflow exhaust gas amount calculation system as set forth in claim 14, wherein a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

20. An intake passage inflow exhaust gas amount calculation system as set forth in claim 14, wherein a flow rate of gas near an opening of an exhaust gas recirculation passage opening to the intake passage can be changed by one of a change of passage volume from said exhaust gas flow rate control valve to said intake valve in accordance with an engine operating state and a change of a channel sectional area of said intake passage in accordance with the engine operating state, a function equation expressing the amount of passage exhaust gas by a function of the pressure in the intake passage, and a parameter other than the pressure in said intake passage is found and stored in advance, an amount of passage exhaust gas is calculated from the pressure in the intake passage utilizing the function equation, and the parameter other than the pressure in the intake passage is changed in accordance with one of said passage volume and said flow rate of gas.

21. An intake passage inflow exhaust gas amount calculation system of an internal combustion engine provided with an intake passage, an exhaust passage, an exhaust gas recirculation passage connecting the intake passage and exhaust passage, and an exhaust gas flow rate control valve arranged in the exhaust gas recirculation passage for controlling the flow rate of the exhaust gas flowing in the exhaust gas recirculation passage, the system calculating an amount of passage exhaust gas defined as an amount of exhaust gas passing through an exhaust gas flow rate control valve, utilizing a parameter changing said amount of passage exhaust gas and the system calculating an amount of intake exhaust gas defined as an amount of exhaust gas flowing into the intake passage, utilizing said calculated amount of passage exhaust gas, wherein a value of said parameter is read in, a dead time corresponding to the time taken until the exhaust gas passing through said exhaust gas flow rate control valve reaches the cylinder and a tracking lag of a change in the amount of cylinder inflow exhaust gas with respect to a change in said amount of passage exhaust gas are reflected in said read value, and the amount of passage exhaust gas is calculated utilizing the read value in which the dead time and tracking lag are reflected.

22. An intake passage inflow exhaust gas calculation system as set forth in claim 21, wherein said tracking lag is a first-order lag, and a time constant of said first-order lag and said dead time are changed in accordance with an engine speed.

23. An intake passage inflow exhaust gas calculation system as set forth in claim 21, wherein the internal combustion engine is provided with a plurality of cylinders, said exhaust gas recirculation passage is connected to an intake passage connected to each cylinder, a ratio of an actual amount of intake passage inflow exhaust gas to the intake passage connected to each cylinder with respect to said calculated amount of cylinder inflow exhaust gas is found in advance as a distribution constant, and said distribution constant is multiplied with said calculated amount of intake passage inflow exhaust gas to calculate the amount of intake passage inflow exhaust gas in the intake passage connected to each cylinder.

24. An intake passage inflow exhaust gas calculation system as set forth in claim 21, wherein the internal combustion engine is provided with a plurality of cylinders, and said tracking lag and dead time are set for each cylinder.

25. An intake passage inflow exhaust gas amount calculation system as set forth in claim 21, wherein the internal engine is provided with an intake valve with a variable closing timing, and the setting of said tracking lag and the setting of said dead time are changed in accordance with a closing time of the intake valve.

26. An intake passage inflow exhaust gas amount calculation system as set forth in claim 21, wherein a flow rate of gas near an opening of an exhaust gas recirculation passage opening to the intake passage can be changed by one of a change of passage volume from the exhaust gas flow rate control valve to the intake valve in accordance with an engine operating state and a change of a channel sectional area of the intake passage in accordance with the engine operating state, and the setting of the tracking lag and the setting of the dead time are changed in accordance with one of said passage volume and said flow rate of gas.

* * * * *